US011726751B2

(12) United States Patent
Wei

(10) Patent No.: US 11,726,751 B2
(45) Date of Patent: *Aug. 15, 2023

(54) METHOD AND APPARATUS FOR AN INTERNET OF THINGS CONTROLLER

(71) Applicant: Qingjun Wei, Montvale, NJ (US)

(72) Inventor: Qingjun Wei, Montvale, NJ (US)

(73) Assignee: Qingjun Wei, Montvale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,978

(22) Filed: Dec. 28, 2021

(65) Prior Publication Data
US 2022/0121428 A1    Apr. 21, 2022

Related U.S. Application Data

(63) Continuation of application No. 16/588,922, filed on Sep. 30, 2019, now Pat. No. 11,210,069, which is a continuation of application No. 14/936,663, filed on Nov. 9, 2015, now Pat. No. 10,430,165.

(60) Provisional application No. 62/192,667, filed on Jul. 15, 2015.

(51) Int. Cl.
*G06F 8/34*  (2018.01)
*G05B 19/042*  (2006.01)
*G06F 8/61*  (2018.01)
*G06F 9/4401*  (2018.01)

(52) U.S. Cl.
CPC ............. *G06F 8/34* (2013.01); *G05B 19/042* (2013.01); *G06F 8/61* (2013.01); *G06F 9/4411* (2013.01); *G05B 2219/25202* (2013.01)

(58) Field of Classification Search
CPC .......................................................... G06F 8/34
USPC ............................................................ 707/756
See application file for complete search history.

(56) References Cited

U.S. PATENT DOCUMENTS

| 2014/0330959 | A1* | 11/2014 | Zhang | H04L 67/025 709/224 |
| 2015/0249672 | A1* | 9/2015 | Burns | G06F 21/629 726/4 |
| 2016/0047855 | A1* | 2/2016 | Bhunia | G01R 31/2801 324/763.01 |
| 2016/0048709 | A1* | 2/2016 | Butler | H01Q 9/285 340/10.51 |

* cited by examiner

*Primary Examiner* — Muluemebet Gurmu
(74) *Attorney, Agent, or Firm* — Kaplan IP Law, PLLC; Jonathan T. Kaplan

(57) ABSTRACT

An Internet of Things Controller, and related tools. The tools address application development and deployment. An Application Meta-Data Editor permits a developer to specify meta-data, that guides the structure of actual data, that can be passed to the application, when invoked as a particular execution (or task) for a particular end-user. Once an application is developed, and has undergone a test deployment, the developer can upload the application to an online Application Store, from which the application can be downloaded and deployed by others. A Data Editor permits an end-user to create his/her own data, in accordance with the developer's meta-data, that adapts the execution to his/her particular needs. While permitting adaptation, the Data Editor ensures that the data created follows the overall pattern of the meta-data, as provided by the developer. Facilities for internationalization of a deployed application's documentation, on a crowd-sourced basis, are also provided.

2 Claims, 88 Drawing Sheets

FIGURE 2
Example Data for 7-Day Thermostat

```
1   "parameters": [
2       "groups": [
3           {
4               "name": "Business Days",
5               "weekdays": [1, 2, 3, 4, 5]
6               "actions": [
7                   {
8                       "actionName": "Wake",
9                       "time": 0600,
10                      "heatSetPoint": 70,
11                      "coolSetPoint": 74,
12                  },
13                  {
14                      "actionName": "Leave",
15                      "time": 0800,
16                      "heatSetPoint": 64,
17                      "coolSetPoint": 80,
18                  },
19                  {
20                      "actionName": "Back",
21                      "time": 1800,
22                      "heatSetPoint": 70,
23                      "coolSetPoint": 74,
24                  },
25                  {
26                      "actionName": "Sleep",
27                      "time": 2200,
28                      "heatSetPoint": 68,
29                      "coolSetPoint": 72,
30                  }
31              ]
32          },
33          {
34              "name": "Weekends",
35              "weekdays": [0, 6]
36              "actions": [
37                  {
38                      "actionName": "Wake",
39                      "time": 0700,
40                      "heatSetPoint": 70,
41                      "coolSetPoint": 74,
42                  },
43                  {
44                      "actionName": "Sleep",
45                      "time": 2300,
46                      "heatSetPoint": 68,
47                      "coolSetPoint": 72,
48                  }
49              ]
50          }
51      ],
52      "thermostats": [103, 115]
53  ]
```

7 Day Thermostat Meta-Data

FIGURE 4A
GUI View of
7 Day Thermostat Meta-Data
English

| Display Name | Type | Native Name |
|---|---|---|
| OW. 7 Day Thermostat | | SevenDayThermostat |
|   Schedules | List | groups |
|      | Table | |
|       Name | String | name |
|       Weekdays | List | weekDays |
|          | Enumeration | |
|           Sunday | | 0 |
|           Monday | | 1 |
|           Tuesday | | 2 |
|           Wednesday | | 3 |
|           Thursday | | 4 |
|           Friday | | 5 |
|           Saturday | | 6 |
|       Actions | List | actions |
|         Action | Table | |
|           Action Name | String | actionName |
|           Time | TimeOnly | time |
|           Heat Setpoint | Number | heatSetPoint |
|           Cool Setpoint | Number | coolSetPoint |
|   Thermostats | List | thermostats |
|     Thermostat | Thermostat | |

GUI View of
7 Day Thermostat Meta-Data
English

GUI View of
7 Day Thermostat Meta-Data
English

FIGURE 5A
7 Day Thermostat Meta-Data Documentation - English

---

500

MetaDataNode: [330]  501
DisplayName: "QW: 7 Day Thermostat"
Details: "A programmable thermostat that improves comfort and saves energy."

MetaDataNode: [331]  502
DisplayName: "Schedules"
Details: "List of schedules."

MetaDataNode: [361]  503
DisplayName: "Thermostats"
Details: ""

MetaDataNode: [341]  504
DisplayName: ""
Details: "Each schedule manages a set of week-days and predefined settings."

MetaDataNode: [362]  505
DisplayName: "Thermostat"
Details: ""

MetaDataNode: [342]  506
DisplayName: "Name"
Details: ""

MetaDataNode: [343]  507
DisplayName: "Weekdays"
Details: "List of weekdays."

MetaDataNode: [344]  508
DisplayName: "Actions"
Details: "List of actions ordered by time."

MetaDataNode: [345]  509
DisplayName: ""
Details: "Sunday, Monday, Tuesday, Wednesday, Thursday, Friday, Saturday"

MetaDataNode: [351]  510
DisplayName: "Action"
Details: ""

MetaDataNode: [352]  511
DisplayName: "Action name"
Details: ""

MetaDataNode: [353]  512
DisplayName: "Time"
Details: ""

MetaDataNode: [354]  513
DisplayName: "Heat Setpoint"
Details: ""

MetaDataNode: [355]  514
DisplayName: "Cool Setpoint"
Details: ""

FIGURE 6A
GUI View of
7 Day Thermostat Meta-Data
Chinese

FIGURE 6B
GUI View of 7 Day Thermostat Meta-Data
Chinese

FIGURE 7
SevenDayThermostat "Dummy" Source Code

```
1   function SevenDayThermostat(groups, thermostats)
2   end
```

FIGURE 8A

```
1   function SevenDayThermostat(groups, thermostats)
2     local nActions = 0
3     for _, schedule in ipairs(groups) do -- Sort actions by time
4       table.sort(schedule.actions, scheduleActionCompare)
5       nActions = nActions + #schedule.actions
6     end
7     if (0 == nActions) then
8       error("No action defined")
9     end
10    local localUnixTimeNow = toUnixTime(date(false))
11    local curAction, curActionTime, nextAction, nextActionTime =
12        getActions(localUnixTimeNow, groups)
13    local lastProcessedTime = QWHA_GetSystemVariableTask("lastActionTime") -- Load from persistence
14    if (not lastProcessedTime) then
15      lastProcessedTime = 0
16    end
17    if (curActionTime > lastProcessedTime) then -- trigger action
18      triggerAction(curAction, thermostats, curActionTime)
19      lastProcessedTime = curActionTime
20    end
21    while true do
22      localUnixTimeNow = toUnixTime(date(false))
23      local sleepSeconds = nextActionTime - localUnixTimeNow
24      if (sleepSeconds <= 0) then
25        curAction, curActionTime, nextAction, nextActionTime =
26            getActions(localUnixTimeNow, thermostats, groups) -- Recalculate cur action
27        triggerAction(curAction, thermostats, curActionTime)
28        lastProcessedTime = curActionTime
29      else
30        if (sleepSeconds > 10) then -- Maximum timedrift is 10 seconds
31          sleepSeconds = 10
32        end
33        QWHA_Sleep(sleepSeconds * 1000) -- Sleep in milliseconds
34      end
35    end
36  end
```

FIGURE 8B

```
1  local function scheduleActionCompare(a1, a2)
2      return (a1.time < a2.time)
3  end
4
5  local function toUnixTime(d)
6      return date.diff(d, date.epoch()).spanseconds()
7  end
8
9  local function getActions(localUnixTimeNow, schedules)
10     local localDateTimeNow = date(localUnixTimeNow)
11     local y, m, d = localDateTimeNow.getdate()
12     local ddd = date(y, m, d)
13     local localUnixDateNow = toUnixTime(ddd)
14     local curAction, curActionTime, nextAction, nextActionTime = getScheduleActions(
15         getTimeOfDay(localDateTimeNow), getSchedule(localDateTimeNow, schedules))
16     local dayAdjust = 0
17     while (not curAction) do       -- Search previous days
18         dayAdjust = dayAdjust - 1
19         curAction, curActionTime = getScheduleActions(
20             24 * 3600, getSchedule(localDateTimeNow.copy().adddays(dayAdjust), schedules))
21     end
22     curActionTime = curActionTime + localUnixDateNow + 24 * 3600 * dayAdjust
23     dayAdjust = 0
24     while (not nextAction) do      -- Search next days
25         dayAdjust = dayAdjust + 1
26         nextAction, nextActionTime = getScheduleActions(
27             0, getSchedule(localDateTimeNow.copy().adddays(dayAdjust), schedules))
28     end
29     nextActionTime = nextActionTime + localUnixDateNow + 24 * 3600 * dayAdjust
30     -- QWHA_Log(0, "curActionTime=" .. tostring(date(curActionTime)))
31     -- QWHA_Log(0, "nextActionTime=" .. tostring(date(nextActionTime)))
32     return curAction, curActionTime, nextAction, nextActionTime
33 end
```

FIGURE 8C

```
1   local function getScheduleActions(t, schedule) -- t is seconds from midnight
2       if (not schedule) then            -- in case some day_of_week missing from schedule list
3           return
4       end
5       local curAction = nil
6       local curActionTime = nil
7       local nextAction = nil
8       local nextActionTime = nil
9       for _, action in ipairs(schedule.actions) do -- action.time is seconds from midnight
10          local actionTime = action.time / 1000 -- App Engine time is milliseconds since midnight
11          if (actionTime <= t) then -- Note must be <= not <
12              curAction = action
13              curActionTime = actionTime
14          else
15              -- actionTime > t
16              nextAction = action
17              nextActionTime = actionTime
18              break
19          end
20      end
21      return curAction, curActionTime, nextAction, nextActionTime
22  end
23  local function getTimeOfDay(d) -- in seconds
24      local h, m, s, t = d:gettime()
25      return h * 3600 + m * 60 + s
26  end
```

FIGURE 8D

```
1  local function getSchedule(d, schedules)
2      local weekday = d:getweekday() - 1; -- returns 1-7, while enum is 0-6
3      for _, schedule in ipairs(schedules) do
4          for j, curWeekday in ipairs(schedule.weekDays) do
5              if (curWeekday == weekday) then
6                  return schedule
7              end
8          end
9      end
10     return nil
11 end
12
13 local function triggerAction(action, thermostats, actionTime)
14     -- QWHA_Log(0, "Action " .. action.actionName .. " triggered")
15     local t = {mode="auto", cool_setpoint=action.coolSetPoint, heat_setpoint=action.heatSetPoint}
16     for _, thermostat in ipairs(thermostats) do
17         QWHA_DeviceSetThermostat(thermostat, t)
18     end
19     QWHA_SetSystemVariableTask("lastActionTime", actionTime, true); -- Persist the last action time
20 end
```

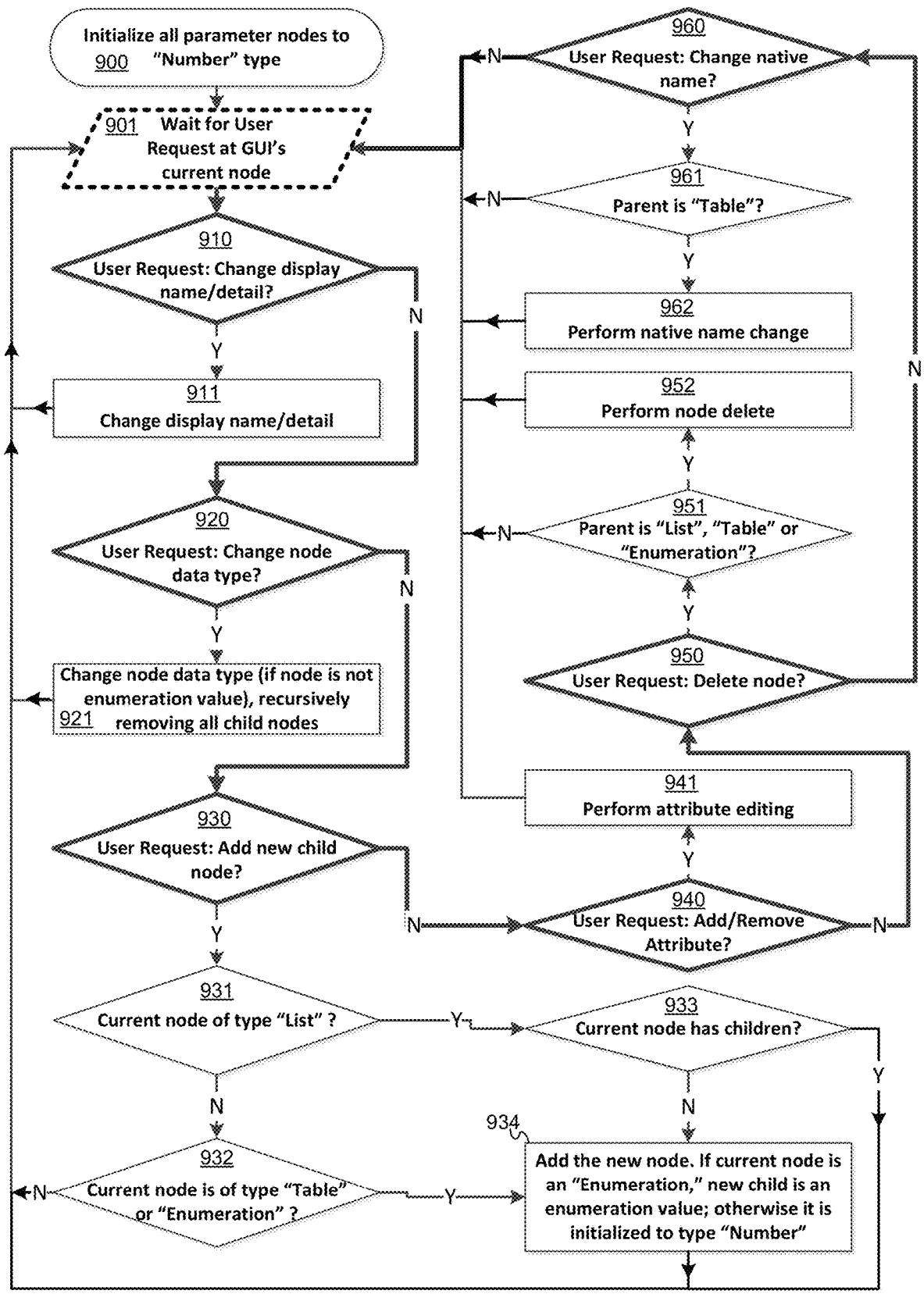
FIGURE 9 Example Flowchart, for App Meta-Data Editor

FIGURE 10A
Meta-Data Editor:
Initial View for 7 Day Thermostat

| Display Name | Type | Native Name |
|---|---|---|
| ⊟ SevenDayThermostat | | SevenDayThermostat |
|     Groups | Number | groups |
|     Thermostats | Number | thermostats |

Details

Meta-Data Editor:
Enter Display Name and Details

Meta-Data Editor:
Select List and Enter Details

Meta-Data Editor:
Select List

Initial Meta-Data

Initial Documentation Nodes

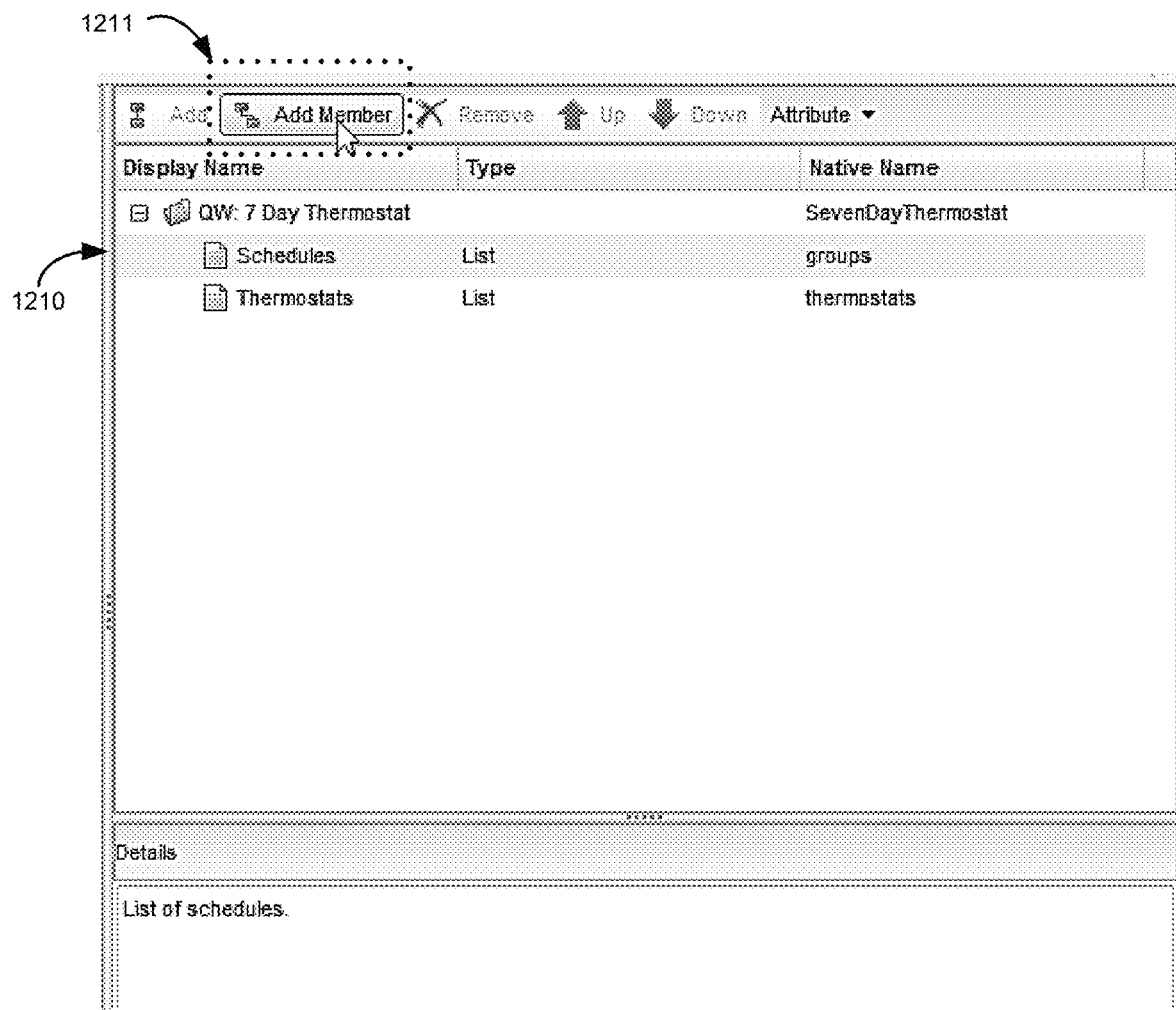
FIGURE 12A
Meta-Data Editor:
Adding Child Node
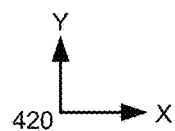

FIGURE 12B
Meta-Data Editor:
Added Child Node

| Display Name | Type | Native Name |
|---|---|---|
| ⊟ QW: 7 Day Thermostat | | SevenDayThermostat |
| ⊟ Schedules | List | groups |
| | Number | |
| Thermostats | List    1220 | thermostats |

Details

List of schedules.

Meta-Data Editor:
Change Node to Table

Meta-Data Editor:
Make List of Thermostats

FIGURE 12E
Meta-Data Editor:
Details Field

| Display Name | Type | Native Name |
|---|---|---|
| ⊟ QW: 7 Day Thermostat | | SevenDayThermostat |
| ⊟ Schedules | List | groups |
| | Table  ← 1220 | |
| ⊟ Thermostats | List | thermostats |
| | Thermostat | |

Details

Each schedule manages a set of week-days and predefined settings.  ← 1250

Meta-Data Editor:
Adding Key-Value Pair to Table

FIGURE 14B
Meta-Data Editor:
Added Default Key-Value Pair to Table
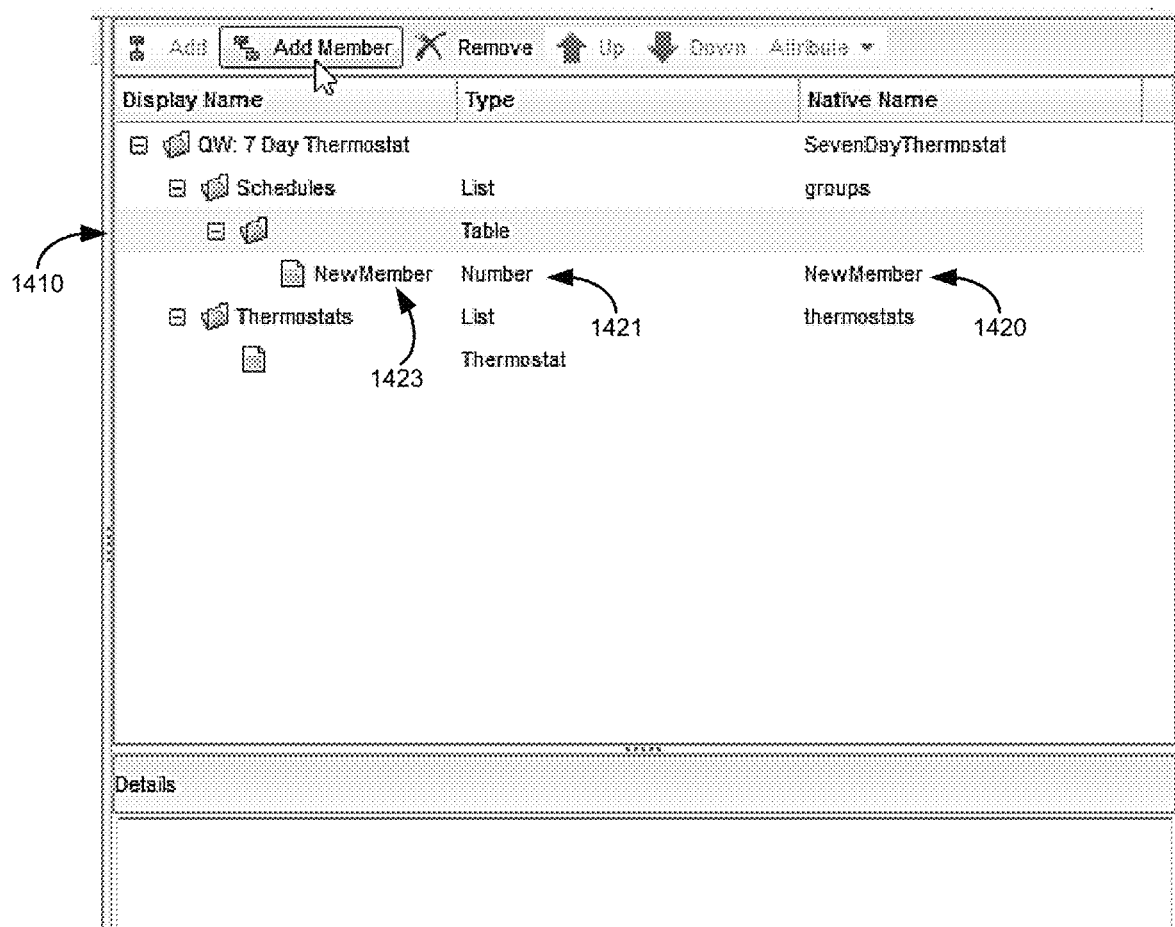
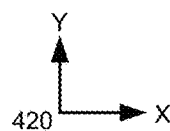

MetaDataNode: [330]  501
DisplayName: "QW: 7 Day Thermostat"
Details: "A programmable thermostat that improves comfort and saves energy."

MetaDataNode: [331]  502
DisplayName: "Schedules"
Details: "List of schedules."

MetaDataNode: [361]  503
DisplayName: "Thermostats"
Details: ""

MetaDataNode: [341]  504
DisplayName: ""
Details: "Each schedule manages a set of week-days and predefined settings."

MetaDataNode: [362]  505
DisplayName: "Thermostat"
Details: ""

MetaDataNode: [342]  506
DisplayName: "NewMember"
Details: ""

Meta-Data Editor:
Changing Native Name for Child of Table

FIGURE 16B
Meta-Data Editor:
Changed Native Name for Child of Table
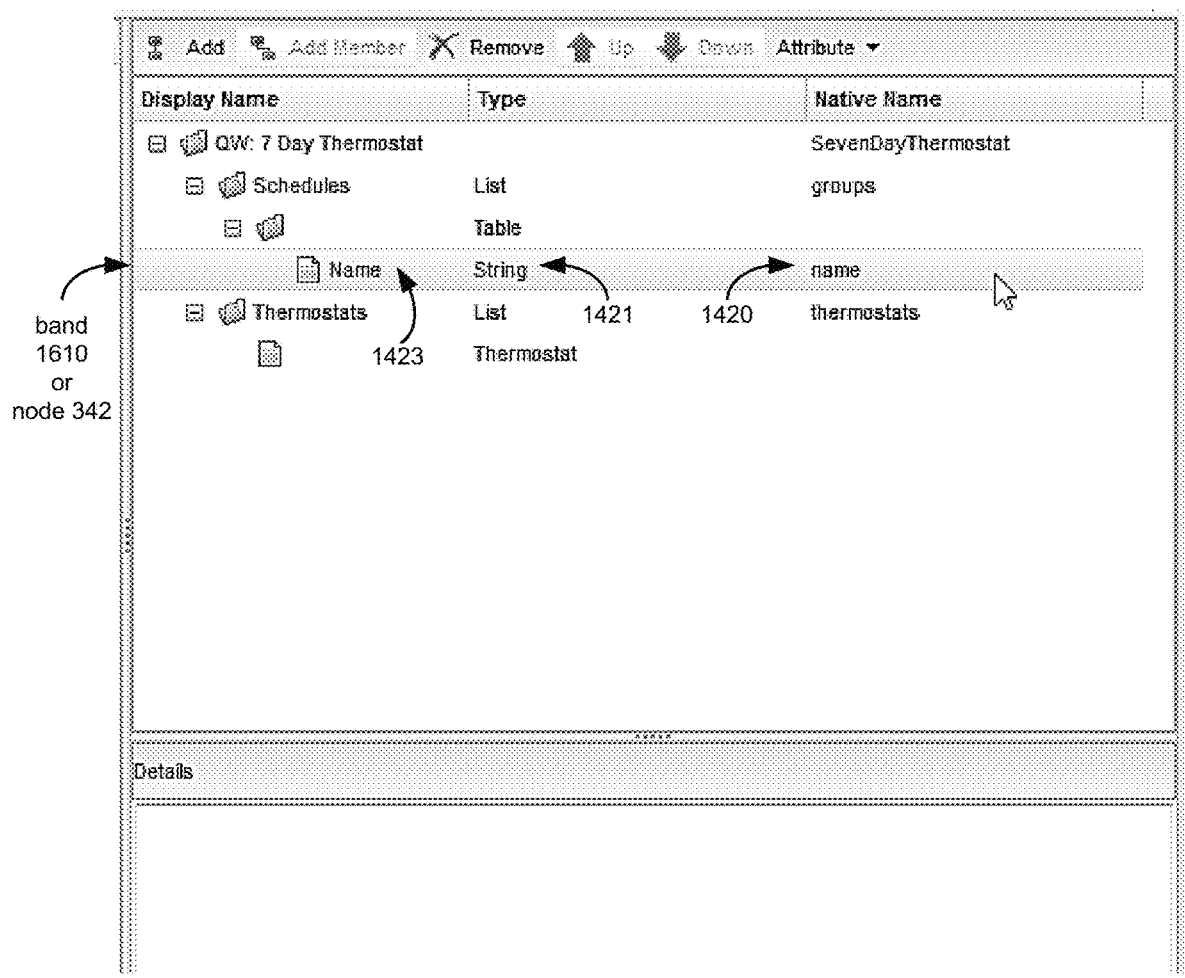
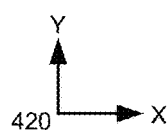

MetaDataNode: [330]                    501
DisplayName: "QW: 7 Day Thermostat"
Details: "A programmable thermostat that
improves comfort and saves energy."

MetaDataNode: [331]                    502
DisplayName: "Schedules"
Details: "List of schedules."

MetaDataNode: [361]                    503
DisplayName: "Thermostats"
Details: ""

MetaDataNode: [341]                    504
DisplayName: ""
Details: "Each schedule manages a set of
week-days and predefined settings."

MetaDataNode: [362]                    505
DisplayName: "Thermostat"
Details: ""

MetaDataNode: [342]                    506
DisplayName: "Name"
Details: ""
```

FIGURE 18
Meta-Data Editor:
A Second Child of Table
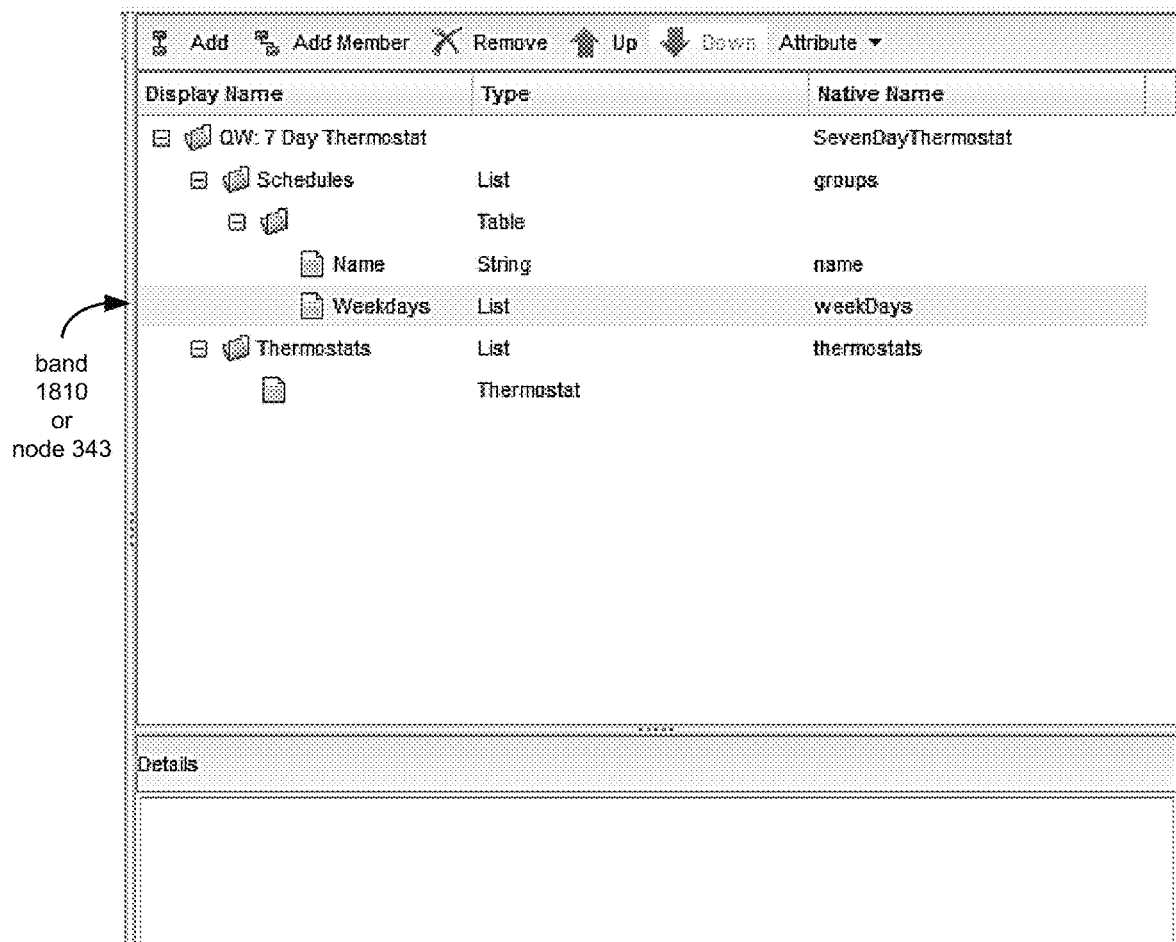
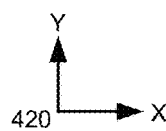

MetaDataNode: [330]  501
DisplayName: "QW: 7 Day Thermostat"
Details: "A programmable thermostat that improves comfort and saves energy."

MetaDataNode: [331]  502
DisplayName: "Schedules"
Details: "List of schedules."

MetaDataNode: [361]  503
DisplayName: "Thermostats"
Details: ""

MetaDataNode: [341]  504
DisplayName: ""
Details: "Each schedule manages a set of week-days and predefined settings."

MetaDataNode: [362]  505
DisplayName: "Thermostat"
Details: ""

MetaDataNode: [342]  506
DisplayName: "Name"
Details: ""

MetaDataNode: [343]  507
DisplayName: "Weekdays"
Details: "List of weekdays."

Meta-Data Editor:
Adding Enumeration as List Member

Meta-Data Editor:
Enumeration Added as List Member

MetaDataNode: [330]     501
DisplayName: "QW: 7 Day Thermostat"
Details: "A programmable thermostat that improves comfort and saves energy."

MetaDataNode: [331]     502
DisplayName: "Schedules"
Details: "List of schedules."

MetaDataNode: [361]     503
DisplayName: "Thermostats"
Details: ""

MetaDataNode: [341]     504
DisplayName: ""
Details: "Each schedule manages a set of week-days and predefined settings."

MetaDataNode: [362]     505
DisplayName: "Thermostat"
Details: ""

MetaDataNode: [342]     506
DisplayName: "Name"
Details: ""

MetaDataNode: [343]     507
DisplayName: "Weekdays"
Details: "List of weekdays."

MetaDataNode: [345]     509
DisplayName: ""
Details: ""

Meta-Data Editor:
Adding Enumeration Value

Meta-Data Editor:
Changed Enumeration Value Display Name

MetaDataNode: [330]    501
DisplayName: "QW: 7 Day Thermostat"
Details: "A programmable thermostat that improves comfort and saves energy."

MetaDataNode: [331]    502
DisplayName: "Schedules"
Details: "List of schedules."

MetaDataNode: [361]    503
DisplayName: "Thermostats"
Details: ""

MetaDataNode: [341]    504
DisplayName: ""
Details: "Each schedule manages a set of week-days and predefined settings."

MetaDataNode: [362]    505
DisplayName: "Thermostat"
Details: ""

MetaDataNode: [342]    506
DisplayName: "Name"
Details: ""

MetaDataNode: [343]    507
DisplayName: "Weekdays"
Details: "List of weekdays."

MetaDataNode: [345]    509
DisplayName: "Sunday"
Details: ""

Meta-Data Editor:
Added Enumeration Values

MetaDataNode: [330]    501
DisplayName: "QW: 7 Day Thermostat"
Details: "A programmable thermostat that improves comfort and saves energy."

MetaDataNode: [331]    502
DisplayName: "Schedules"
Details: "List of schedules."

MetaDataNode: [361]    503
DisplayName: "Thermostats"
Details: ""

MetaDataNode: [341]    504
DisplayName: ""
Details: "Each schedule manages a set of week-days and predefined settings."

MetaDataNode: [362]    505
DisplayName: "Thermostat"
Details: ""

MetaDataNode: [342]    506
DisplayName: "Name"
Details: ""

MetaDataNode: [343]    507
DisplayName: "Weekdays"
Details: "List of weekdays."

MetaDataNode: [345]    509
DisplayName: "Sunday, Monday, Tuesday, Wednesday, Thursday, Friday, Saturday"
Details: ""

Meta-Data Editor

MetaDataNode: [330]    501
DisplayName: "QW: 7 Day Thermostat"
Details: "A programmable thermostat that improves comfort and saves energy."

MetaDataNode: [331]    502
DisplayName: "Schedules"
Details: "List of schedules."

MetaDataNode: [361]    503
DisplayName: "Thermostats"
Details: ""

MetaDataNode: [341]    504
DisplayName: ""
Details: "Each schedule manages a set of week-days and predefined settings."

MetaDataNode: [362]    505
DisplayName: "Thermostat"
Details: ""

MetaDataNode: [342]    506
DisplayName: "Name"
Details: ""

MetaDataNode: [343]    507
DisplayName: "Weekdays"
Details: "List of weekdays."

MetaDataNode: [344]    508
DisplayName: "Actions"
Details: "List of actions ordered by time."

MetaDataNode: [345]    509
DisplayName: "Sunday, Monday, Tuesday, Wednesday, Thursday, Friday, Saturday"
Details: ""

MetaDataNode: [351]    510
DisplayName: "Action"
Details: ""

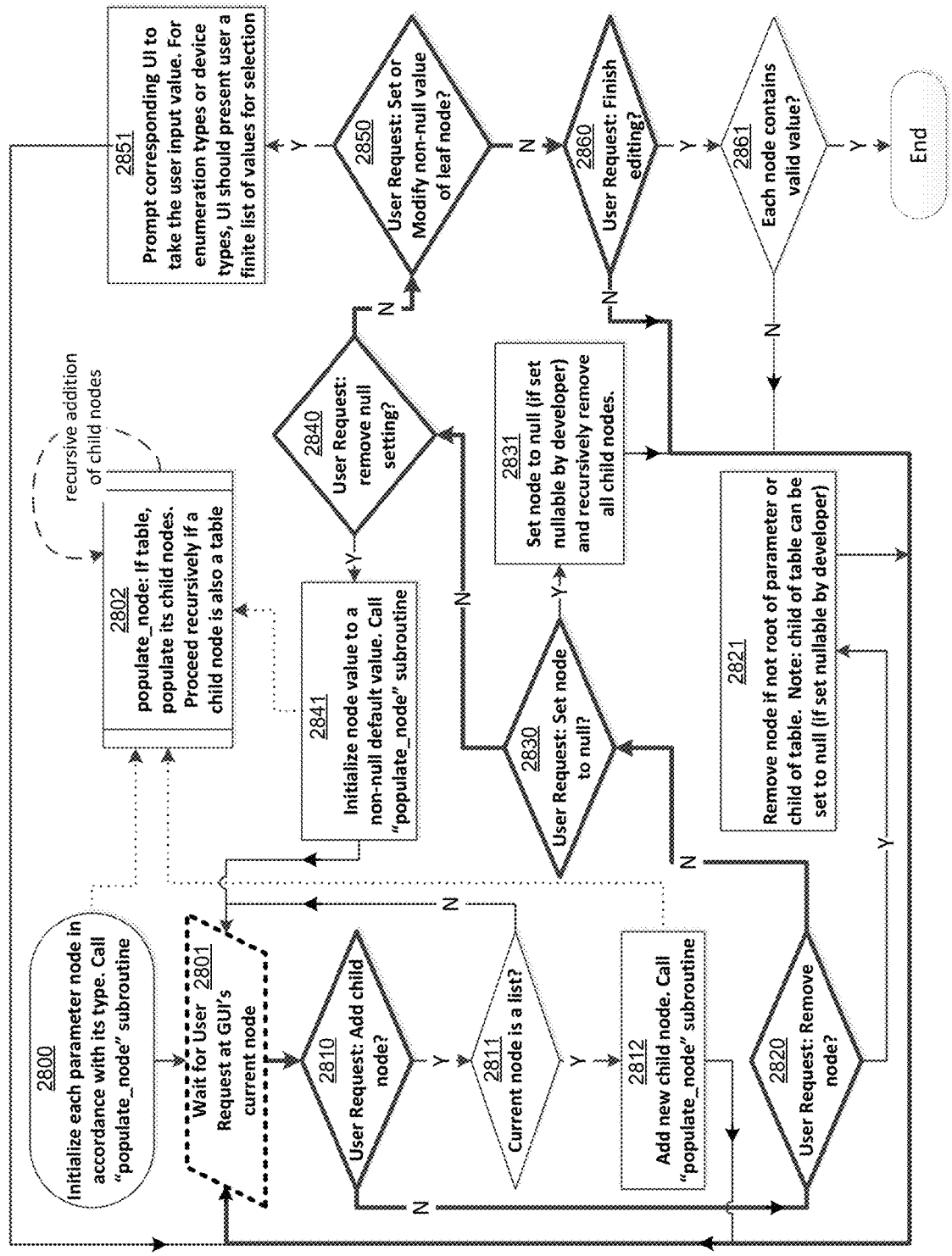
FIGURE 28  Example Flowchart, for Argument Editor

FIGURE 29A Initial Data, for 7-Day Thermostat

GUI View of
Initial Data, for 7-Day Thermostat

FIGURE 29C
GUI View of
Initial Data, for 7-Day Thermostat
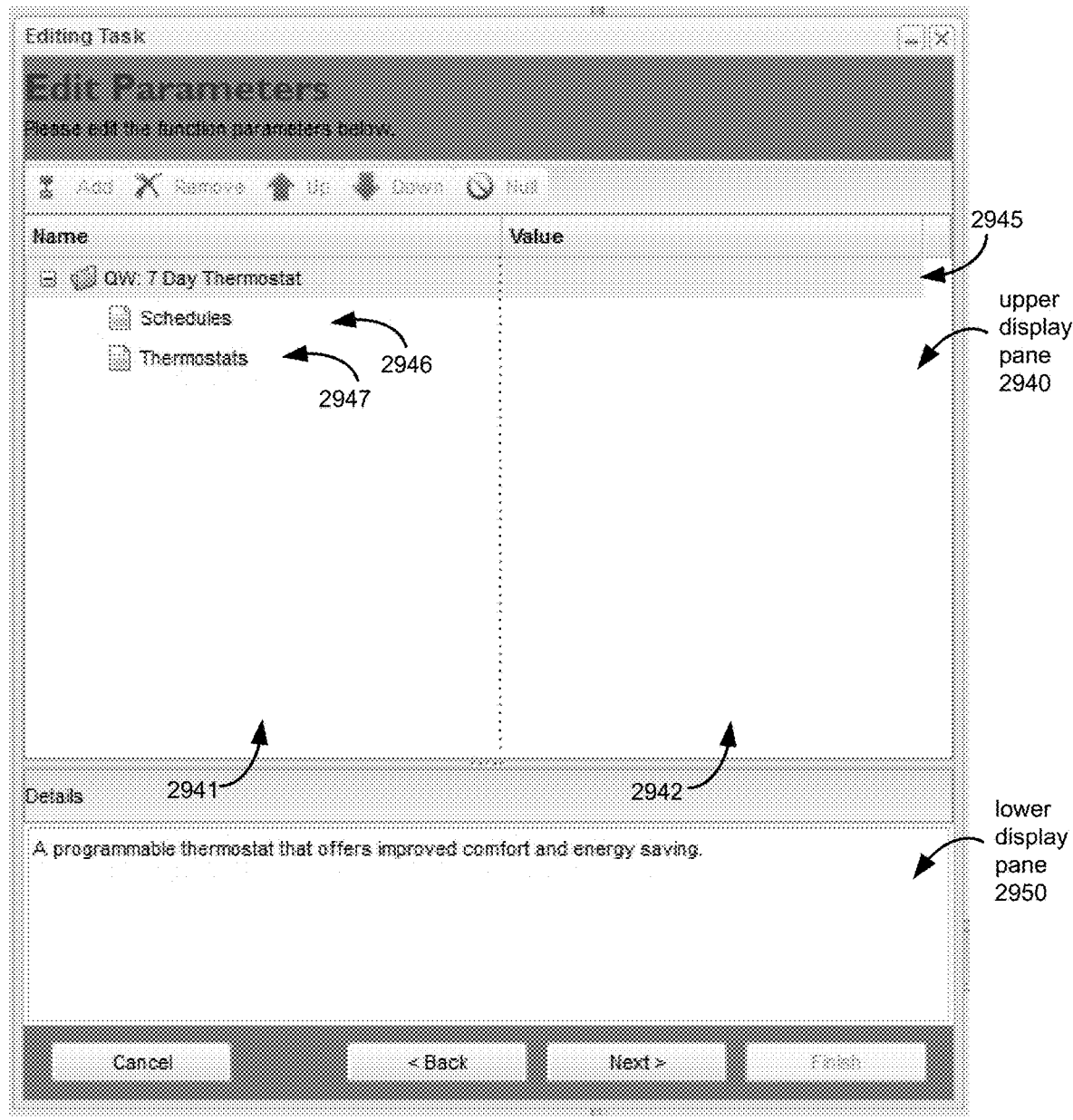
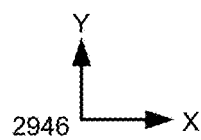

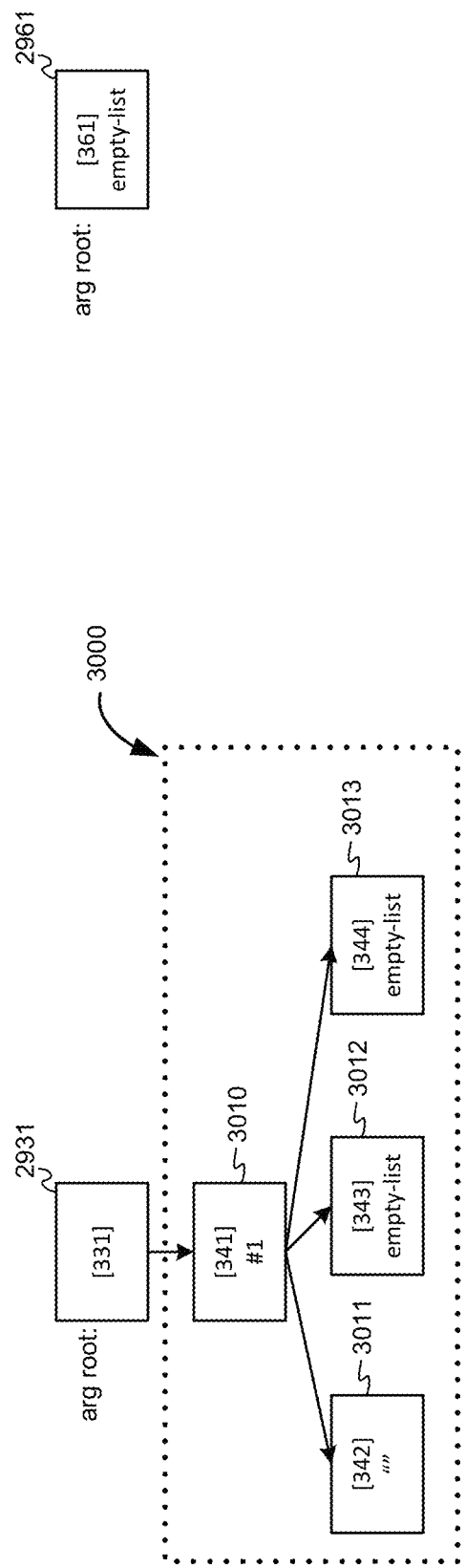
FIGURE 30A Child Node of Schedules Added

GUI View of
Initial Data, for 7-Day Thermostat
Adding Child of Schedules

GUI View of
Initial Data, for 7-Day Thermostat
Result of Selecting "Add" Child of Schedules

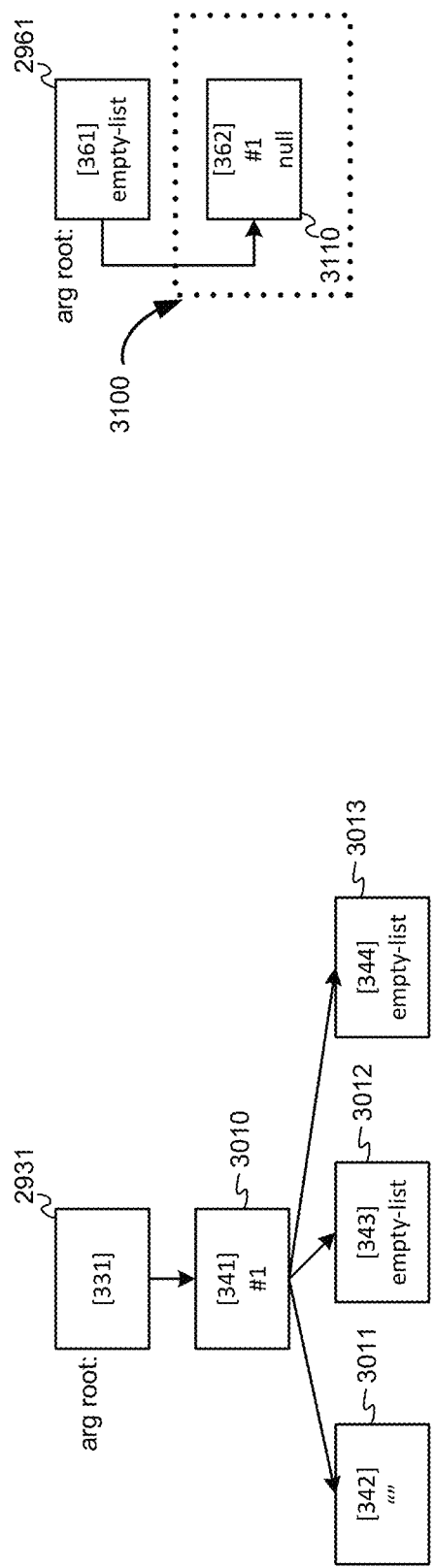
FIGURE 31A Thermostat Added

GUI View of
Initial Data, for 7-Day Thermostat
Selecting "Add" Child Node

FIGURE 31C
GUI View of
Initial Data, for 7-Day Thermostat
Result of Selecting "Add" Thermostats
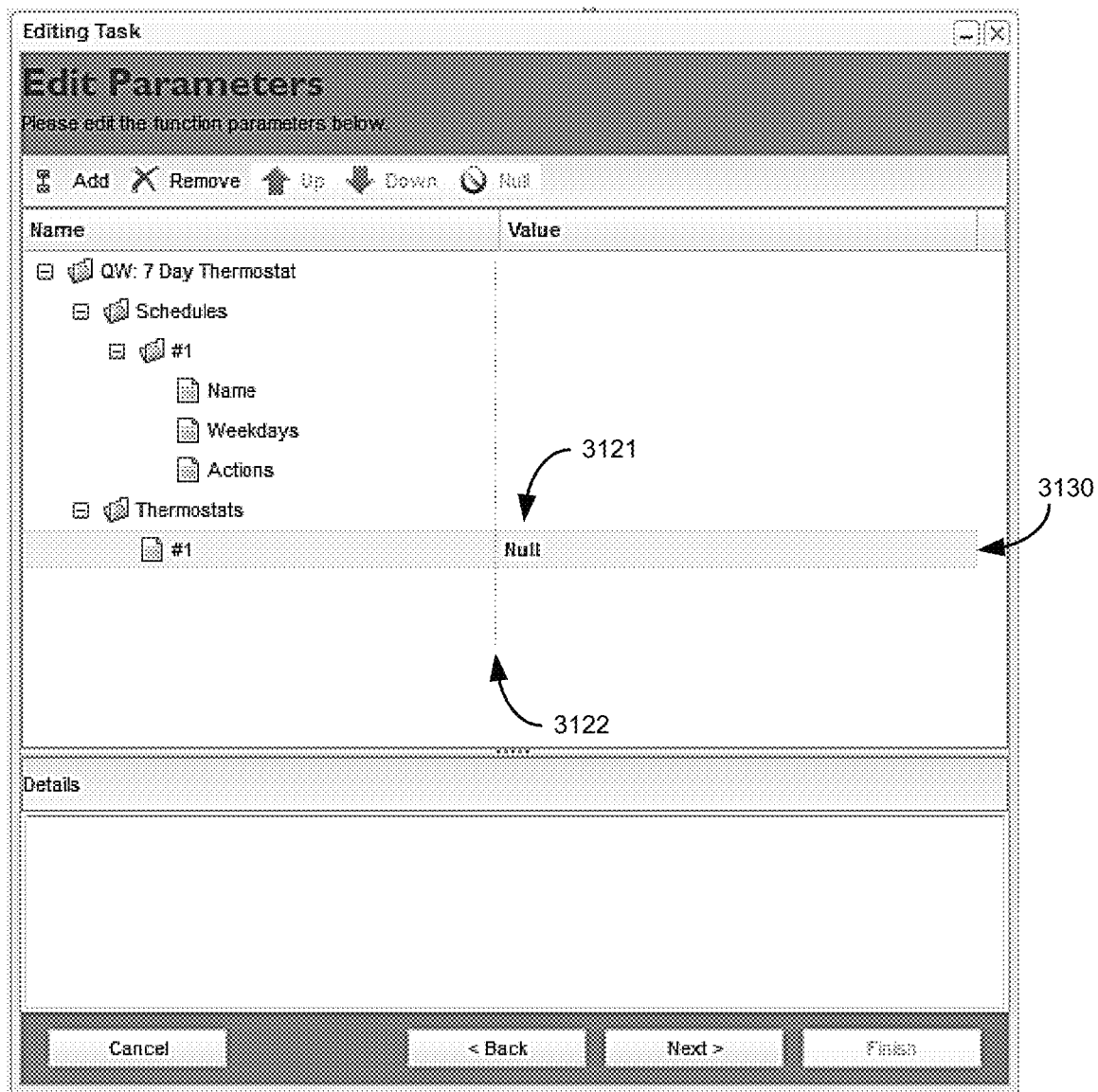
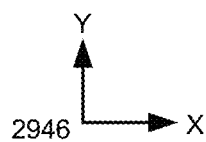

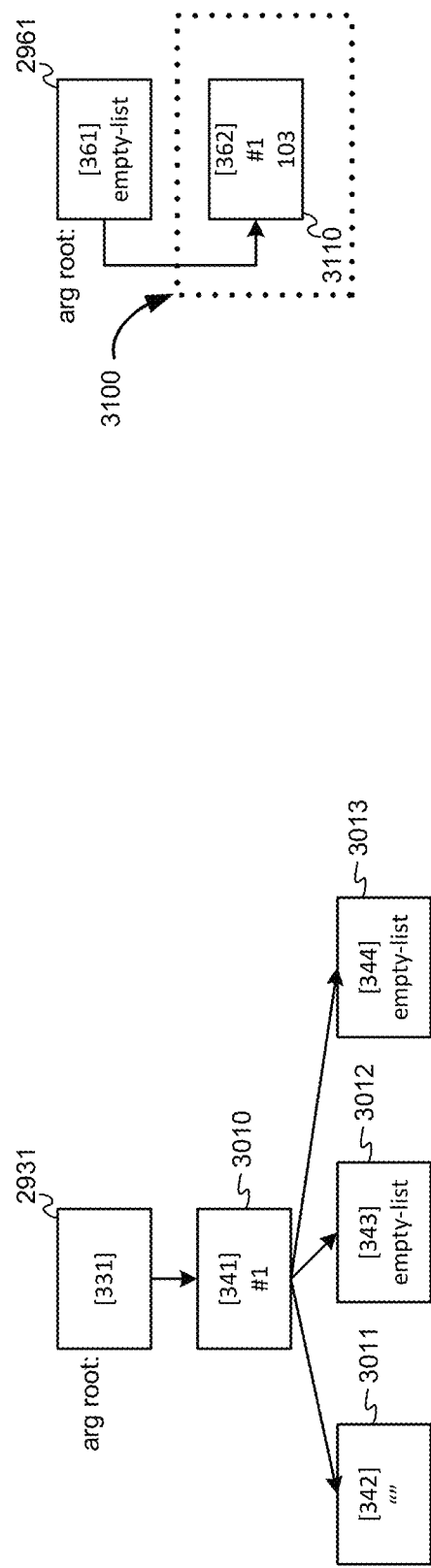
FIGURE 32A  Thermostat Selected

GUI View of
Initial Data, for 7-Day Thermostat
Selecting Thermostat

GUI View of
Initial Data, for 7-Day Thermostat
Result of Selecting A Thermostat

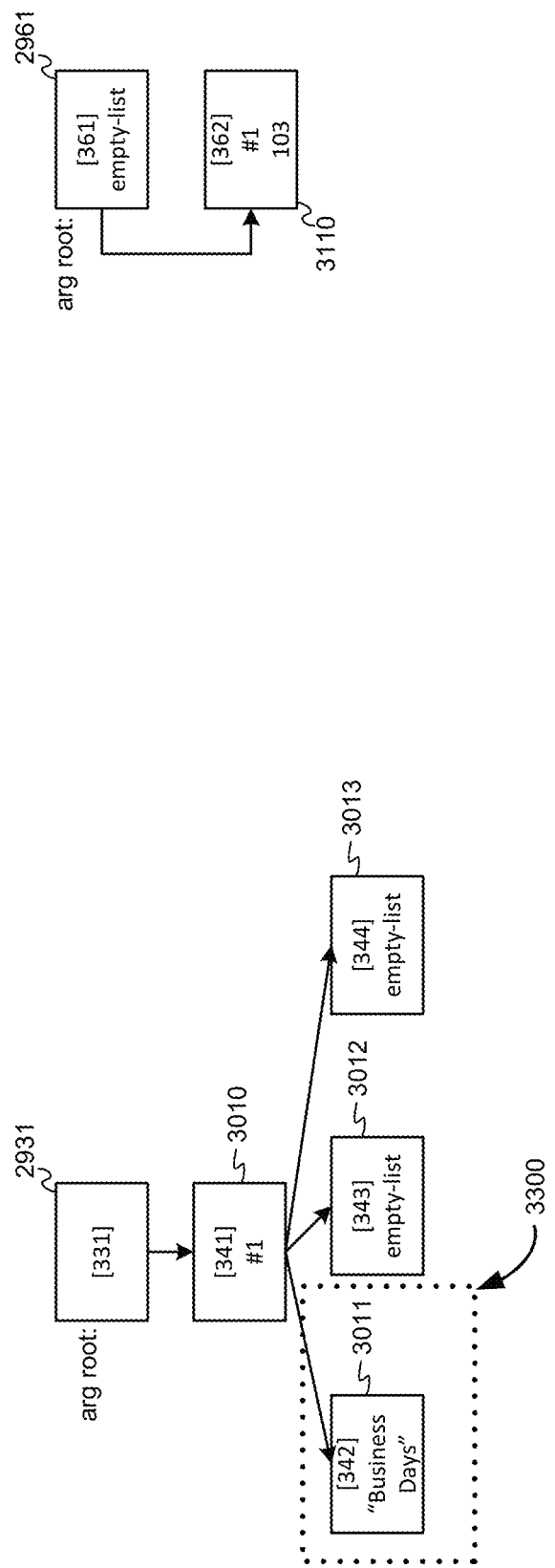
FIGURE 33A String Added

GUI View of
Initial Data, for 7-Day Thermostat
Typing String Value

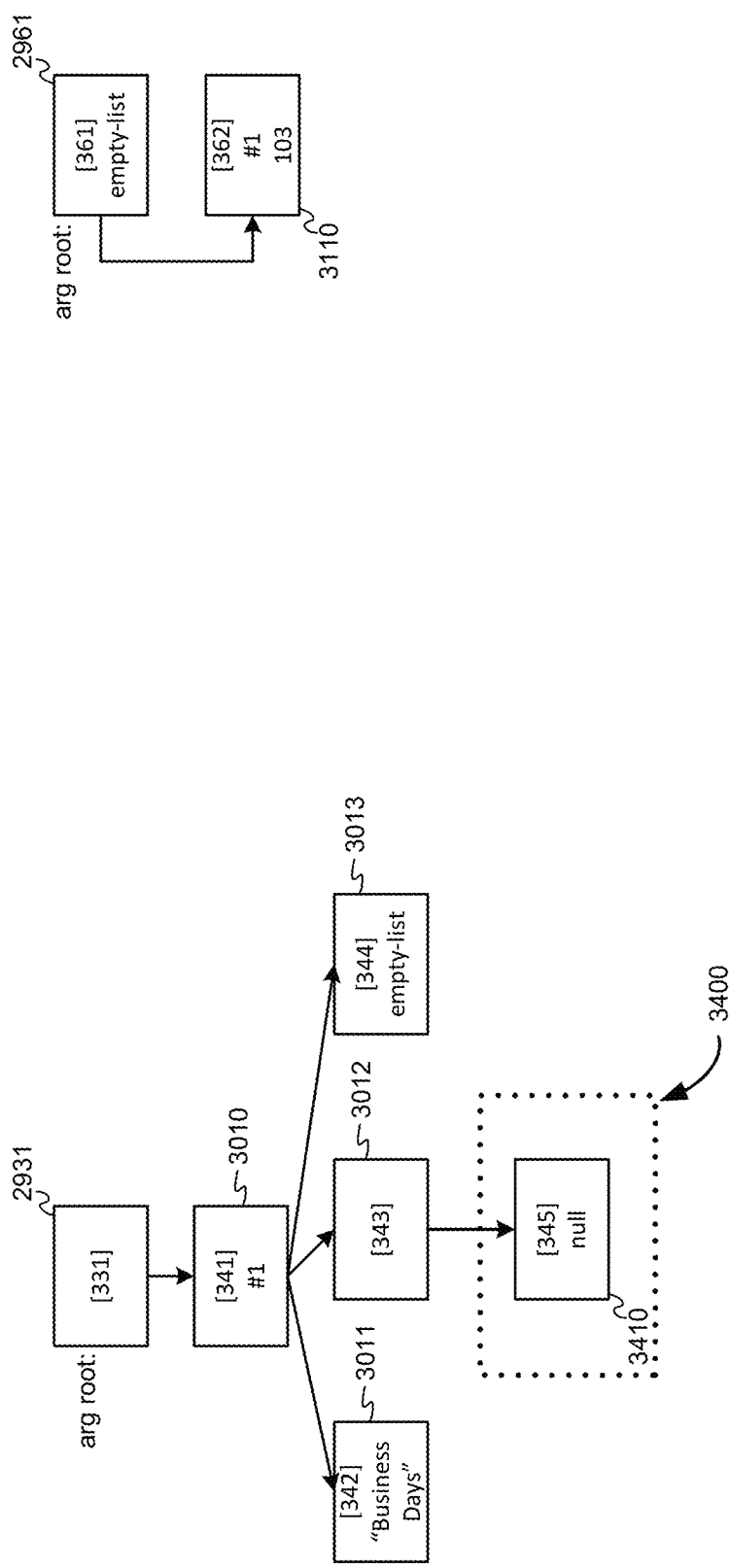
FIGURE 34A  Enumeration Added

GUI View of
Initial Data, for 7-Day Thermostat
Added Initial Enumeration to Weekdays

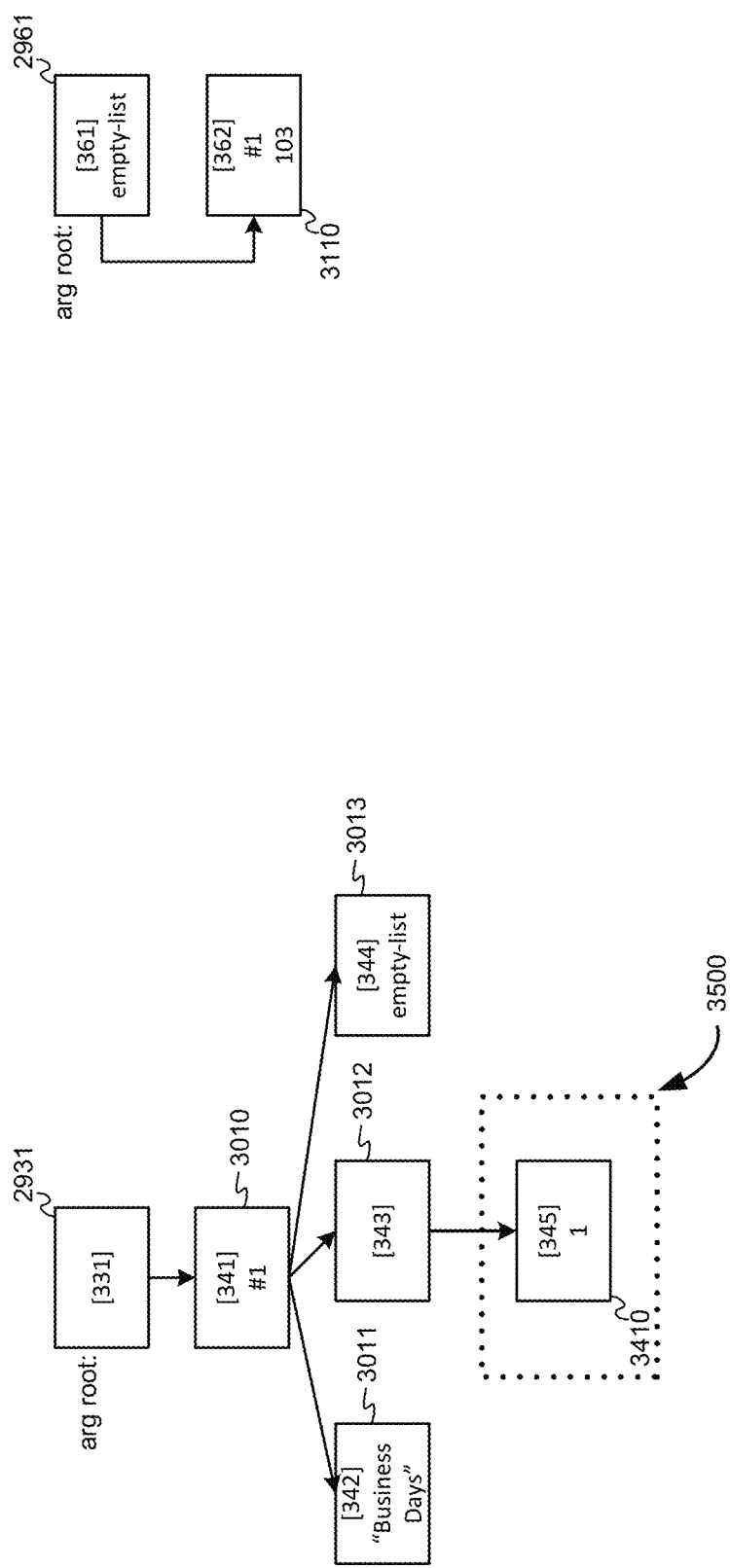

GUI View of
Initial Data, for 7-Day Thermostat
Selecting Day of Week

GUI View of
Initial Data, for 7-Day Thermostat
After Day of Week Selected

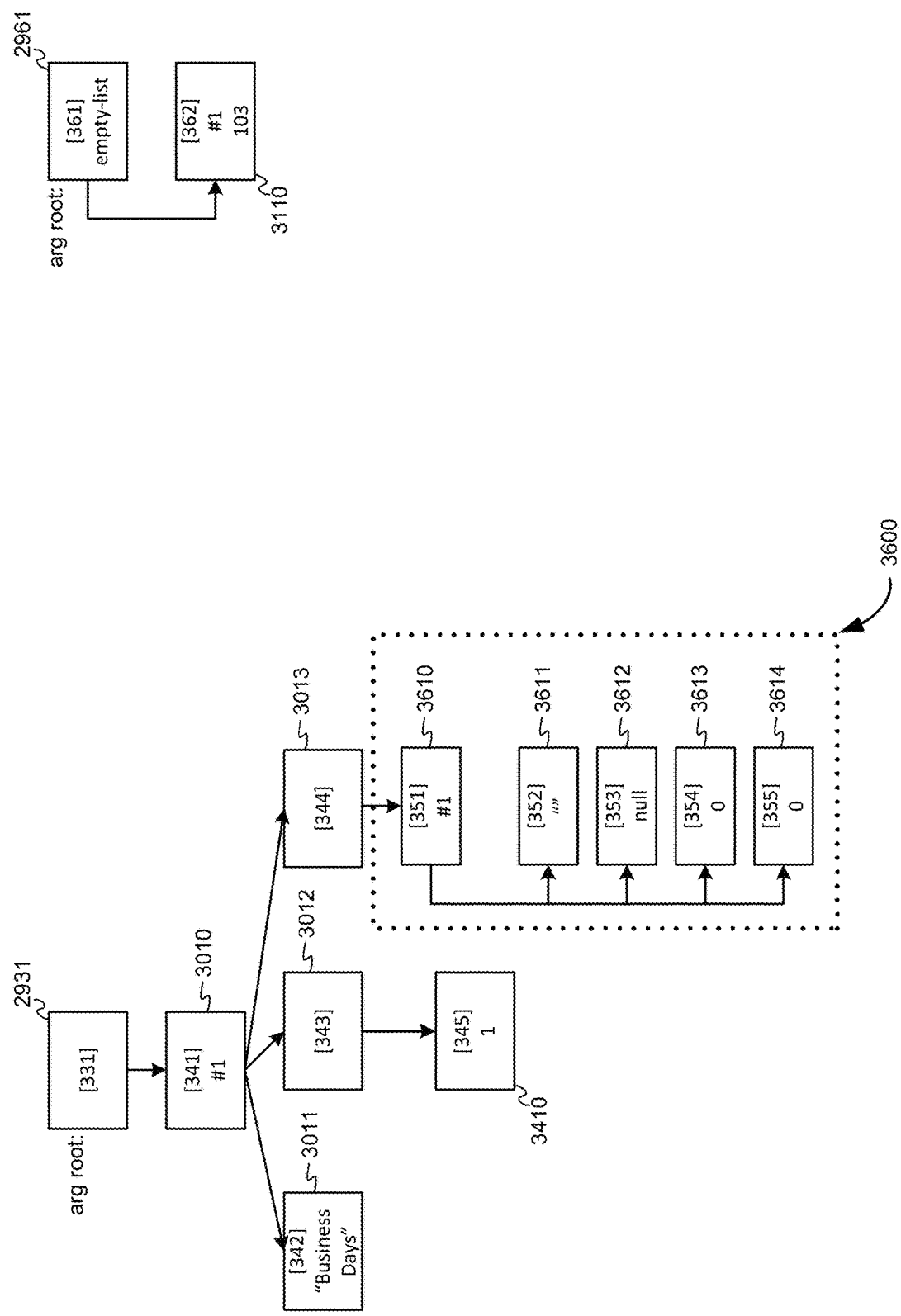
FIGURE 36A  Action Added

GUI View of
Initial Data, for 7-Day Thermostat
After Initially Adding an Action

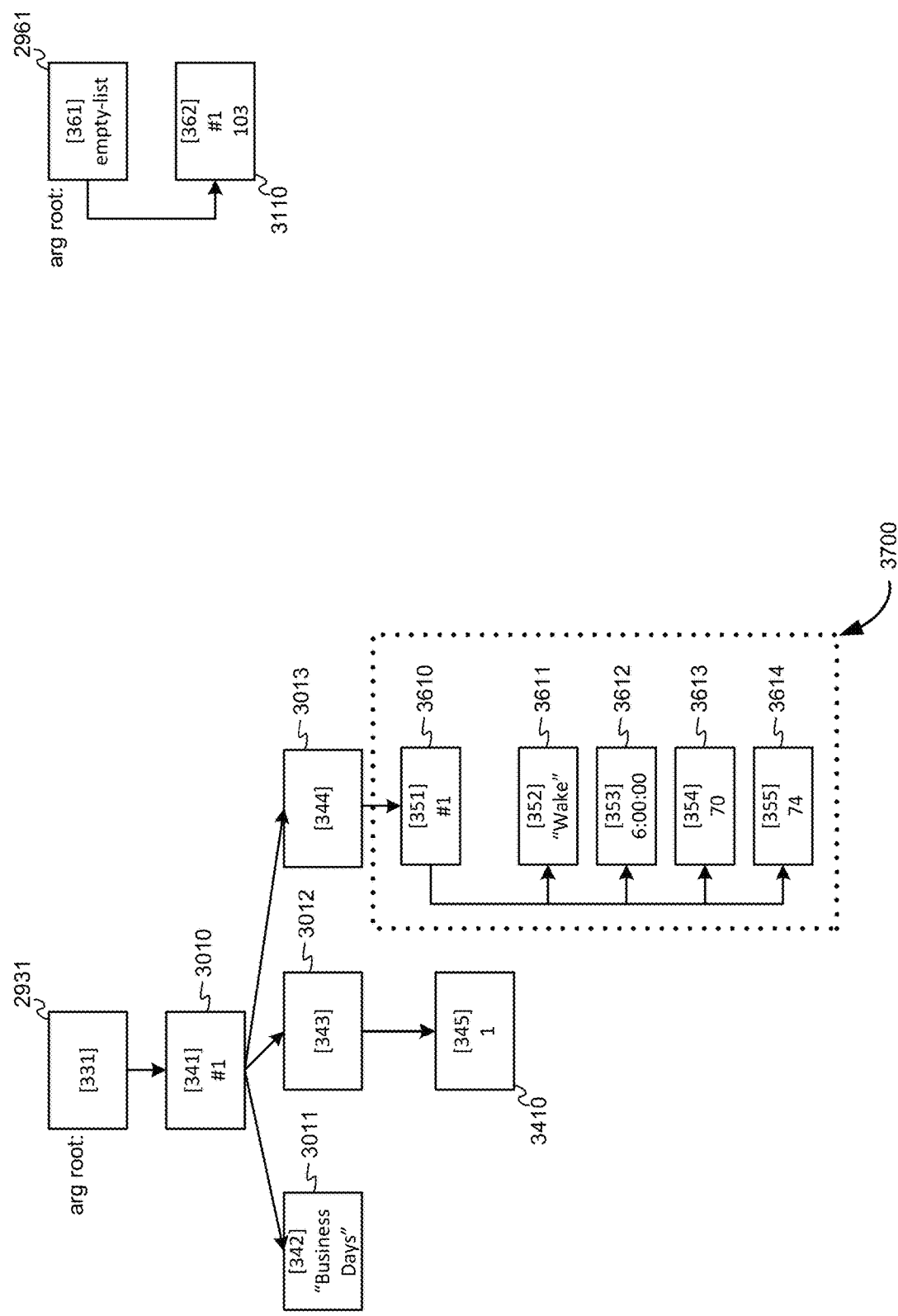
FIGURE 37A  Values Added to Action

GUI View of
Initial Data, for 7-Day Thermostat
After Adding Data to 1st Action

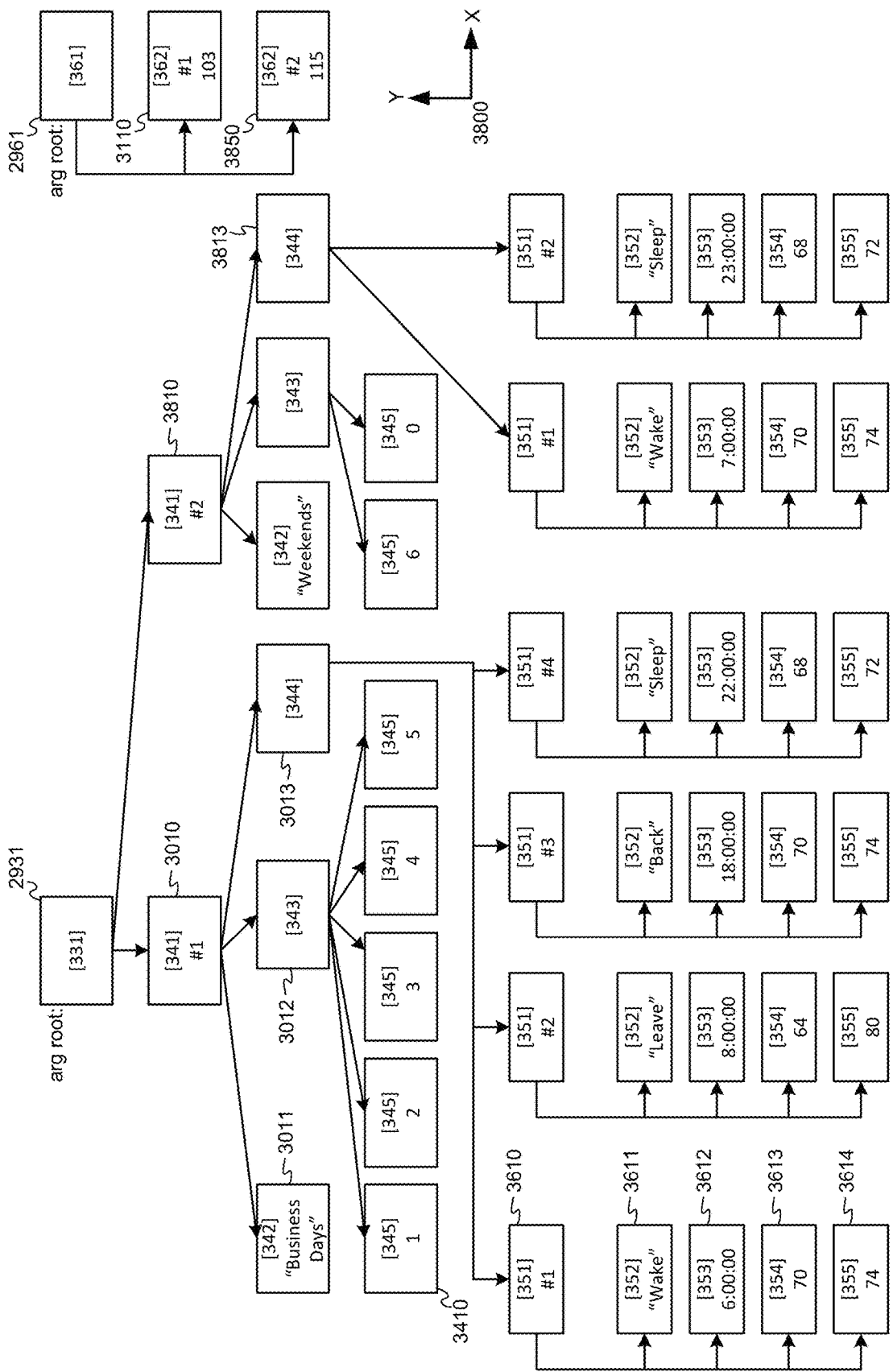
FIGURE 38A  Example Completed Task Data, for 7-Day Thermostat

Completed Example Data, for 7-Day Thermostat

Completed Example Data, for 7-Day Thermostat

FIGURE 39
"Dummy" test function

```
1    function test(p1)
2    end
```

FIGURE 40A
GUI View of Dummy's Meta-Data

| Display Name | Type | Native Name |
|---|---|---|
| ⊟ test | | test |
| ⊟ P1 | Table | p1 |
| ⊟ Options | Table | Options |
| Option A | Number | Option_A |
| Option B | Number | Option_B |
| ⊟ Main Data | Table | Main_Data |
| Data Item 1 | Number | Data_Item_1 |
| Data Item 2 | Number | Data_Item_2 |

Details 4010, 4020, 4030, 4002, 4001, 4000

420  Y, X

GUI View of Dummy's Meta-Data

GUI View of Dummy's Meta-Data

FIGURE 41A
GUI View of
Initial Data Entry for "test" app
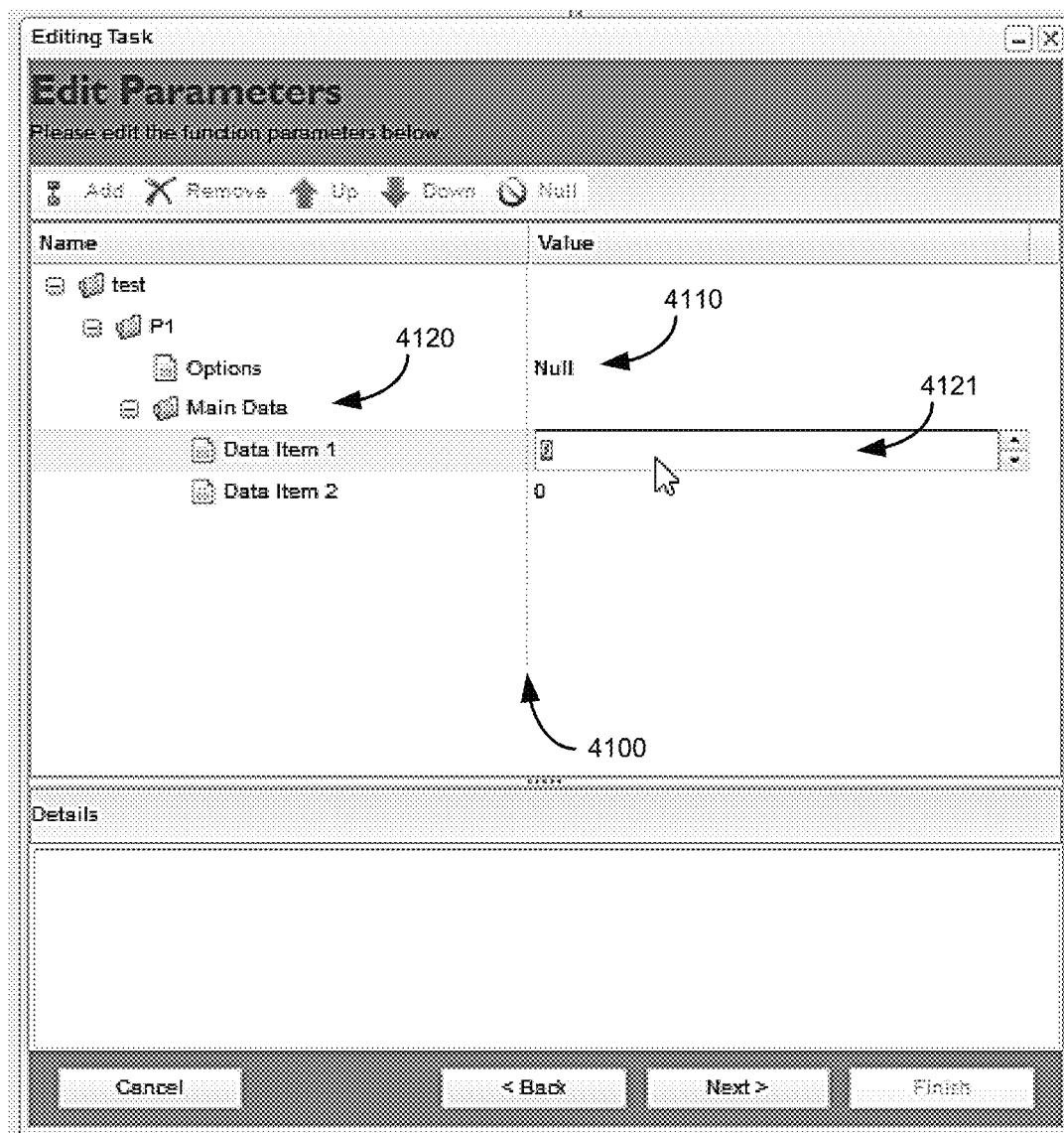
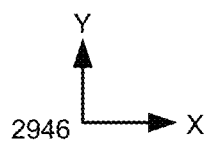

FIGURE 41B
GUI View for
removal of Null
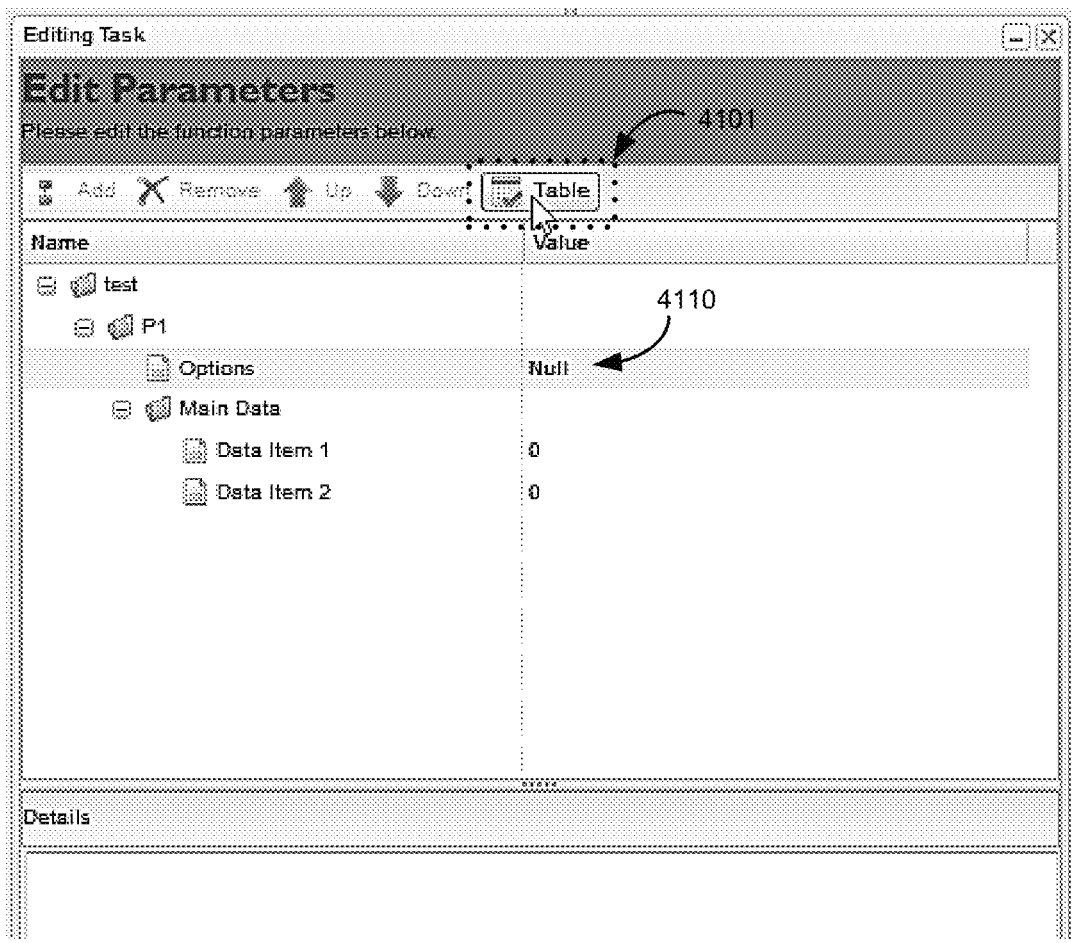
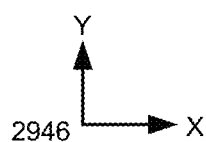

FIGURE 41C
GUI View after removal of Null
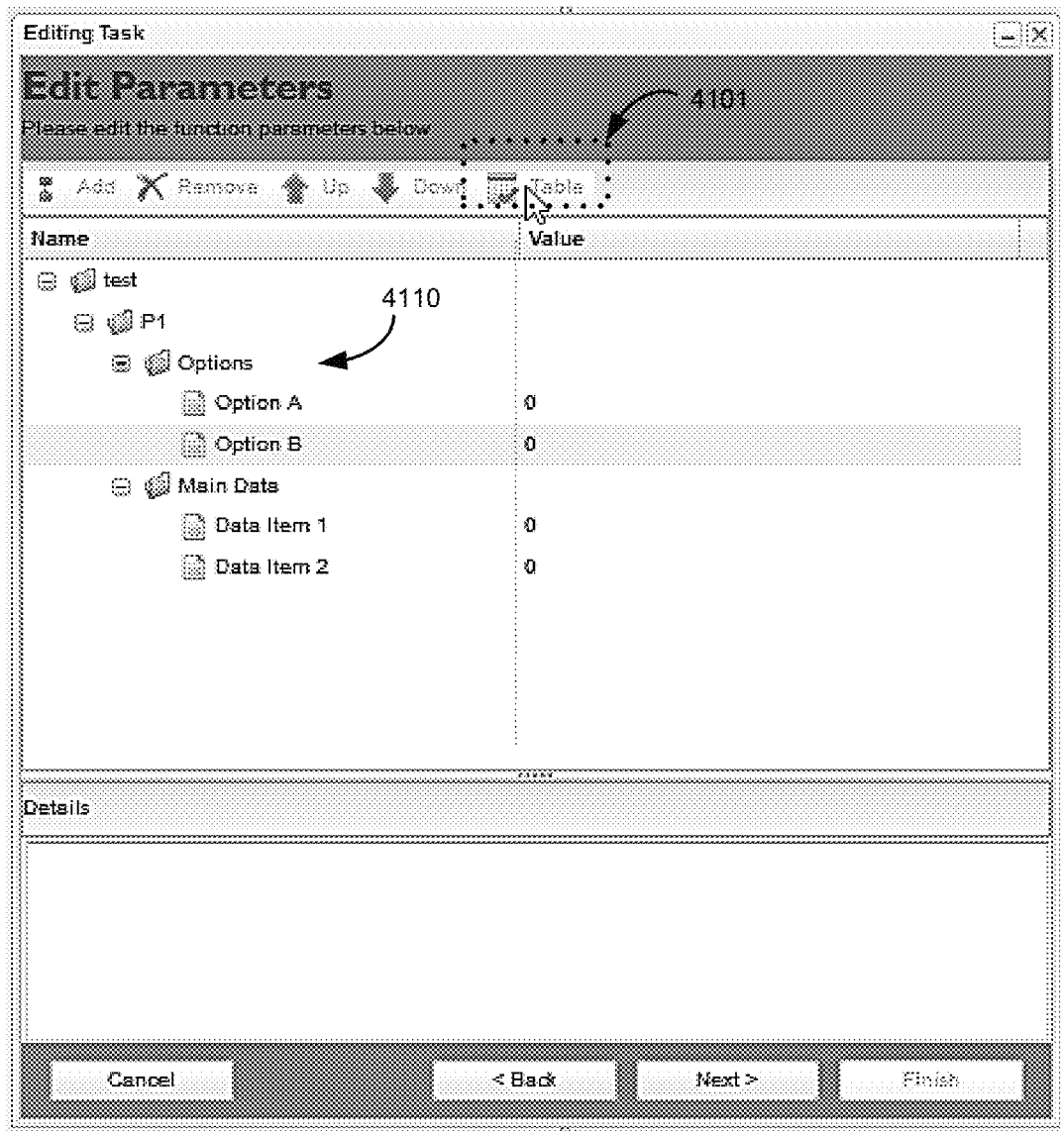
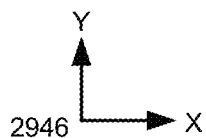

"test" app meta-data

METHOD AND APPARATUS FOR AN INTERNET OF THINGS CONTROLLER

As provided for under 35 U.S.C. § 120, this patent claims benefit of the filing date of the following U.S. patent application, herein incorporated by reference in its entirety:

"Method and Apparatus for an Internet of Things Controller," filed 2019 Sep. 30 (y/m/d), having inventor Qingjun Wei, and App. No. 16588922.

As provided for under 35 U.S.C. § 120, App. No. 16588922 claims benefit of the filing date of the following U.S. patent application, herein incorporated by reference in its entirety:

"Method and Apparatus for an Internet of Things Controller," filed 2015 Nov. 9 (y/m/d), having inventor Qingjun Wei, and App. No. 14936663.

As provided for under 35 U.S.C. § 119(e), App. No. 14936663 claims benefit of the filing date for the following U.S. provisional patent application(s), herein incorporated by reference in its (their) entirety:

"Application Engine, Application Store, and Graphic Tools for Internet of Things," filed 2015 Jul. 15 (y/m/d), having inventor Qingjun Wei and App. No. 62192667.

FIELD OF THE INVENTION

The present invention relates generally to the Internet of Things (or "IoT"), and, more particularly, to IoT controllers.

BACKGROUND OF THE INVENTION

Known controllers, for IoT devices, provide two types of interfaces. A first type that is very customizable, but which is accessible only to the expert software engineer. A second type that is very limited in its range of inputs, but which is usable by a person with essentially no ability to program. The limitations of the second type of interface severely restrict the level of adaptability that can be provided, by IoT controllers, without resort to the first type of interface, and the extremely high costs involved in the production of fully-custom software.

Accordingly there is a need for IoT controllers that provide greater adaptability than the second type of interface, while still avoiding the cost level of the first interface type.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIGS. 4A-4C depict a view of the same meta-data of FIG. 3, except it is shown through an example GUI.

FIG. 5A presents a set of documentation nodes 500, that document the meta-data of FIG. 3 for the natural language English.

FIGS. 6A-6B depict an example of how a GUI view can change, when the language module is changed from English to Chinese.

FIG. 7 depicts an empty function for the smart thermostat (called "SevenDayThermostat") written in the Lua programming language.

FIG. 8A-8D depict the same function as FIG. 7, except it is fully implemented in detailed Lua code.

FIG. 9 illustrates, as a flowchart, a generalized process suitable for a Meta-Data Editor GUI.

FIG. 10A depicts an example initial screen, by which the meta-data creation process can begin.

FIGS. 12A-12B show beginning, through the GUI, a next-lower level of hierarchy for the meta-data.

FIG. 12E shows a return to the "Table" child being the current node, for purposes of adding documentation to the node's "Details" field.

FIGS. 14A-14B depict a first default key-value pair being added, to the Table node child of the first parameter.

FIGS. 15A-15B depict the change in the meta-data and documentation nodes, that result from the creation of the default key-value pair.

FIGS. 16A-16B depict the first default key-value pair being changed from its default values.

FIGS. 17A-17B depict the change in the meta-data and documentation nodes, that result from changing the first key-value pair to non-default values.

FIG. 18 shows the changes to the GUI, resulting from the adding of a second key-value pair.

FIGS. 19A-19B illustrate the change in the meta-data and documentation nodes, that result from adding the second key-value pair.

FIGS. 21A-21B illustrate the change in the meta-data and documentation nodes, that result from adding the Enumeration node.

FIGS. 23A-23B illustrate the change in the meta-data and documentation nodes, that result from adding the Enumeration value node.

FIGS. 25A-25B illustrate the change in the meta-data and documentation nodes, that result from adding all the Enumeration value nodes.

FIGS. 27A-27B illustrate the change in the meta-data and documentation nodes, that result from adding the third key-value pair.

FIG. 28 illustrates, as a flowchart, a generalized process suitable for an Argument Editor GUI.

FIG. 29A shows initial argument-root data nodes, for an Argument Editor session.

FIGS. 29B-29C depict an initial GUI, for an Argument Editor session.

FIG. 30A shows, at the argument node level, the creation of an instance of a schedule under the "Schedules" node.

FIG. 31A shows, at the argument node level, the addition of an instance of a thermostat under the "Thermostats" node.

FIGS. 31B-31C show, in the Argument Editor GUI, the addition of an instance of a thermostat under the "Thermostats" node.

FIG. 32A shows, at the argument node level, the result of selecting a specific thermostat.

FIG. 33A shows the result, at the argument node level, of filling in a non-default data value, for a first key-value pair of schedule instance #1.

FIG. 34A shows, at the argument node level, the first half of a process, by which an enumerated value is added, in order to represent a day of the week.

FIG. 35A shows, at the argument node level, the result of the second half of a process, by which an enumerated value is set to a specific value, in order to represent a day of the week.

FIG. 36A shows, at the argument node level, the result of adding a first action instance to the list of "Actions."

FIG. 37A shows, at the argument node level, the result of setting the first action instance to non-default values.

FIG. 38A depicts a graphical, argument node level, representation of the finished argument data, for submission to the SevenDayThermostat app.

FIG. 39 depicts an example "test" function, created purely for purposes of illustrating an example use for the nullable attribute.

FIG. 40A-40C depict example meta-data for the test function, as displayed in the Meta-Data Editor.

FIG. 41A shows, in an example end-user Argument Editor screen, the advantages of using the "Nullable" attribute during app development.

FIG. 41B shows the end-user preparing to remove the "Null" setting.

FIG. 41C shows the Argument Editor with the "Null" setting having been removed.

DETAILED DESCRIPTION

Figure 1:
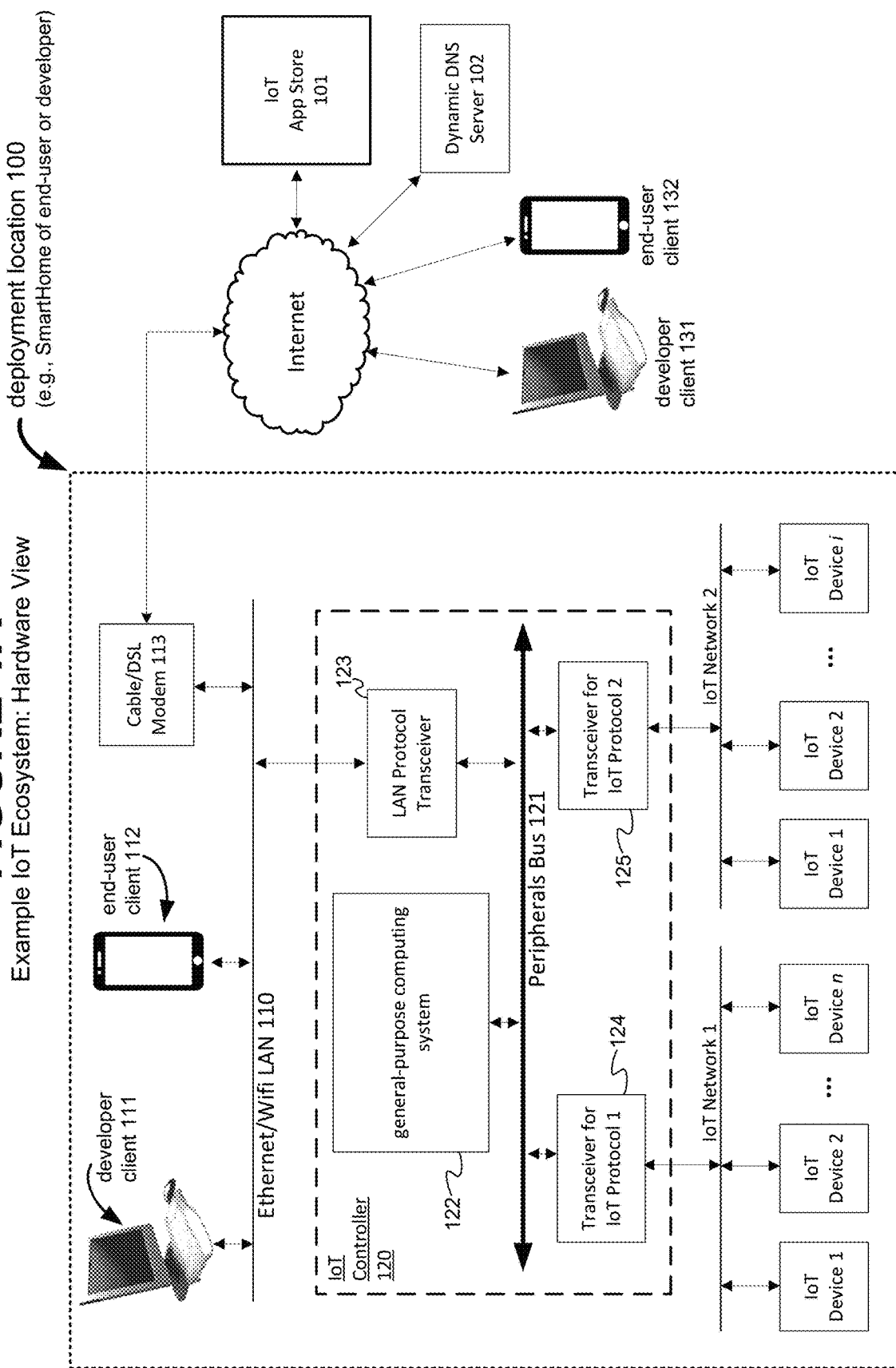
FIGS. 1A-1B present diagrams of an IoT ecosystem, from hardware and logical views.

Reference will now be made in detail to various embodiments of the invention, examples of which are illustrated in the accompanying drawings. Wherever possible, the same reference numbers will be used throughout the drawings to refer to the same or like parts.

Application software may be referred to more simply herein as "applications," or, with even more brevity, "apps."

In general, in the figures, where a node has a number enclosed in square brackets (i.e., [node-number]), it is intended to represent a reference (or pointer) to another node, in one of the other figures, that is labeled with this number. In general, the labeling of a node with a number is accomplished by either including an underlined version of the number (i.e., node-number) within the node, or by graphically attaching the number to the node.

Please refer to the section titled "Glossary of Selected Terms," for the definition of selected terms used below.

Table of Contents to Detailed Description

1 Introduction
2 An IoT App Store
3 An IoT Ecosystem
4 A Meta-Data Language
5 Meta-Data Editing or Extraction
  5.1 Presenting Meta-Data
  5.2 Creating Meta-Data
6 Argument Editor
  6.1 Overview
  6.2 Constructing an Argument
7 Attributes
8 Additional Information
  8.1 IoT Device
  8.2 Computing Equipment
9 Glossary of Selected Terms 1 Introduction To better understand the present invention, it can be useful to discuss the two main categories, into which computer systems are often divided:

Those which are viewed, by their end-users, as a general-purpose device. The standard term for this type of machine is general-purpose computer (or GPC).

Those where the end-user need not be aware of the fact that the product they are using contains a GPC. Instead of producing a product with special-purpose hardware, however, a manufacturer has opted to "embed" a GPC, where the GPC is equipped with a customizing application program and data. The standard term for this type of machine is embedded system.

While these two categories of computers have developed along relatively independent paths, IoT technology offers an opportunity where the two types of systems can be combined.

A fundamental assumption of an end-user application written for a GPC platform, so basic that it may even hard to recognize as an assumption, is that when the functionality of an application is utilized, the end-user is physically present at a GPC, or at general-purpose interfacing equipment. In other words, the end-user interacts with the application in a hardware environment that is very similar to (or possibly identical with) that in which the application was written. Because an end-user cannot be expected to spend his or her life in front of a computer or its interfacing equipment, use of application software is necessarily episodic, and a result of an end-user's volitional decision-making.

Although this fundamental assumption started when a single computer could easily consume the space of a large room, it continued to be applicable through the so-called personal computer revolution. In other words, even with desktop or laptop computers, the end-user is still expected to be physically present at a computer, or at least at general-purpose interfacing equipment, in order to use application software.

This kind of episodic and volitional use of applications continued with the introduction of smartphones. The main "revolution" of the smartphone resulted from the fact that the GPC had been made so small, the end-user could afford (from a personal space, and energy-usage perspective) to actually carry the computer with him or her, for very long periods of time (approaching, if desired, 24/7). Also, the smartphone introduced a greater difference between the GPC environment as used by a developer and the end-user's GPC hardware.

Despite these differences, the basic paradigm for application usage has remained largely unchanged with smartphones. Each application is still viewed as a separate and specialized kind of "tool," that an end-user will specifically invoke on an as-needed basis. By going back to a smartphone's home screen, from an application, the end-user is not just putting himself/herself in a position from which to launch another tool—he/she is also implicitly ending the tool that he/she was using.

Those aspects of a smartphone that need to operate continuously, such as the continuously-available home screen from which applications can be started, are generally regarded as being part of its "operating system."

In contrast, it is known that a GPC, when used as an embedded system, has a very different usage profile.

As discussed above, a defining characteristic of an embedded system is the fact that its operation is not dependent upon the end-user being aware of interacting with a general-purpose computing platform. The end-user does not need to explicitly "start" or "stop" the application software in an embedded system. The embedded GPC has been dedicated to the performance of a single application, and that application is always running (or is, at least, always available to run). As such, compared with a GPC app, an embedded system can be expected to spend an enormous proportion of its up-time simply waiting—waiting for that moment when it will need to behave as the "thing" the end-user perceives it to be.

We will refer to the application and data, that serve to adapt a GPC to become an embedded-system, as, respectively, the adaption application and adaption data.

In a conventional embedded system, the adaption application and data are created essentially one-time, by the manufacturer of the physical product being sold.

A potential revolution, offered by IoT technology, is the unbundling of embedded system design, so that a single GPC can be loaded with multiple, and changing, collections of adaption applications and data.

This post-manufacturing programmability offers at least the following advantages:
 The ability to create new physical products without new manufacturing, but from the conception of new ways in which pre-existing products can collaborate.
 The ability to create new physical products with less manufacturing, by relying on the end-user's ability for post-manufacture programmability. Thus, a new product does not necessarily need to provide all its own hardware, but can rely on an ability to interact with (or leverage) existing products, that an end-user can be expected to have or acquire.

Like the controller of a conventional embedded system, most of the applications executing on an IoT controller, constructed in accordance with the principles of the present invention, can be expected to be executing on an essentially 24/7 basis, waiting for just those few moments when its functionality may be needed.

Further, like the controller of a conventional embedded system, the end-user is expected to interact with an executing IoT app through function-specific hardware. During normal operation, an end-user should not need to be aware of the fact that, somewhere, there is a "box" (which could be a cloud-computing data center) with GPC hardware.

However, unlike a conventional manufacturer of a product, who controls the total hardware environment in which the embedded controller is to operate, the end-user of an IoT app must be able to adapt a program to his or her particular hardware.

Further, it would be desirable to go beyond providing the equivalent of the "control panel," on a conventionally manufactured product, since such controls are often difficult to learn, while still providing very limited opportunities for end-user customization.

2 An IoT App Store

The current situation with IoT technology can be compared with that for smartphone technology, prior to the introduction of "stores" for the sale of "apps." Such stores (or "App Stores") have provided a vital link, connecting developers of software to end-users. There are so many potential uses for smartphones, that it simply did not make sense for one company to attempt to create and market programs covering every situation. Also, the individual markets, for many applications, did not warrant large corporate organizations, for marketing and sales. By lowering the transaction cost by which a developer could bring an application to market, a much wider range of "tools," for potential use on a smartphone, became available.

However, when considering whether the App Store approach could be applied to the IoT situation, one necessarily encounters the following reality. The widespread distribution of smartphone application software is based upon a standardization of the hardware platforms, upon which any application must run. The two main platforms are, of course, APPLE's iOS and Google's Android operating system. These operating systems provide the programmer with a simplified and uniform model, for the resources of any phone upon which the program is to run.

In the case of IoT technology, however, such standardization and simplification is likely not possible. Given the heterogeneous nature of IoT hardware, the question becomes whether it is possible to formulate a standardized and simplified model, similar to that provided by a smartphone operating system, in order to facilitate the interchange of applications, between those who wish to develop them and those who wish to use them.

Another problem with IoT applications is how to implement the GUI, by which an end-user can select adaption programs for execution, and enter adaption data (we shall refer to a particular adaption program, running on a particular IoT controller according to particular adaption data, as a task). Smartphones have integrated input/output devices (e.g., a touchscreen) that are always available, whether an app is running or not. An IoT controller is usually not designed to include such peripherals.

A major aspect of the present invention is the provision of a kind of GUI, referred to herein as an "Argument Editor." This interface makes it easier for an end-user to adapt an IoT application, by providing an interface that is consistent, relatively simple to use, and powerfully expressive. The consistency is achieved, at least in part, by making the Argument Editor a mandatory part, of the starting of any application program that is to be run on an IoT controller. Thus, the present invention can be regarded as part of an IoT controller's operating system. While, as an alternative approach, app developers could be required to include a particular interface in their code, this would be a much more labor intensive and error-prone point, at which to try to enforce consistency.

While providing these advantages to end-users, the present invention does not make it any harder for the developer to program, and will very likely assist, by providing a framework in which to think about the program.

The basic idea of the Argument Editor consists of two main parts:
  The inclusion of one or more parameters, in the top-level call to an application program, by which it is initially invoked.
  The provision of a GUI, that makes it relatively easy for a non-technical user to craft relatively complex arguments, that are passed to an app's top-level parameters upon invocation.

Such top-level arguments (along with an end-user-selected IoT application) can act in a role similar to that of the adaption program, adaption data, or both, as found in conventional embedded systems. In fact, compared with conventional embedded system design, the design of the adaption program and data is divided into two phases:
  A first phase, undertaken by the app developer. In this phase, the app developer decides which aspects of the app should be subject to end-user adjustment, and on the format of the language by which such adjustment should be expressed. These decisions are captured by something referred to herein as the app's "meta-data."
  In general, there are three main ways in which meta-data can be created:
    The meta-data can be "manually" created by the developer, using a tool herein referred to as a "Meta-Data Editor."
    The meta-data can be algorithmically extracted from an application's source code.
    A combination of both above approaches can be used.

At the completion of this first phase, and in comparison to a conventional embedded system, the IoT app is still inchoate. It needs further information, in the form of the arguments passed to its top-level parameters, in order to transform it into something that performs a specific behavior in a specific hardware environment.

In the second phase, the end-user uses the above-introduced "Argument Editor," the operation of which is guided by the meta-data of the first phase, in order to formulate the app's top-level arguments.

While the field of computer science has developed many kinds of meta-representations for data, a key aspect of the present invention is the identification of the two following structuring techniques, as particularly useful in the context of application software for IoT controllers:
  Tree structuring of data; and
  Homogeneous lists of data.

By homogeneous list what is meant herein is an ordered list of data structures, where each item of the list meets the two following conditions:
  1. Each has the same organizational structure.
  2. All nodes that occupy a same location, relative to the organizational structure, are of the same type and (if applicable) have the same name.

These two meta-representations represent a powerful middle ground, because each has both of the following properties:
  Each enables the specification of a relatively rich and expressive set of choices, for app behavior, that the developer can provide to the end-user.
  While rich and expressive, each such structuring technique is still easily understandable by persons who do not have a programming (or any other technology) background:
    Tree structuring of data has many common-sense analogies in the everyday life of most people. The name "tree structure" itself, is derived from the fact that trees are a biological example of this structuring technique.
    Homogenous groups also have many common-sense analogies in everyday life. The expression "cookie-cutter" copying is such an analogy, since it captures the idea of creating an unbounded number of copies, all of a common type.

Further, these two meta-representations are particularly powerful when recursively combined. There are four basic types of recursive combinations:
  1. Using a tree structure within a higher-level tree structure.
  2. Using a homogeneous group as part of each member of a higher-level homogeneous group.
  3. Using a homogeneous group as part of a higher-level tree structure.
  4. Using a tree structure as part of each member of a higher-level homogeneous group.

Another important aspect of the meta-data entered by the app developer, during the above-described first phase, is the issue of documentation. Documentation of the meta-data is important for both the developer and end-user, but is particularly important for the end-user. The present invention takes advantage of the two-phase approach, by allowing the entry of documentation during the first phase that is tightly coupled with the meta-data. In particular, each node of the meta-data can be provided with a corresponding documentation node. Each documentation node is generally equipped with at least the two following fields:

Display Name: As opposed to the computer-readable name associated with a node (referred to herein as a node's "native name"), the "display name" for a node is chosen to provide maximum-understandability to the end-user, in terms of how adaption data should be entered. A display name is intended to be no more than a few words in length.

Details: This field allows the developer to enter documentation that needs to be far longer than a display name. Typically, if the "details" field is used, the documentation entered is at least one sentence in length.

By providing for documentation that is tightly coupled, it becomes relatively simple for a GUI to display such documentation in a helpful way to an end-user, during use of the Argument Editor.

In addition to being tightly coupled, it can still be useful to keep such documentation as a logically separate module. Maintaining a logical separation provides at least the two following advantages:

1. Since the documentation is separated from the meta-data, it can also be used in GUI's other than that of the Meta-Data Editor. Specifically, even after an IoT app is published by a developer, its documentation can be worked on by end-users through the Argument Interface.
2. Since the documentation can be maintained by end-users, it becomes possible for such end-users to contribute their own special skills to making an app more widely available. For example, suppose an app can have multiple documentation modules, each of which is dedicated to a different natural language. Suppose the developer of an app_1 knows only one natural language (call it "Natural Language 1"). Further, suppose an end-user knows Natural Language 1, as well as another natural language (call it "Natural Language 2"). The developer can be expected to have provided a module of documentation for app_1 dedicated to Natural Language 1. The end-user can then add another module of documentation for app_1, dedicated to Natural Language 2.

For an app written in a statically typed programming language (such as Java), its meta-data can be automatically extracted from the code. However, for an app written in a dynamically typed programming language (such as Lua), as a general proposition, meta-data describing its potential arguments cannot be completely extracted in an automated manner.

3 An IoT Ecosystem

The meta-data language of the present invention will be further introduced with respect to a specific example. However, before doing this, it will be helpful to introduce an example IoT ecosystem, through which a suitable IoT application can be located and then applied.

An example IoT ecosystem system, in accordance with principles of the present invention, is depicted in FIG. 1A. FIG. 1A depicts an example deployment location 100, such as a home, office building, or factory, where an end-user believes IoT technology could provide benefit. Within the deployment location is shown an IoT Controller 120. It forms a centralized hub, for managing one or more IoT networks, upon which operate one or more IoT devices. Specific examples of IoT networks are discussed below in the "Additional Information" section, under the subsection "IoT Device."

FIG. 1A depicts two IoT networks in use: an IoT Network 1, and IoT Network 2. For each of these IoT networks, Controller 120 is shown as having, respectively, a corresponding transceiver 124 and 125. Each of these networks is also shown as having, respectively, n and i devices deployed. Such IoT devices can serve as input devices (e.g., sensors, or switches), output devices (e.g., control power sockets, lights, or motors), or both. It is worth noting that, at least currently, most IoT network protocols are for wireless networks, although there is at least one protocol that uses powerline networking. The point of focusing on wireless connectivity is to promote easy and ubiquitous connection of devices.

Within deployment location 100 is also shown a more conventional LAN type network 110, by which Controller 120 (through its LAN Protocol Transceiver 123) obtains Internet access (in this particular example, through a cable or DSL modem 113). LAN 110 is also shown as providing connectivity for clients at the deployment location. Such clients can be for developers of IoT application software (e.g., developer client 111), end-users of IoT application software (e.g., end-user client 112), or both.

Internally, Controller 120 is depicted as containing a general-purpose computing system 122. The major subsystems of Controller 120 (e.g., subsystems 122-125) are shown as communicating with each other through a common Peripherals Bus 121.

The basic idea is that an end-user, wishing to exploit the advantages of IoT technology at his/her deployment location 100, installs a suitable application within his/her Controller 120 (and, more specifically, within general-purpose computing system 122). While shown as located at the deployment location, it can be readily appreciated that the functionality of general-purpose computing system 122 can be located off-premises. For example, such general-purpose computing can be provided by so-called "cloud" computing.

However, in order to provide an end-user with an increased level of privacy and control, it can be advantageous to use a general-purpose computing system 122 that is a dedicated hardware unit, physically located at the deployment location. The dedicated hardware unit can be, for example, a so-called "Raspberry Pi" (provided by the Raspberry Pi Foundation, a United Kingdom registered charitable organization).

Even if the desired level of privacy and control can be achieved, a cloud-based controller will still suffer from at least the following two disadvantages, both of which result from the cloud needing to operate over a wide-area network (WAN) connection to the deployment location:

Connectivity interruptions: the Internet is inherently unreliable, and connectivity interruptions can be expected to occur. Such outages are tolerable in such situations as ordinary web browsing or email communications. They become, however, wholly unacceptable, if an Internet link becomes part of the critical path for the provision of real time services and control. For example, if a cloud-based controller is controlling a heating system, in order to provide greater energy efficiency, it is not acceptable for the deployment location to lose heating, just because an Internet connection is temporarily unavailable.

Higher latency: a control loop that includes traversal of the Internet, will have an inherently greater latency than one which stays within the deployment location. For example, consider the conventional situation of an electric light wall switch, that physically opens or closes the electrical circuit powering a lighting apparatus located in the same room. A user expects the lighting apparatus to turn "on," almost instantaneously after the wall switch has been put in the "on" position. Now consider a situation where the light switch has been replaced with an IoT wall switch, and the lighting apparatus is IoT controlled. Depending upon Internet traffic, when a particular instance the IoT wall switch is put in the "on" position, there can be a very significant delay, even amounting to seconds, between the IoT switch's signal traversing the Internet, and, in response, the IoT lighting apparatus receiving, after having also traversed the Internet, an "on" signal.

FIG. 1A also depicts an IoT App Store 101. The App Store can be provided with various search facilities, by which an end-user can locate a particular IoT app, that she/he believes would be of use at his/her deployment location. The App Store can be utilized through a web interface (e.g., through a web-browser-based interface), that can be referred to herein as the "App Store end-user interface." Through this interface, an app, once located by an end-user, can be downloaded (for example) onto the end-user's client.

A next step, in being able to utilize a located app, is enabling the end-user to install and run a copy of the app on his/her IoT Controller 120. The UI, by which an end-user can accomplish installation and execution of an app, on an IoT Controller, can be referred to herein as an "IoT Controller end-user interface."

To emphasize the fact that the actions taken by the end-user can be performed at the deployment location or anywhere else, two end-user clients are shown in FIG. 1A: end-user client 112, that is located at the deployment location, and end-user client 132, that can be located anywhere else. As can be seen, end-user client 112 communicates with IoT Controller 120 through the deployment location's LAN. Alternatively, end-user client 132, with any Internet connection, can also communicate with IoT Controller 120. This type of a WAN connection can be aided through the use of a dynamic DNS server (labeled 102 in the diagram).

Prior to an end-user being able to use an App Store or IoT Controller end-user interface, at least one app must have already been made available for potential downloads (an action that we shall also refer to as "publishing"). The interface, by which an app developer publishes, can be referred to herein as an "App Store developer interface."

Regarding the design and programming of an app by a developer, this can be accomplished with an "IoT Controller developer interface." This developer's interface can include any suitable software engineering tools, such as an appropriate IDE. The developer interface also needs to allow for testing of the app, prior to it being published on the IoT App Store.

Just as was shown above for the end-user, to emphasize the fact that actions taken by a developer can be performed at the deployment location or anywhere else, two developer clients are shown in FIG. 1A: developer client 111, located at the deployment location, and developer client 131, that can be located anywhere else.

While end-user clients 112 and 132 are shown as being a smartphone, and developer clients 111 and 131 are shown as being a desktop, this does not need to be the case. An end-user client, as well as a developer client, can be any kind of general-purpose computing system.

FIG. 1B depicts a logical view of the same kind of IoT ecosystem that, in FIG. 1A, was shown from a more hardware-oriented perspective. To assist in relating the two figures, the IoT Controller is numbered 120 in both figures.

Similarly, the App Store is numbered 101 in FIGS. 1A and 1B. Differences between the two figures, however, include the following.

Rather than suggesting a particular kind of client (e.g., smartphone or desktop), or its location (e.g., at the deployment location or otherwise), FIG. 1B simply shows that, from a logical perspective, the IoT ecosystem has one or more end-user GUI's (represented by box 171) and one or more developer GUI's (represented by box 181). The end-user GUI's are used by an end-user 170, while the developer GUI's are used by a developer 180.

The above-discussed IoT Controller end-user interface and App Store end-user interface (which do not have a specific graphical representation in FIG. 1A) are represented by, respectively, bidirectional arrows 172 and 173 in FIG. 1B. Similarly, the above-discussed IoT Controller developer interface and App Store developer interface are represented by, respectively, bidirectional arrows 182 and 183 in FIG. 1B.

From a logical perspective, it does not matter what type of network is used to connect the various IoT devices to the IoT Controller. Therefore, FIG. 1B has no indication of network type, and all the IoT devices available to the IoT Controller are considered as one group, that contains a total of j devices.

Within IoT Controller 120, FIG. 1B indicates a software-engineering architecture that consists of two main parts: a Main Process (numbered 150), and an Application Engine (numbered 151). Each of these will now be further described as follows.

When an end-user submits a particular IoT app for actual execution on his/her IoT Controller, this executing instance of the app can be referred to herein as a "task." Under the software architecture of FIG. 1B, actual execution of these tasks is handled by the Application Engine. As can be seen, Application Engine 151 is depicted as currently executing a total of k tasks. For purposes of system stability and security, each of these tasks is shown as executing on its own individual sandbox.

For each IoT app an end-user wishes to execute, at least an executable copy of it must be stored on the IoT Controller. For FIG. 1B, this storage is represented by database 155 entitled "Application Storage." In addition to storing copies of the apps themselves, an IoT Controller needs to store various kinds of bookkeeping information, by which to keep track of the files in Application Storage. Storage of this kind of information is represented by database 156 entitled "Application Database."

Under one implementation, each of the GUI's and the Application Engine produce and respond to messages. Under this kind of message-passing approach, the Main Process 150 can provide a message-forwarding service. Also, the various IoT devices can communicate with the various tasks on the Application Engine by message passing. For this type of message-passing as well, the Main Process can provide message-forwarding. Also, the Main Process can include processes for managing the various IoT networks, and for determining the status of the IoT devices.

App Store 101 is depicted in FIG. 1B as being implemented with a cloud-based service provider. Three main functionalities of the App Store are depicted:

An application search engine (numbered 160), by which an end-user can search for applications that address his or her individual needs.

Storage of the applications themselves, when they had been published by a developer. Represented as database 161.

Storage of information about the available applications. Represented as database 162.

4 A Meta-Data Language

Now that an example IoT ecosystem has been presented, the above-discussed creation of app meta-data, by an app developer, can be presented in further detail. It will be useful to discuss such meta-data through an example real-world problem, that can be effectively addressed with an IoT app.

Consider the issue of regulating interior temperature, through the use of thermostats. It is well-recognized that there are substantial energy efficiencies to be obtained, by providing "smarter" control of heating and cooling. This is an issue for all kinds of interior environments, including, but not limited to: commercial, industrial, and residential. For purposes of this example, however, the focus will be on residential use.

One approach to smarter temperature control, is to provide an end-user with an interface by which to program a schedule of preferred temperature ranges. Within this kind of program, the end-user can be allowed to specify a desired temperature range on the basis of day-of-week and time-of-day.

With regard to an IoT app, it can be written to accept the following two parameters upon its initial invocation:
- A first parameter that accepts a schedule of end-user-specified temperature ranges.
- A second parameter that accepts a list of one or more thermostats, all of which are to be controlled according to the schedule provided with the first parameter.

Even before starting to program, a good programming practice is to plan out the data structure for the program's parameters. An example format for doing so is the data interchange format called JSON (Standard ECMA-404, ECMA International, Geneva, Switzerland).

Figure 2:
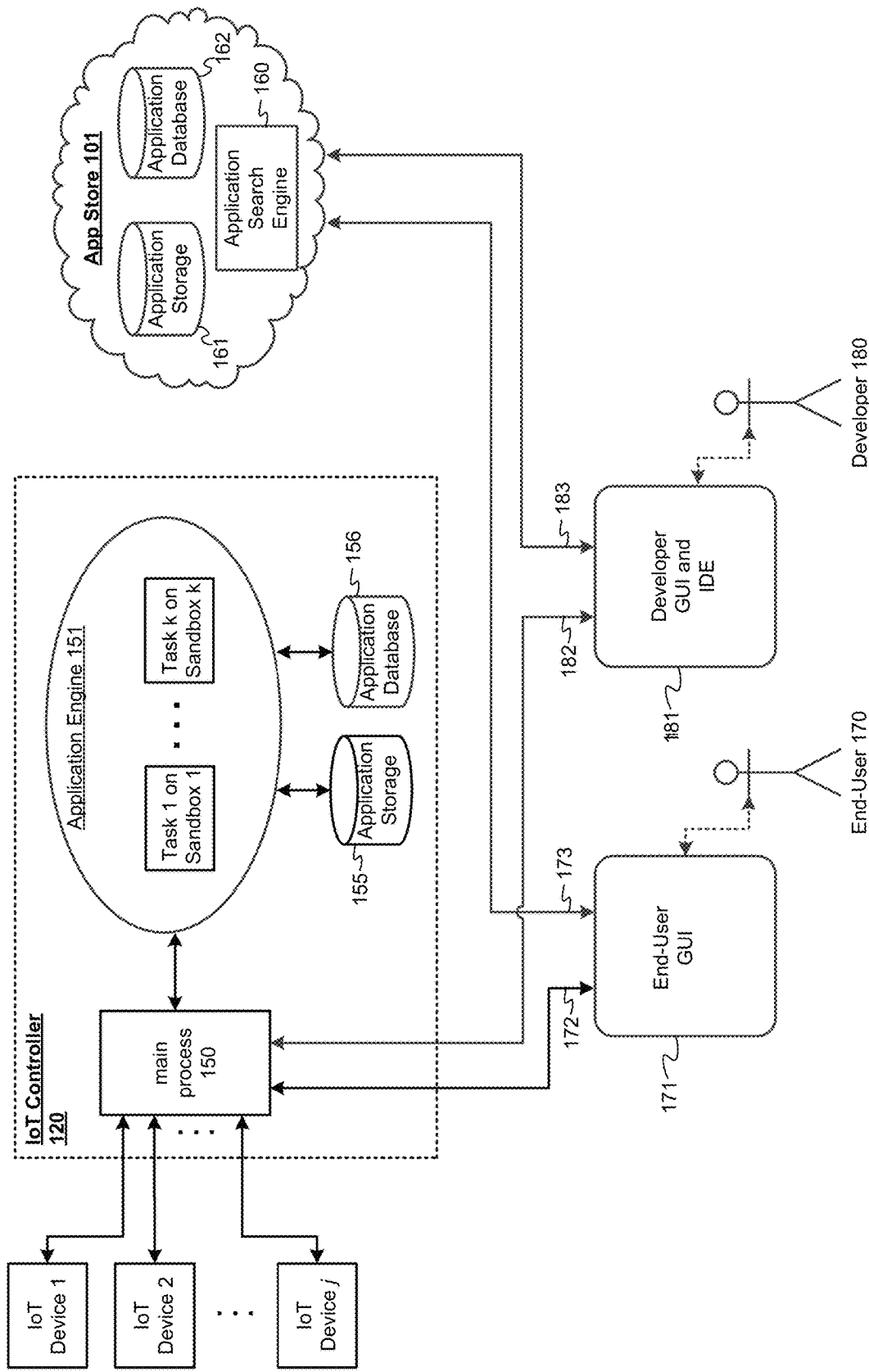
FIG. 2 presents example data in JSON, for planning an intelligent thermostat IoT app.

An example structure for these parameters, in JSON, is shown in FIG. 2. The first parameter, called "groups," begins at line 2, while the second parameter, called "thermostats," is at line 52.

Regarding first parameter, other than its "groups" name, it is an ordered list, beginning with the open square-bracket (i.e., "[") on line 2, and ending with the closing square-bracket (i.e., "]") on line 51. The list consists of two items:
- A first table of key-value pairs, that begins with the open-brace (i.e., "{") on line 3, and ends with the closing-brace (i.e., "}") at line 32.
- A second table of key-value pairs, that begins with the open-brace (i.e., "{") on line 33, and ends with the closing-brace (i.e., "}") at line 50.

As will be made clear shortly, the first and second table are each a complete schedule for the thermostats to follow. Therefore, we will refer to the first and second table as, respectively, the first and second schedules.

It can be seen that the developer has conceived of each schedule as composed of three key-value pairs, where the key names are "name," "weekdays," and "actions." For the first schedule, the locations and contents of the three values are as follows:

Line 4: The key "name" is intended to store a name for the schedule that is meaningful to the end-user. For the end-user scenario envisioned by the developer, the end-user has set the name to "Business Days," because this first schedule is intended to be the applicable heating/cooling schedule on those days when the end-user leaves his/her residence for work.

Line 5: The key "weekdays" is intended to store those days of the week to which the schedule is applicable. In this case, the developer is envisioning an end-user with a standard work week of Monday through Friday. The developer is envisioning the days of the week as being represented by an enumerated type, where each day is represented by an integer in the range 0-6. Further, for this integer range, the corresponding order of the day names is Sunday to Saturday (i.e., Sunday is represented by 0, Saturday is represented by 6). Therefore, Monday to Friday are represented by the numerals 1-5. The days selected, for which the schedule is applicable, are stored in the list of line 5.

Lines 6-31: The key "actions" is intended to store a list of the temperature ranges applicable, on the days of the week specified by "weekdays." In addition to storing a set point for heating and cooling, each temperature range stores the time of day when it becomes applicable. For the first "Business Days" schedule, the developer has envisioned four temperature ranges, each of which is a table with four key-value pairs. The locations of these four tables, and the setting of the four key-value pairs within each, are as follows:

Table at lines 7-12:
The key "actionName" (see line 8) is envisioned by the developer as being set to a name that is meaningful to the end-user. The end-user is envisioned as setting the name to "Wake," because this table is intended to represent the temperature range applicable when the end-user first awakens on a workday.
The key "time" (see line 9) is set to the time-of-day when this temperature range becomes applicable. For purposes of this planning example, the developer is envisioning an end-user who awakens at 6 AM on workdays.
The keys "heatSetPoint" and "coolSetPoint" (see lines 10-11) are set to, respectively, the desired upper and lower bounds of the temperature range represented by this table. As can be seen, the developer is envisioning an end-user who prefers to have the temperature in the 70-74° F. range while preparing to leave for work.

Table at lines 13-18:
The end-user is envisioned (see line 14) as setting the name to "Leave," because this table is intended to represent the temperature range applicable when the end-user leaves for work.
The end-user is envisioned (see line 15) as leaving for work at 8 AM.
While away at work, the developer is envisioning an end-user who is able to keep his/her residential temperature in the less expensive range of 64-80° F. (see line 16-17).

Table at lines 19-24:
The end-user is envisioned (see line 20) as setting the name to "Back," because this table is intended to represent the temperature range applicable when the end-user returns from work.
The end-user is envisioned (see line 21) as returning from work at 6 PM.
When back at home in the evening, the developer is envisioning an end-user who prefers to have temperature in the 70-74° F. range.

Table at lines 25-30:
  The end-user is envisioned (see line 26) as setting the name to "Sleep," because this table is intended to represent the temperature range applicable when the end-user is sleeping.
  The end user is envisioned (see line 27) as going to sleep at 10 PM.
  While sleeping, the developer is envisioning an end-user who finds the less expensive temperature range, of 68-72° F., either preferable or, because it is less expensive, acceptable.

As can be seen, the second schedule has the same structure as the first, but with two differences:
  Wherever a primitive data value is required, it is often different between corresponding locations in the two schedules. For example, the value, for the first key-value pair of each schedule, is set with a name that is meaningful to the end-user. As discussed above, for the first schedule the name given to the schedule is "Business Days" (line 4), while for the second schedule the name given to the schedule is "Weekends" (line 34). This is because the second schedule is meant to specify acceptable temperature ranges for those days when the envisioned end-user is not working. Similarly, while the first schedule specifies the days of the week to which it is applicable as being the list of integers from 1 to 5 (line 5), the second schedule specifies the applicable days of the week by the list of integers 0 and 6. As was discussed above, these integers are assigned as part of an enumeration type, where the integers 0-6 correspond to the days Sunday-Saturday. Therefore, 0 corresponds to Sunday and 6 corresponds to Saturday.
  Wherever a list of items is required, the number of items included is often different, between corresponding lists in the two schedules. This is true, for example, for the enumeration example just discussed. In that case, of course, for the first schedule the list entitled "weekdays" contains five items, while for a second schedule the "weekends" list contains only two items. Also, while the "actions" list of the first schedule specifies four temperature ranges, the "actions" list for the second schedule specifies only the following two temperature ranges:

Table at lines 37-42:
  The end-user is envisioned (see line 38) as setting the name to "Wake," because this table is intended to represent the temperature range applicable when the end-user wakes-up.
  The end user is envisioned as awakening (see line 39) at 7 AM (which is somewhat later than on a business day).
  While at home, the developer is envisioning an end-user who prefers to have temperature in the 70-74° F. range.

Table at lines 43-48:
  The end-user is envisioned (see line 44) as setting the name to "Sleep," because this table is intended to represent the temperature range applicable when the end-user goes to sleep on the weekend.
  The end-user is envisioned as going to sleep (see line 45) at 11 PM (which is somewhat later than on a business day).
  While asleep, the end-user has specified the same temperature range applicable on a working week night (68-72° F.).

The second schedule only specifies two temperature ranges, because it cannot be known, in advance, the times of day during the weekend when the end-user will not be at home.

Regarding the planned second parameter (of line 52), other than its "thermostats" name, it is shown in FIG. 2 as an ordered list of the following numbers: 103, and 115. Each of these numbers is assumed to identify an IoT-controllable thermostat in the end-user's IoT system. Thus, thermostat 103 and thermostat 115 receive, in parallel, the same set of commands as produced by the two schedules.

At this point in the planning process, for creating an IoT app that provides smart thermostat control, the developer should have a good idea of the structuring desired, for data passed as an argument to each of the first and second parameters. This understanding, however, is not formalized, and therefore cannot act as an automated basis for guiding the future creation of arguments by an end-user.

Figure 3:
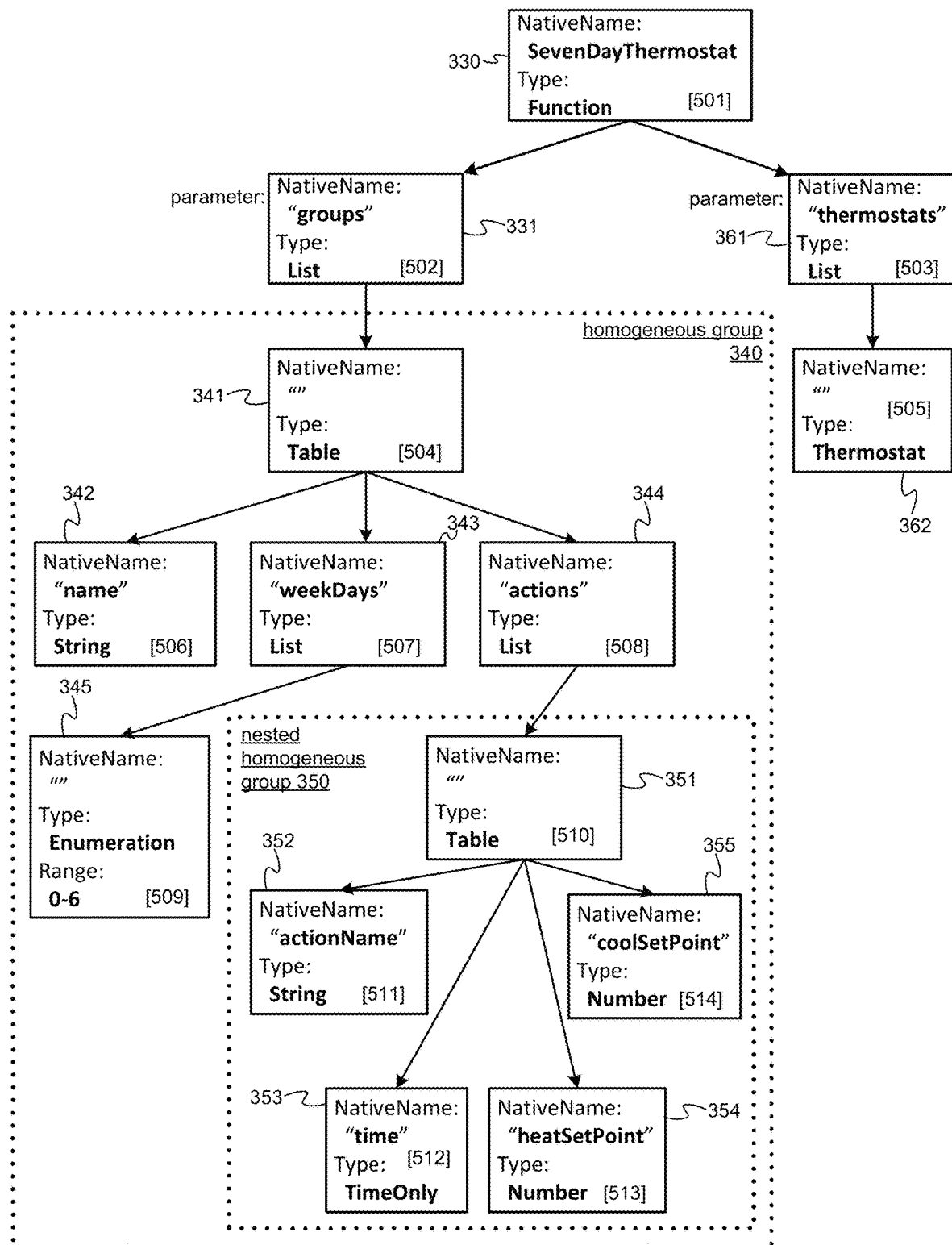
FIG. 3 depicts example meta-data, for describing the set of valid inputs to an intelligent thermostat IoT app.

What is needed is some kind of formalized meta-language, by which to specify the set of all potential arguments that are properly-structured. FIG. 3 provides just such a formal specification for the smart thermostat example of FIG. 2. As a particular utilization of the meta-language, it is referred to herein as an example of meta-data.

FIG. 3 presents a tree structure, where each node has at least the following two fields:
  NativeName: specifies a name that is to be used in (or by) the app's actual code when written.
  Type: the type of data representation a node provides. The types of a node fit into two main categories:
    Leaf node or "primitive": A node that represents, at least with respect to the programming of the app to which it relates, a primitive data type. This category can include any of the built-in data types that programmers have come to generally expect in a programming language (e.g., Numbers and Strings).
    Relative: A node whose type depends upon its relationship with its immediate child nodes.

The two relative types of primary interest are presented in the following list. They correspond to the two above-discussed meta-structures for data, that provide a powerful middle ground between expressiveness and understandability:
  Table: Permits the tree structuring of data.
  List: Permits the definition of homogenous lists of data.

For the remainder of this section, FIG. 3 is used as a vehicle for presenting the meta-language in which it is described. In the following section, a presentation is made of techniques by which meta-data can be interactively created through a GUI (a Meta-Data Editor), automatically extracted, or a combination of both.

Regarding the top-level node 330 of FIG. 3, it specifies the name of the top-level function, that is invoked upon initially calling the app: SevenDayThermostat. Its two child nodes, 331 and 361, are each marked with the extra "parameter" attribute, since each is a root node for a parameter of SevenDayThermostat.

Parameter node 331 forms the head of a homogenous list called "groups," that corresponds to line 2 of FIG. 2. To emphasize that the data structuring is homogeneous across all members of the "groups" list, dotted outline 340 has been added to FIG. 3. Each of the first and second schedules discussed above, for FIG. 2, correspond to an instantiation of all the data structuring within dotted outline 340.

As can be seen, each instance of the "groups" list is structured, at its highest level, by node 341. Node 341 is of type Table, and consists of the three key-value pairs represented by nodes 342, 343, and 344. An example of this for the first schedule, discussed above with respect to FIG. 2, are the key-value pairs beginning at, respectively, lines 4, 5, and 6. As can be seen, the NativeName, for each of nodes 342, 343, and 344, corresponds to the key of the corresponding key-value pair in FIG. 2.

Each of nodes 343 and 344 is of type "List." For node 343, each list item is a simple enumeration value (represented by node 345). Node 344, however, heads another homogeneous group, enclosed within dotted outline 350. Homogeneous group 350 is recursively nested, within each member of homogeneous group 340. Each member of homogeneous group 350 represents, with respect to FIG. 2, a temperature range. As was discussed above with respect to FIG. 2, for each of the first and second schedules, there is nested within it a list of temperature ranges. For example, with respect to the first schedule of FIG. 2, the four temperature ranges begin on lines 7, 13, 19, and 25.

Parameter node 361 heads a list called "thermostats," that corresponds to line 52 of FIG. 2. Each thermostat is regarded as an instance of a primitive data type, called "Thermostat." This permits the "thermostats" list to be quite simple, and there is no need, for example, for the use of a more complex relative Type, in the formation of this homogeneous group.

With regard to meta-data, it is worth emphasizing the following points regarding lists:

For any particular list, there is only one node of type "List," and it is the node that forms the head or entry point for accessing the list.

To ensure a list of homogeneous items, the head node of the list can have only one direct child.

The direct child of a list's head node does not have a Native Name. This is because instances of the list, when created at "runtime" (i.e., when an end-user is actually creating an argument in the Argument Editor), are homogeneous. Each item in the list is therefore more appropriately accessed by an index number, rather than by name.

Of the two relative types, FIG. 3 contains all four of the basic recursive combinations:

1. Using a tabular structure within a higher-level tabular structure. For example, the table represented by node 351 is nested within the higher-level table represented by node 341.
2. Using a homogeneous list as part of each member of a higher-level homogeneous list. For example, the list represented by node 344 is nested within the higher-level list represented by node 331.
3. Using a homogeneous list as part of a higher-level tabular structure. For example, the list represented by node 344 is nested within the table represented by node 341.
4. Using a tabular structure as part of each member of a higher-level homogeneous list. For example, the table represented by node 341 is nested within the list represented by node 331.

5 Meta-Data Editing or Extraction

Having discussed the meta-data language generally, it will now be useful to present an example GUI for its presentation, and then specific processes by which meta-data can be created.

5.1 Presenting Meta-Data

Figure 4B:
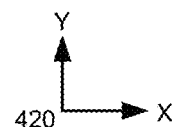

FIG. 4A depicts a view of the same meta-data of FIG. 3, except it is shown through an example GUI (there is also the difference that FIG. 4A includes some documentation of the meta-data, through the inclusion of "Display Names," but this will soon be discussed). FIG. 4B depicts the same GUI as FIG. 4A, except the three main columns, into which the GUI is divided, are identified by dotted lines and numbering. Traveling from right to left, along the X axis (see pair of X-Y axes 420, at the bottom of FIG. 4B), the columns are:

410, labeled at the top "Native Name,"
    411, labeled at the top "Type," and
    412, labeled at the top "Display Name."

Columns 410 and 411 present, on a line-by-line basis, the NativeName and Type information, shown with each node of FIG. 3. Traversing each line of FIG. 4B from the top (i.e., line with "SevenDayThermostat" in Native Name column 410) to bottom (i.e., line with "Thermostat" in Type column 411), along the Y axis, corresponds to a depth-first traversal of the nodes of FIG. 3.

Column 412 presents information not previously discussed with respect to FIG. 3. Each line of column 412 presents a "display name," in the natural language English, for the node of FIG. 3 identified in columns 410 and 411. Within column 412, a display name's indentation, along the X axis, is indicative of its level, within the meta-data tree it represents. The closer a display name is, to the left side of column 412, the higher its hierarchical position.

Figure 4C:
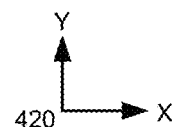

FIG. 4C is the same as FIG. 4B, except that certain display names of column 412 are labeled with the node number it represents in FIG. 3. As can be seen, for example, nodes 331 and 361 of FIG. 3 are represented by, respectively, display names "Schedules" and "Thermostats" in FIG. 4C.

FIG. 5A presents a set of documentation nodes 500, that document the meta-data of FIG. 3 for the natural language English. A set of documentation nodes that documents a meta-data structure, for a particular natural language, can be referred to herein as a "module." Therefore, 500 is the English-language module for the meta-data of FIG. 3. In particular, 500 contains 14 documentation nodes, numbered 501-514, where each corresponds to one of the 14 nodes of FIG. 3. The ordering of documentation nodes, in a module, is irrelevant. Purely for purposes of graphical convenience, traversing the documentation nodes in order of increasing node number, from 501-514, corresponds to a breath-first traversal of the meta-data nodes of FIG. 3.

For each node of the meta-data, its corresponding documentation node can be found as follows: each meta-data node has a pointer (shown in square brackets) to its corresponding documentation node. For example, for meta-data node 331, its pointer can be followed to documentation node 502 of FIG. 5A, where the DisplayName "Schedules" is found. Similarly, for meta-data node 361, its pointer can be followed to documentation node 503 of FIG. 5A, where the DisplayName "Thermostats" is found. Conversely, each documentation node has a pointer back to its corresponding meta-data node. For example, in addition to having fields named "DisplayName" and "Details," each document node has a field "MetaDataNode." For nodes 502 and 503, for example, each has a meta-data pointer to, respectively, nodes 331 and 361.

Figure 5B:
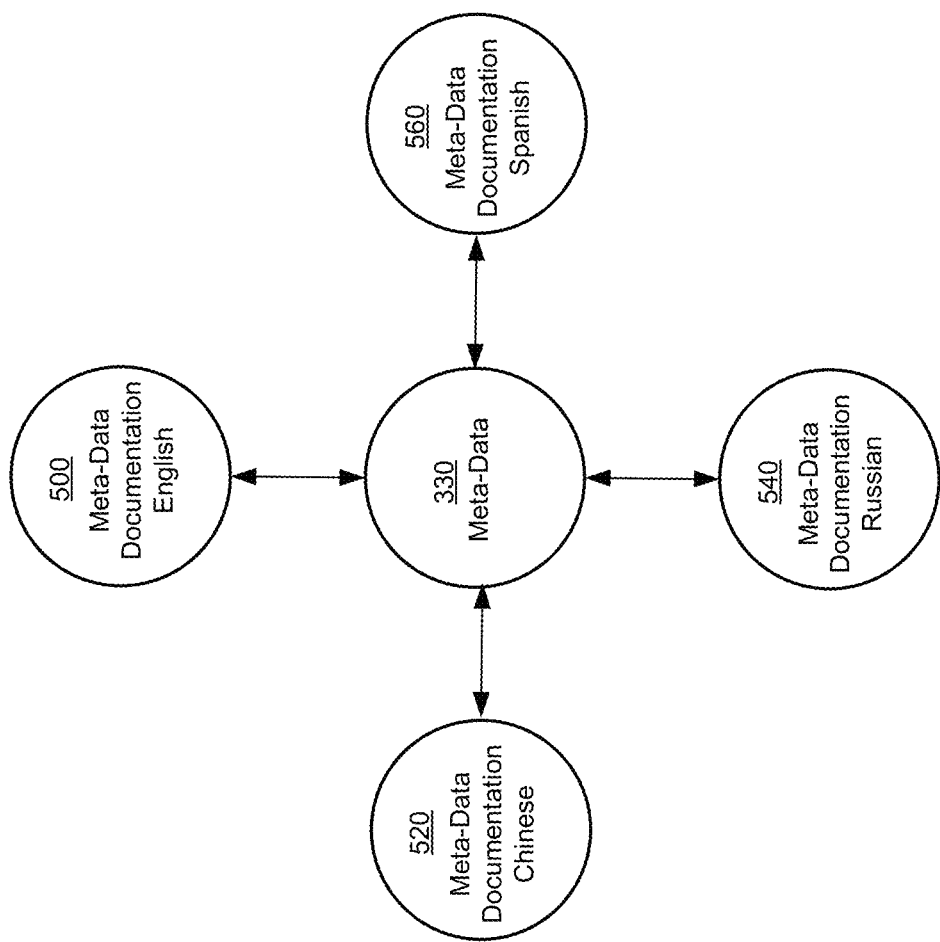
FIG. 5B depicts the fact that meta-data of FIG. 3 could also have documentation modules for Chinese, Russian, and Spanish.

Organizing the documentation nodes for a particular natural language into a single module, dedicated to that natural language, permits a single meta-data structure to be conveniently documented in multiple natural languages, using a "star" configuration. For example, FIG. 5B represents the complete meta-data of FIG. 3 with the single circle labeled 330 (since 330 is the root node of FIG. 3). FIG. 5B represents the English module of FIG. 5A by a single circle labeled 500. The fact of their being pointers, from the meta-data to the English documentation, and from the English documentation to the meta-data, is represented by the bidirectional arrow between circles 330 and 500.

FIG. 5B depicts the fact that meta-data 330 could also have documentation modules for Chinese, Russian, and Spanish. Each of these natural languages is represented by, respectively, circles 520, 540, and 560. FIG. 6A depicts an example of how a GUI view can change, when the language module is changed from English to Chinese. FIG. 6B is the same as FIG. 6A, except dotted lines and labeling have been added. As can be seen, FIG. 6B is the same as FIG. 4C, except the natural language used has been changed from English to Chinese. Specifically:

Columns 412, 411, and 410 of FIG. 4C correspond to, respectively, columns 612, 611, and 610 of FIG. 6B.

Column 612 of FIG. 6B depicts the same display names as shown in column 412 of FIG. 4C, except they have been translated into Chinese with a Chinese documentation module for the meta-data of FIG. 3. For example, the display names for meta-data nodes 331 and 361, indicated as "Schedules" and "Thermostats" in FIG. 4C, have their Chinese language equivalents indicated in FIG. 6B.

A graphical pane for the display of "details" information is not shown in either FIG. 4C or 6B. However, each details field, for any of the Chinese display names of FIG. 6B, can contain a translation into Chinese, of the English for the corresponding details field of FIG. 4C.

It is worth noting that there are other aspects of the GUI as shown in FIG. 6B, that are still not translated into Chinese:

The column names remain in English ("Display Name," "Type," and "Native Name") for both of FIG. 4C and FIG. 6B.

The data-type names, of column 411 of FIG. 4C and column 611 of FIG. 6B, remain in English.

The native names of column 610 of FIG. 6B remain unchanged from column 410 of FIG. 4C.

The column and data-type names are examples of graphical user interface that is independent of any particular application. Therefore their translation, if provided, would typically not be accomplished by the IoT app developer or end-user. These are lower-level changes, that would typically be made by the tool provider (i.e., the provider of the Meta-Data Editor and Argument Editor).

It is worth noting that the set of column and data-type names, in comparison to display names or the details fields, represent a small and fixed set of terms. Therefore, for the tool provider, it represents a set that could be translated relatively easily into a wide variety of languages. Conversely, it would be possible for an end-user to learn the column and data-type names, even if expressed in a language unfamiliar to him/her.

The native names remain in English because they are a direct copy of the actual symbol names used in the code of the app as written by the developer.

5.2 Creating Meta-Data

Now that the meta-data of FIG. 3 has been presented, and a GUI view of it has been explained, it will be useful to present example steps, by which the meta-data of FIG. 3 can be created. The purpose of the meta-data is to serve as an accurate guide, according to which an end-user can subsequently enter actual data. As long as the data created conforms to the meta-data, the end-user has the security of knowing that the data he/she submits is in conformance with the rules of the he/she app has chosen to use. As mentioned above, there are three ways in which such meta-data can be created:

The meta-data can be "manually" created by the developer, using an interactive GUI-based tool, herein referred to as a "Meta-Data Editor."

The meta-data can be algorithmically extracted from an application's source code.

A combination of both above approaches can be used.

If the "manual" approach is chosen, the meta-data can be created even before any of the app's actual code has been written. All that is necessary is that the developer have a completely correct understanding of how the app will process its parameters, once the app is written.

As mentioned above, for an app written in a statically typed programming language (such as Java), its meta-data can be automatically extracted from the code. This is because the permissible data structures, that can be assigned to a variable, must be explicitly declared before program execution begins. Therefore, using a process known to software engineers as "reflection," that structure can be determined, and converted into meta-data form, in an automated manner.

However (as was also mentioned above), for an app written in a dynamically typed programming language (such as Lua), as a general proposition, meta-data describing its potential arguments cannot be completely extracted in an automated manner. This is because, conversely, the permissible data structures, that can be assigned to a variable, do not need to be explicitly declared before program execution begins.

As an example of the completely manual approach to meta-data creation, FIG. 7 depicts a function for the smart thermostat (called "SevenDayThermostat") written in the Lua programming language. As can be seen, this version of the function is completely empty of actual code. It is basically just a declaration that there will be a function with a certain name ("SevenDayThermostat"), and that it will have two parameters in a certain order, with each parameter having a particular name ("groups" and "thermostats").

In contrast, FIG. 8A depicts the same function fully implemented in detailed Lua code. FIGS. 8B-8D depict additional Lua functions, that are utilized by the function of FIG. 8A.

Starting either way, with either an empty function or a fully-coded function, the following step-by-step approach, to creating the meta-data of FIG. 3 through the GUI of FIG. 4A, can be used. This example will be explained in conjunction with the flowchart of FIG. 9, which provides a generalized process for a suitable GUI.

FIG. 9 begins with step 900, which is responsible for doing an initialization of all nodes representing a parameter, as soon as the Meta-Data Editor is started with respect to a particular function.

Next, the flowchart of FIG. 9 waits at step 901, until the GUI, while indicated at a particular node (referred to in the flowchart as the "current node"), receives a signal indicative of a User Request. Indication of a node can be reflected in a GUI by, for example, presenting a darkened "band" of color, across the entire line of the GUI representative of the node. A User Request can then be signaled by an input that unambiguously specifies an action to be taken, with respect to the current node. A User Request can be signaled, for example, by entering a mouse click (or mouse double-click) while the mouse pointer is directed at an appropriate screen region.

Once a User Request has been signaled, the basic structure of FIG. 9 is as follows. There are six main decision points, numbered as follows: 910, 920, 930, 940, 950, and 960. Each of these decision points is tested in sequence. For the first one to test positive, its corresponding action is taken, and then the flowchart returns to step 901. If none of the decision points test positive, then the process simply returns to step 901, where it waits for a subsequent User Request.

FIG. 10A depicts an example initial screen, by which the meta-data creation process can begin. As can be seen, the process begins by initializing each parameter, of the SevenDayThermostat app, to be of type Number. Also, the default display name is the same as the native name, except that capitalization, if not already present in the native name, is added. FIGS. 11A and 11B depict, respectively, the corresponding meta-data and documentation nodes, for producing the GUI view of FIG. 10A. Producing FIG. 10A corresponds to executing step 900 of FIG. 9.

Figure 10B:
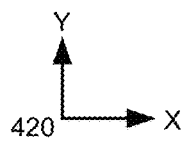
FIG. 10B depicts changing the Display Name for "SevenDayThermostat" to "QW: 7 Day Thermostat."
Figure 11A:
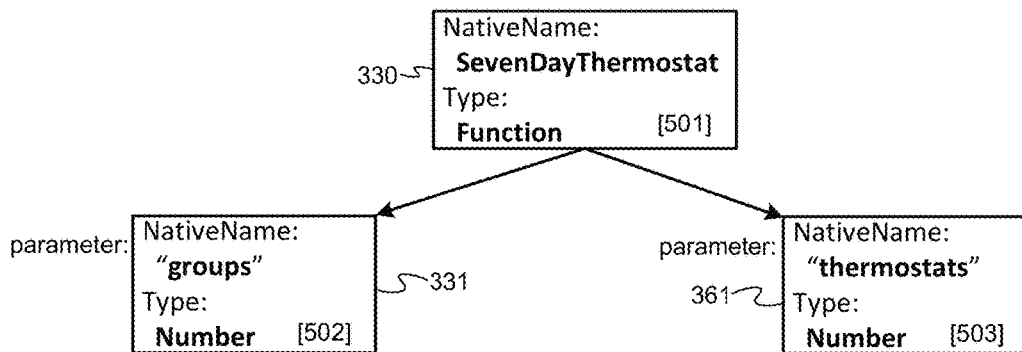
FIGS. 11A and 11B depict, respectively, the corresponding meta-data and documentation nodes, for producing the GUI view of FIG. 10A.
Figure 11B:
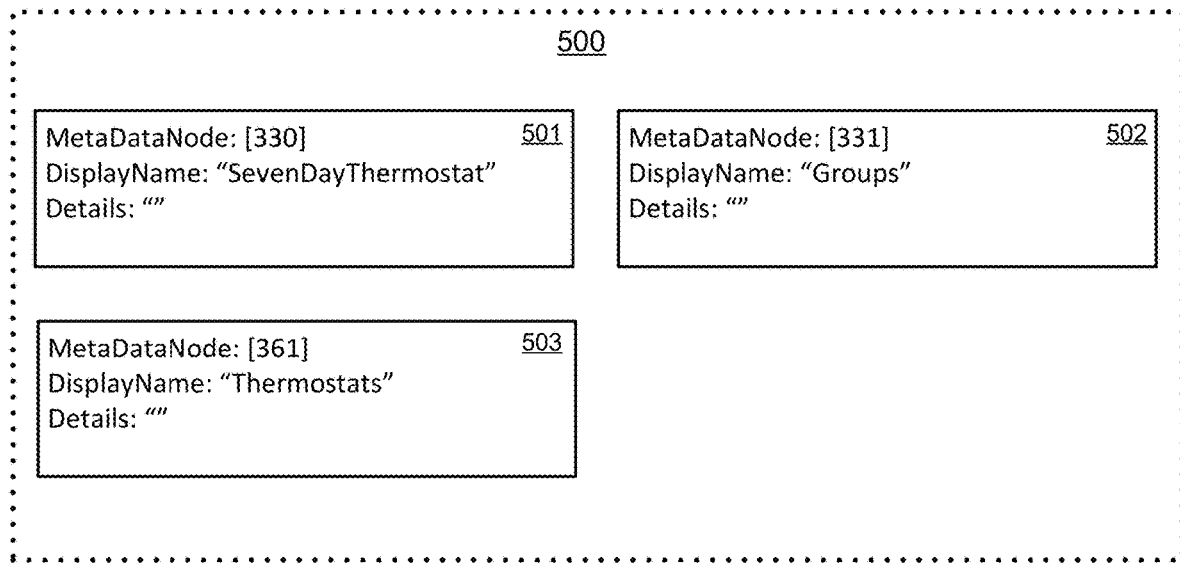

FIG. 10B depicts changing the Display Name for "SevenDayThermostat" to "QW: 7 Day Thermostat" at the screen region indicated by arrow 1010. FIG. 10B also shows entering a Details sentence at the screen region indicated by arrow 1011.

Regarding the flowchart of FIG. 9, we assume (as mentioned above) the process is at step 901, waiting for the signaling of a User Request, while the GUI is directed at a particular node (called the "current node" in the flowchart) of the meta-data. For this GUI, the current node is indicated by the Y-axis location of a darkened horizontal band, parallel to the X-axis (see pair of X-Y axes 420).

For FIG. 10B, it can be seen that the current node is the node with Native Name "SevenDayThermostat" (numbered 330 in FIG. 11A), since the darkened horizontal band is at the Y-axis location indicated by region 1010. The submission of a User Request can be signaled by, for example, the developer entering a mouse double-click, while the mouse-pointer is hovering over a Display Name.

Exiting step 901, the first test performed by the flowchart of FIG. 9 is step 910. Since the User Request is to change a Display Name, step 910 tests in the affirmative, and therefore step 911 is executed. After the execution of step 911, the process returns to waiting, for a next User Request, at step 901.

While node 330 is still indicated, its Details field can be edited by the developer entering a single mouse click, while the mouse pointer is hovering over the Details pane. This once again causes the flowchart to exit step 901, and decision point 910 once again test positive. Therefore, the entered information is added to the Details field in accordance with step 911. The entering of Details information is shown in FIG. 10B, at screen location 1011.

Figure 10C:
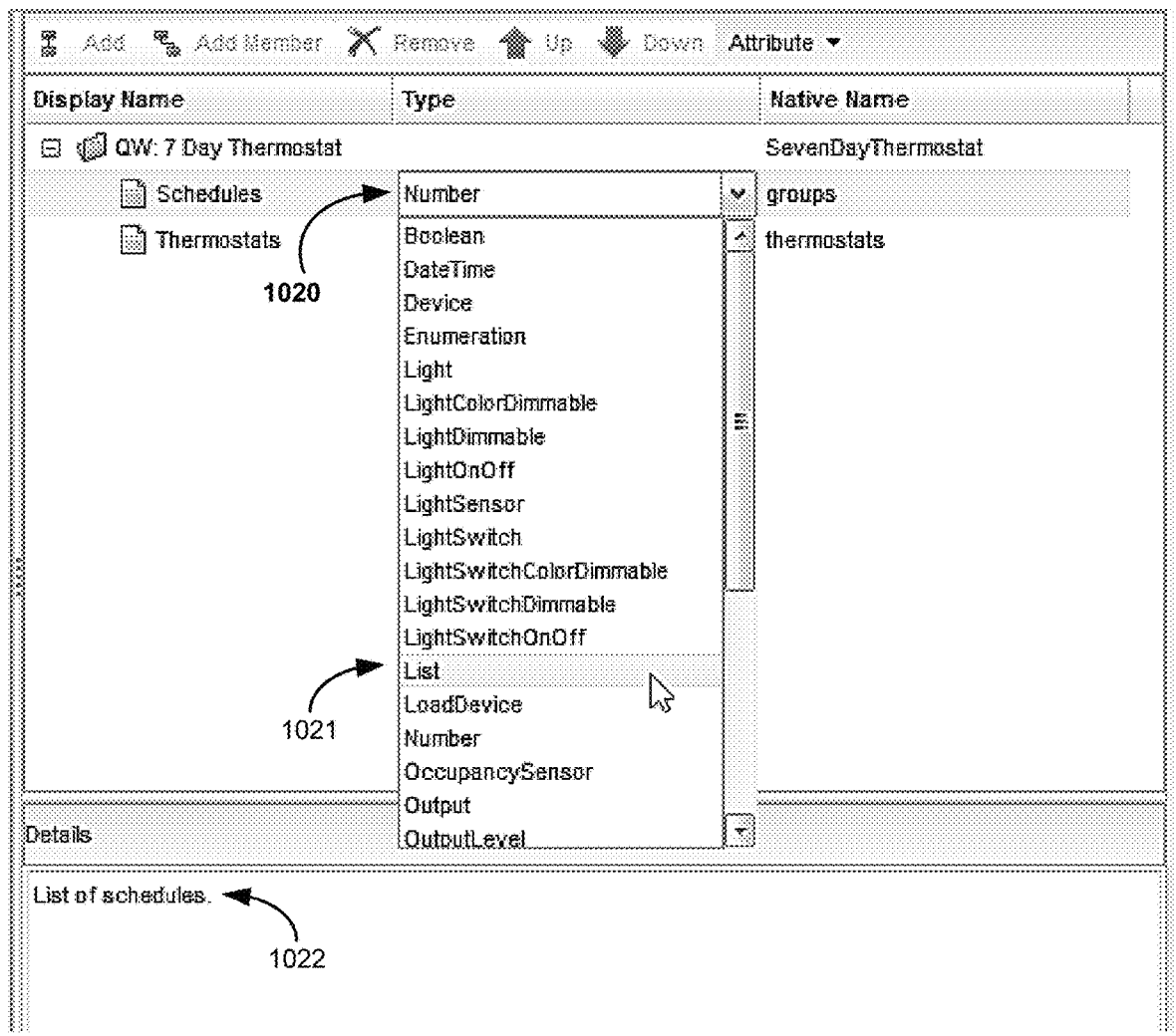
FIG. 10C depicts the node with native name "groups" being indicated as the current node, selection of the "List" type with a drop-down menu, and Details information being added.

FIG. 10C depicts the node with native name "groups" (corresponding to node 331 in FIG. 11A) being indicated as the current node (by the darkened band at Y-axis location 1020). A mouse double-click at screen region 1020 serves as a User Request, causing the flowchart to exit step 901. Decision point 910 is not satisfied, but decision point 920 is satisfied, and so step 921 is executed. This execution of step 921 can cause a drop-down menu, such as the one of FIG. 10C, to appear.

As can be seen, the developer is shown as having positioned his/her mouse pointer for selection of the "List" type, at screen location 1021. Step 921 will, if necessary, recursively remove all child nodes (if such removal is indicated by the Type-change requested by the developer). In this case, since the previous type for node 331 was a primitive type (i.e., Number), there were no child nodes to which this recursive removal could be applicable.

FIG. 10C also shows Details information being added to node 331 at screen location 1022. The changing of Details information, with respect to FIG. 9, has already been discussed above.

Figure 10D:
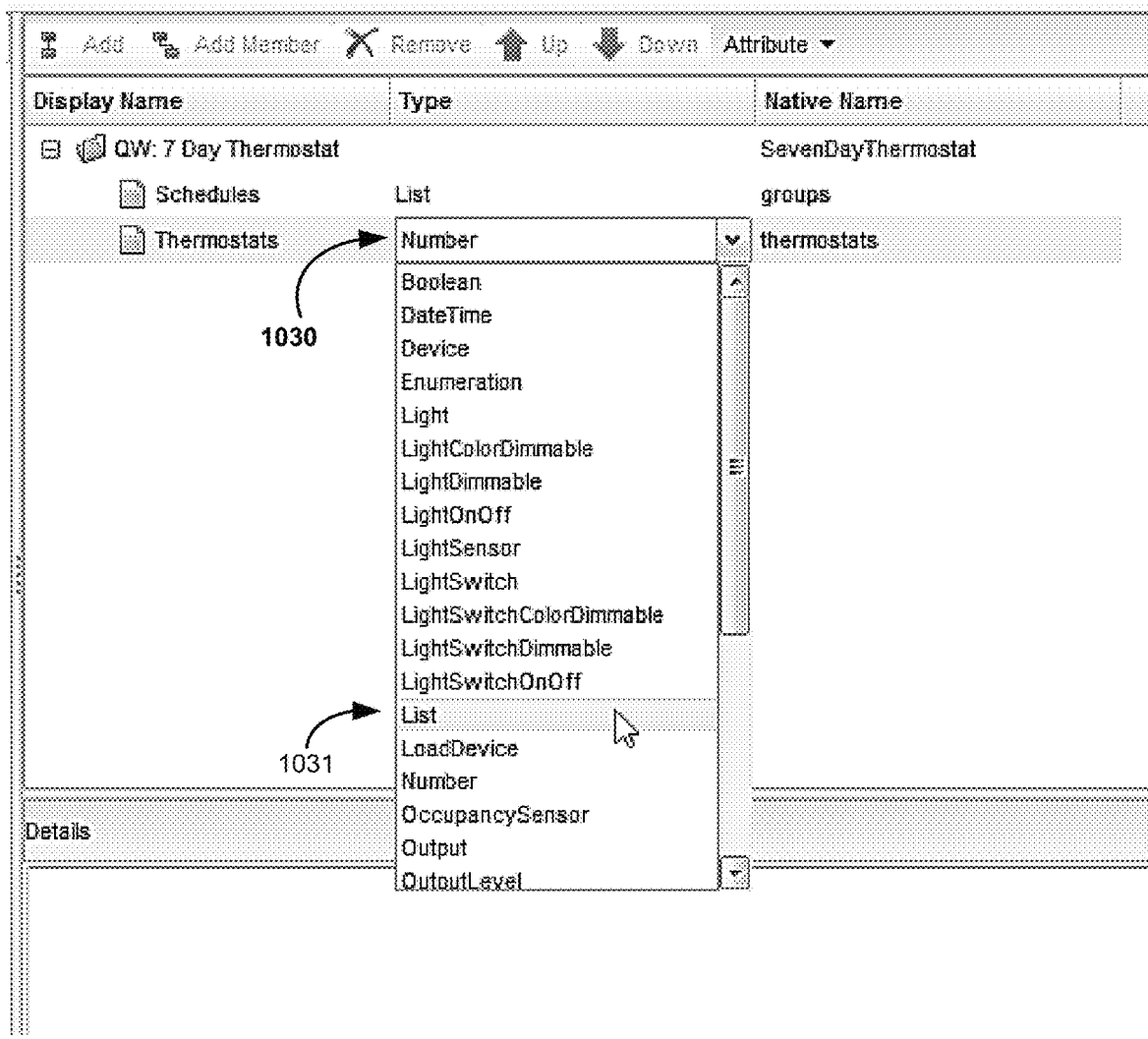
FIG. 10D depicts the same kind of node Type change, presented with FIG. 10C, except the change is being applied to the node with native name "thermostats."

FIG. 10D depicts the same kind of node Type change, just discussed with respect to FIG. 10C, except the change is being applied to the node with native name "thermostats" (corresponding to node 361 in FIG. 11A). The change of node type can be initiated by a mouse double-click at screen region 1030. The developer is shown as having positioned his/her mouse pointer, for selection of the "List" type, at screen region 1031.

Figure 11C:
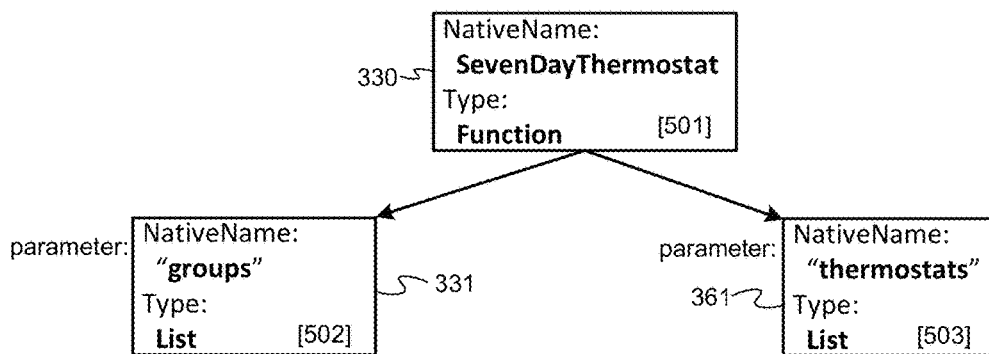
FIGS. 11C-11D show the net result, in terms of the underlying meta-data and documentation nodes, from the user-inputs shown in FIGS. 10B-10D.
Figure 11D:
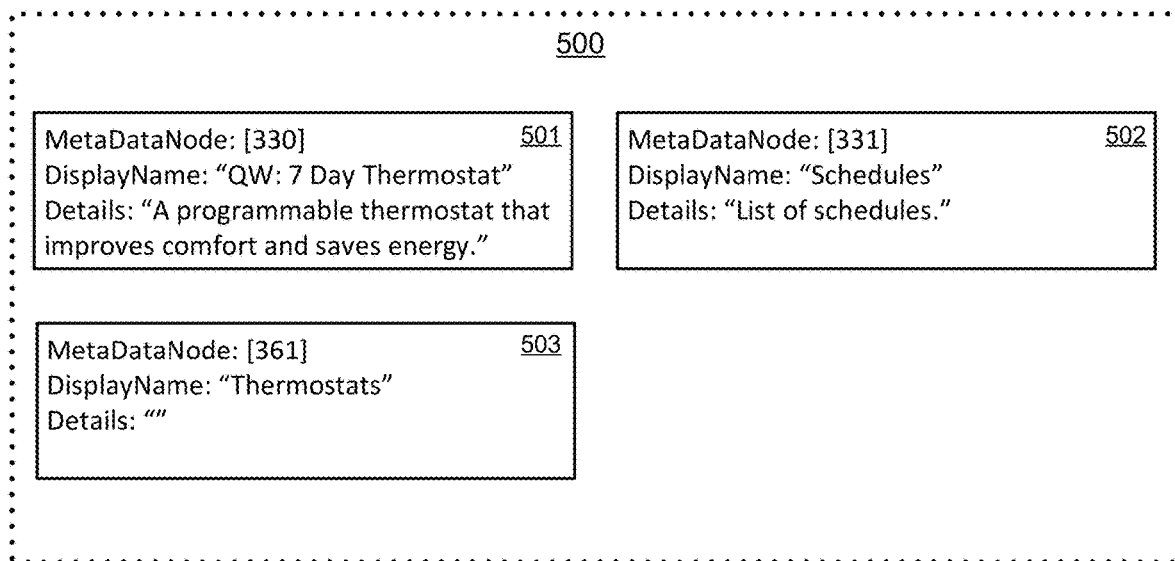

The net result, in terms of the underlying meta-data and documentation nodes, from the user-inputs shown in FIGS. 10B-10D, is shown in FIGS. 11C-11D. Comparing FIG. 11A to FIG. 11C, one can see that for each of nodes 331 and 361, its type is changed from "Number" to "List." Comparing FIG. 11B to FIG. 11D, one can see that for each of the documentation nodes the following changes were made:

Node 501: display name changed from "SevenDayThermostat" to "QW: 7 Day Thermostat," and Details is changed from the empty string to "A programmable thermostat that improves comfort and saves energy."

Node 502: display name changed from "Groups" to "Schedules," and Details is changed from the empty string to "List of schedules."

Node 503: no changes.

FIG. 12A shows the beginning of a next-lower level of hierarchy. Node 331 is indicated as the "current node" by the fact of it having darkened band 1210. FIG. 12A also shows, as an action subsequent to the indication, a child node being added by the "pushing" of the "Add Member" button. The "Add Member" button is indicated in FIG. 12A by dotted outline 1211.

FIG. 12B shows the result after the "Add Member" button has been pushed. FIG. 12B shows that a child node of type Number has been added, at screen region 1220. In terms of the flow chart of FIG. 9, this action is accomplished as follows.

The pressing of the "Add Member" button constitutes a User Request, that causes the process to exit step 901. Decision points 910 and 920 are not satisfied, but decision point 930 does test in the affirmative. Therefore, decision point 931 tests for whether the current node is of type "List." Since the current node (node 331) is a list, decision point 933 is tested next. Decision point 933 is particularly important, because it acts to limit a "List" type node to having at most one child node. It is this limitation, to a single child node, that makes the lists homogeneous.

Since the current node does not already have children, decision point 933 tests in the negative, leading to the performance of step 934. As can be seen, the new child added by step 934 is always, by default, of type "Number," unless the new node is to be an enumeration value.

Figure 12C:
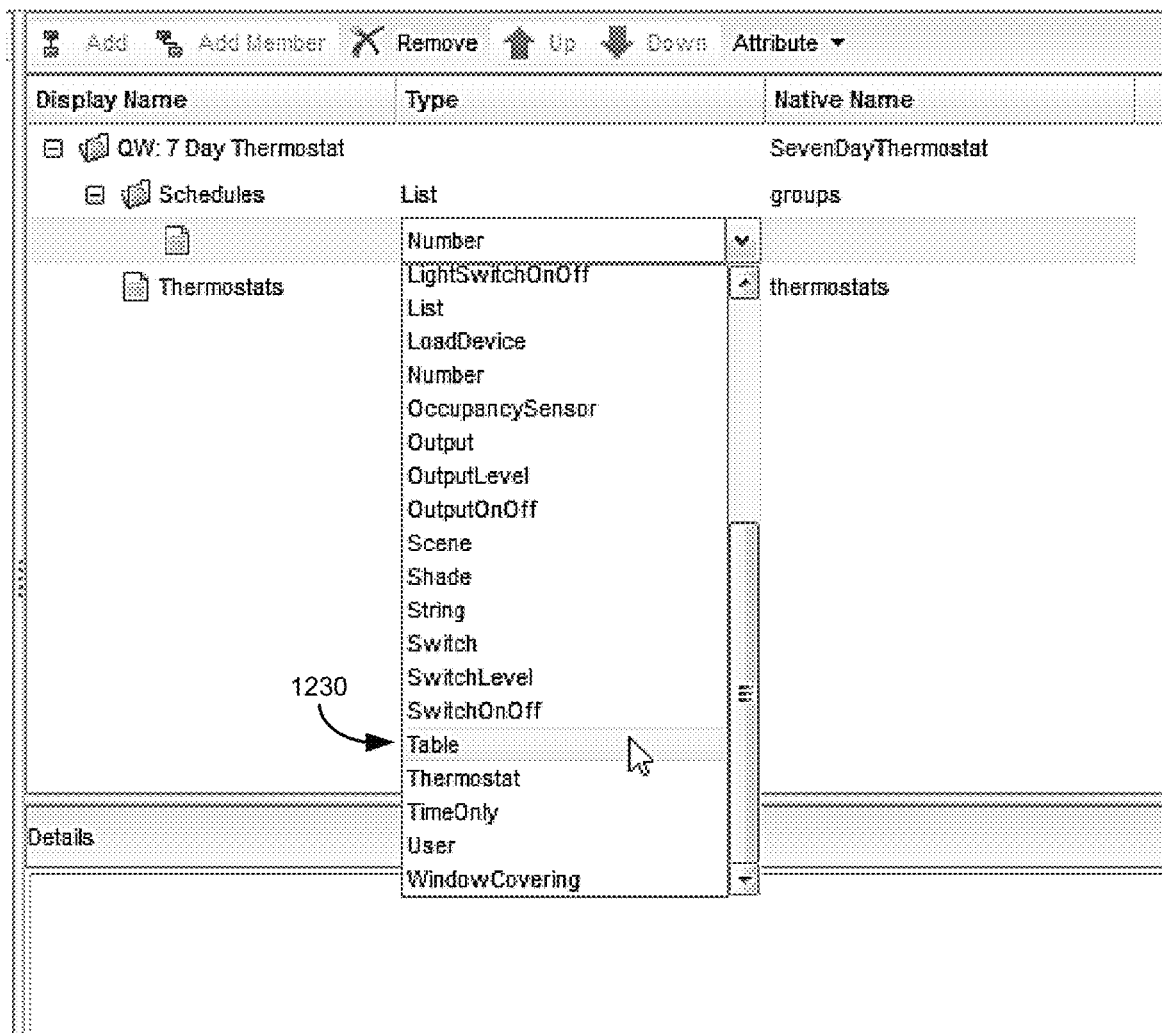
FIG. 12C shows, for the child node of the first parameter, the initial default type of "Number" being changed to type "Table."

In FIG. 12C, the initial default type of "Number" (at screen region 1220) is changed to type "Table," as indicated by screen region 1230. The process for changing a node's type, with respect to FIG. 9, has already been discussed above.

Figure 12D:
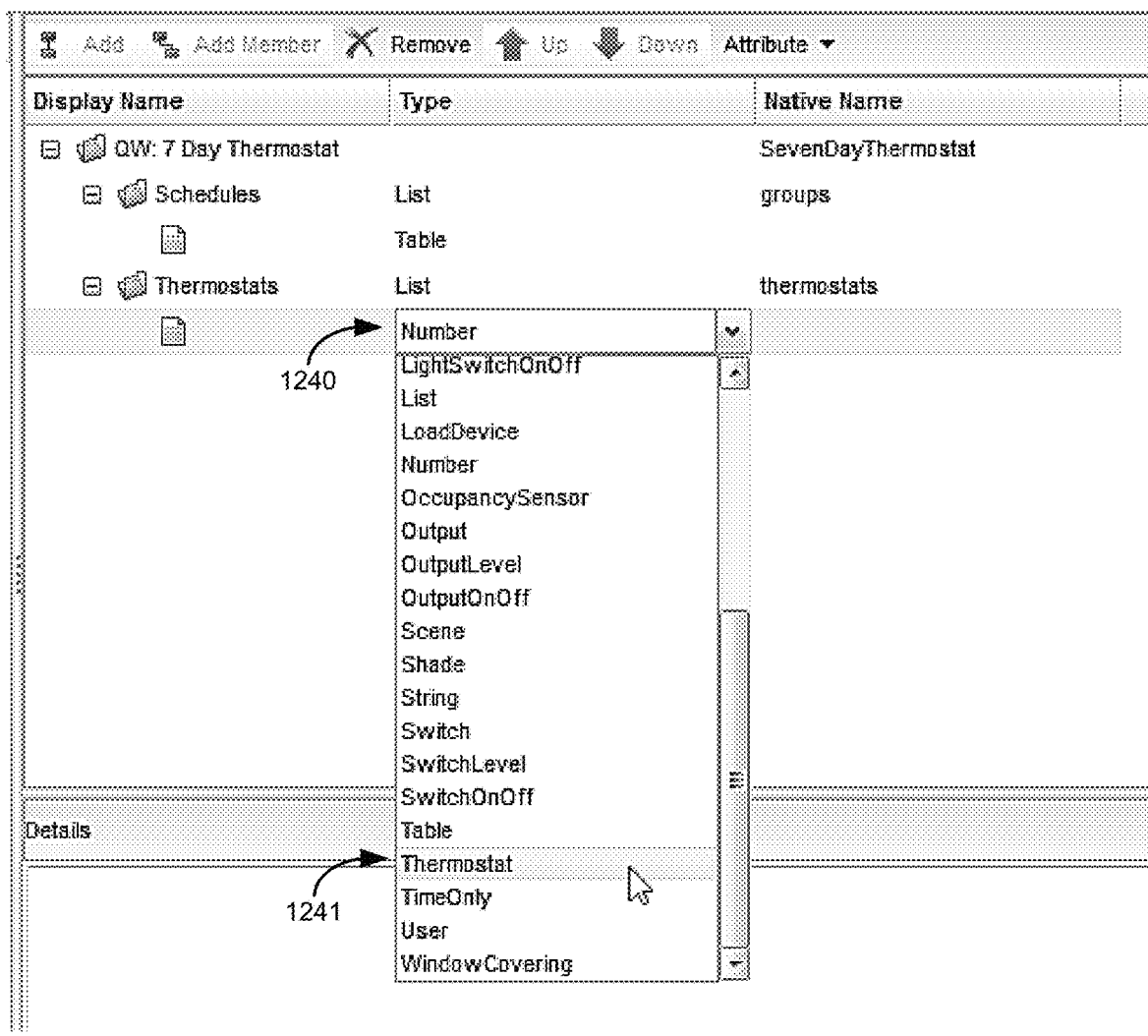
FIG. 12D shows, for the second parameter, a default child node having been added, and the default type, for the child node, being changed to type "Thermostat."

In FIG. 12D, the second parameter (represented by the line with native name "thermostats") is shown at the point after a default child node of type "Number" (at screen region 1240) has been added. Further, FIG. 12D shows the default type, for the child node at screen region 1240, being changed to type "Thermostat" at screen region 1241.

FIG. 12E shows a return to the "Table" child, at screen region 1220, being the current node. This is for purposes of adding documentation to the node's "Details" field, as shown at screen region 1250.

Figure 13A:
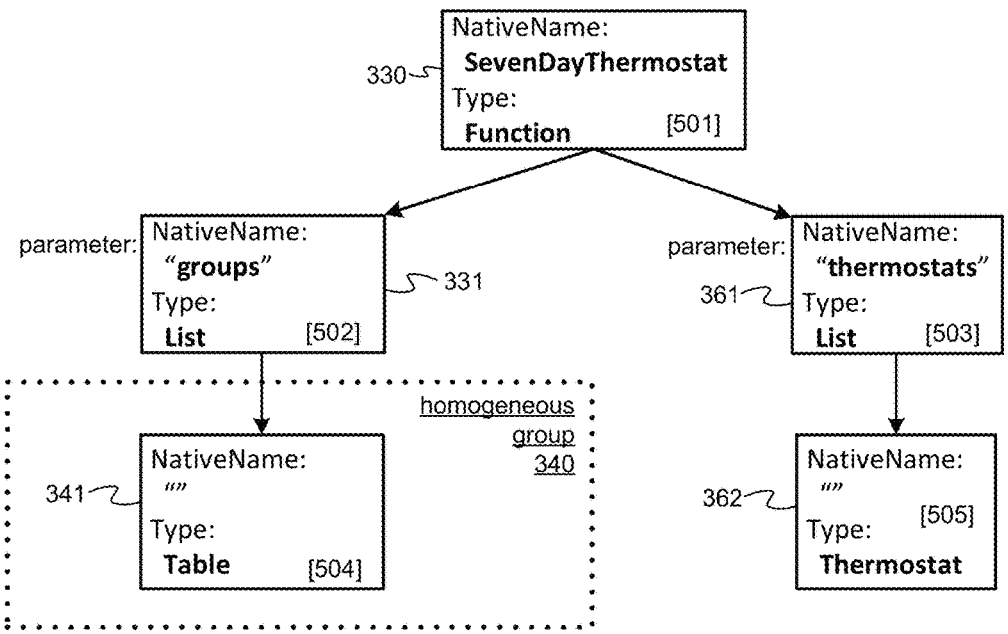
FIGS. 13A and 13B depict, respectively, the state of the meta-data and documentation nodes, as of the time the Meta-Data Editor GUI has reached the status shown in FIG. 12E.
Figure 13B:
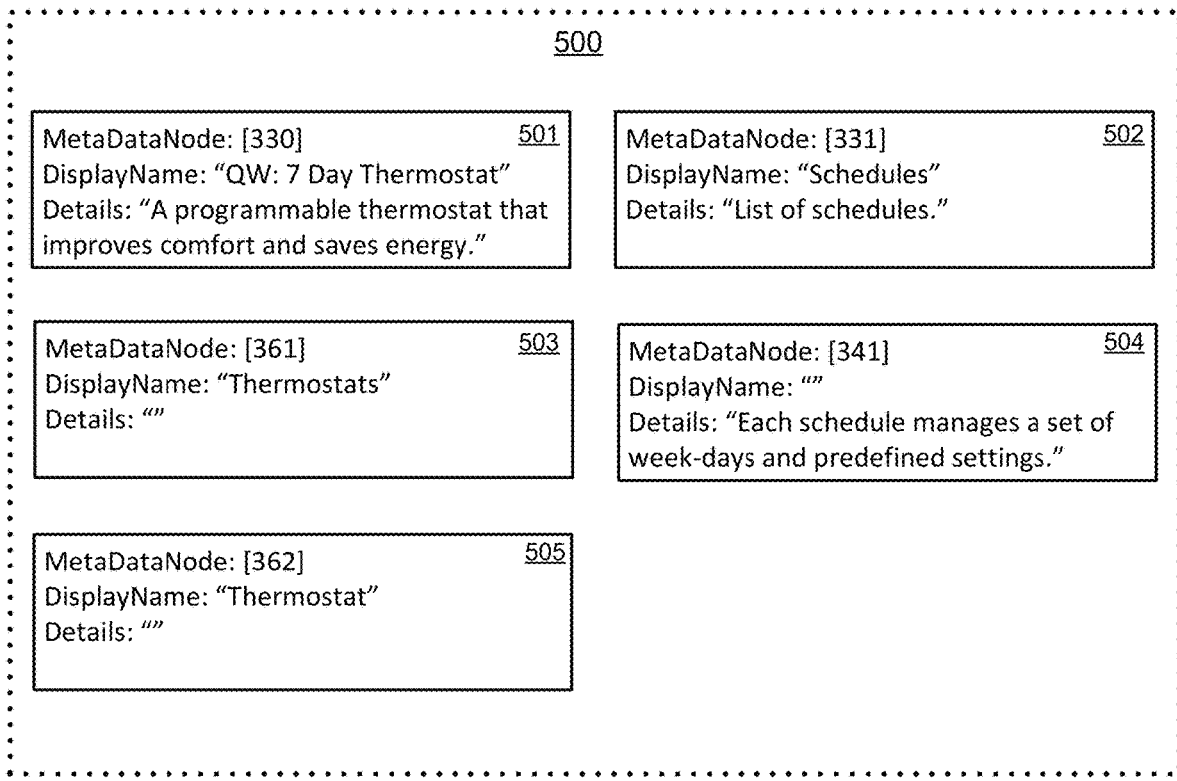

FIGS. 13A and 13B depict, respectively, the state of the meta-data and documentation nodes, as of the time the Meta-Data Editor GUI has reached the status shown in FIG. 12E. Compared with FIGS. 11C and 11D, FIGS. 13A and 13B have the following changes:

Node 341: A new child node, added as a child of node 331.
Node 504: The documentation node, for new node 341.
Node 362: A new child node, added as a child of node 361.
Node 505: The documentation node, for new node 362.

Because 341 can be the only child node of list node 331, it represents the start of homogeneous group 340, which is also indicated in FIG. 13A.

Thus far, Table node 341 specifies an empty table, since it provides for no key-value pairs. As can be seen in FIG. 3, however, node 341 needs to specify the following three key-value pairs:

Node 342: The key "name" needs to lead to a String type value.
Node 343: The key "weekDays" needs to be a list of enumeration values.
Node 344: The key "actions" needs to be the head node of a recursively-nested list of Tables (where each Table will be specified according to node 351).

Figure 14A:
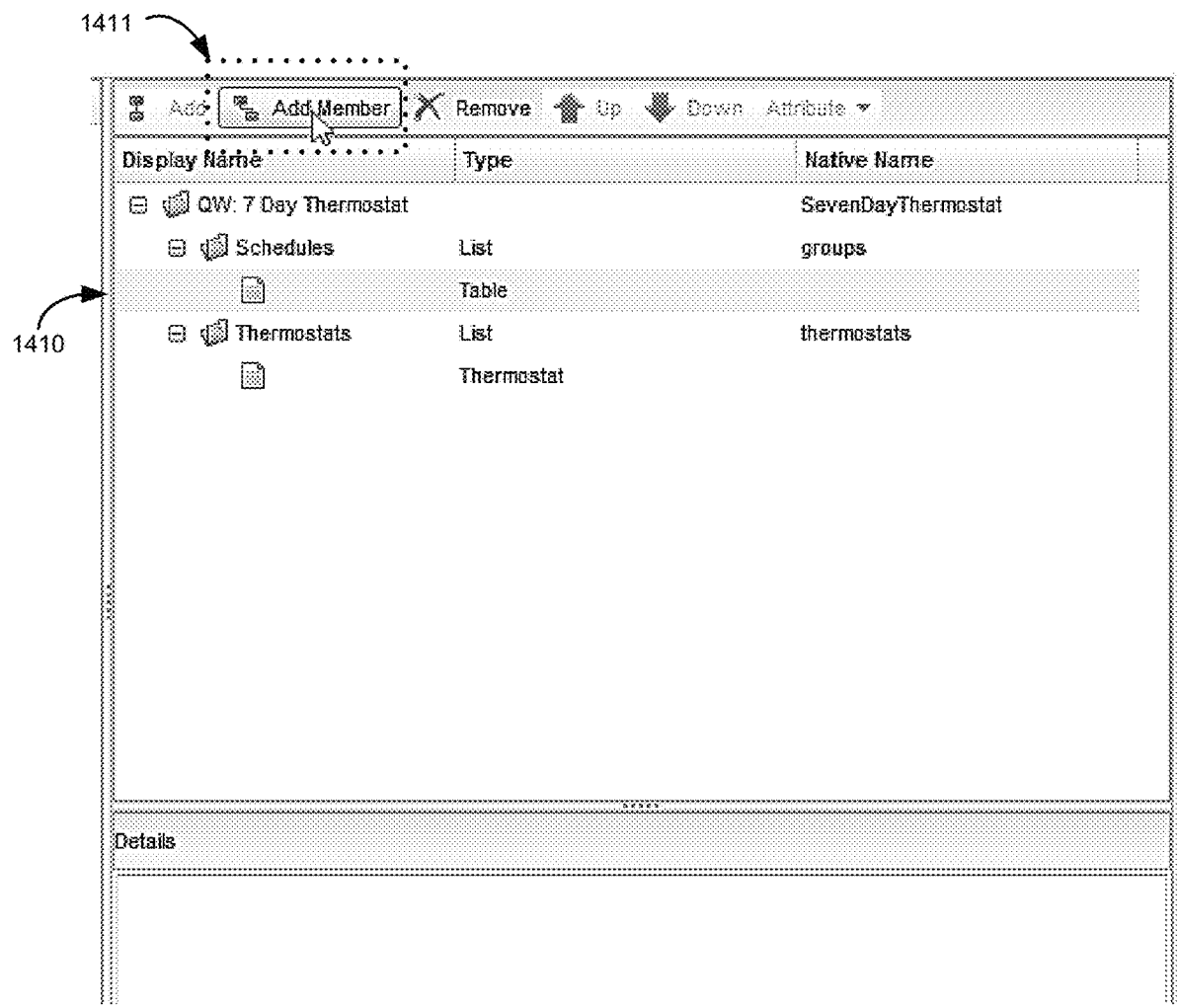

FIG. 14A depicts Table node 341 indicated as the current node (by the darkened band at screen region 1410). FIG. 14A also shows a developer about to add a first key-value pair to this table, by pressing the "Add Member" button (enclosed by dotted outline 1411).

FIG. 14B shows the default key-value pair, that results from the button pushing of FIG. 14A. With respect to FIG. 9, this corresponds to decision point 930 testing in the affirmative, decision point 931 testing in the negative, and decision point 932 testing positive. The positive result at decision point 932 leads to the addition of a default key-value pair in accordance with step 934. As can be seen, the default key-value pair is initialized as follows:

The default key is "NewMember," as indicated at screen region 1420.
The value is given the default type of "Number," as indicated at screen region 1421.
The key-value pair can be given a Display Name, independent of its key. However, FIG. 14B shows the Display Name defaulting to the same as the key: "NewMember," as indicated at screen region 1423.

Figure 15A:
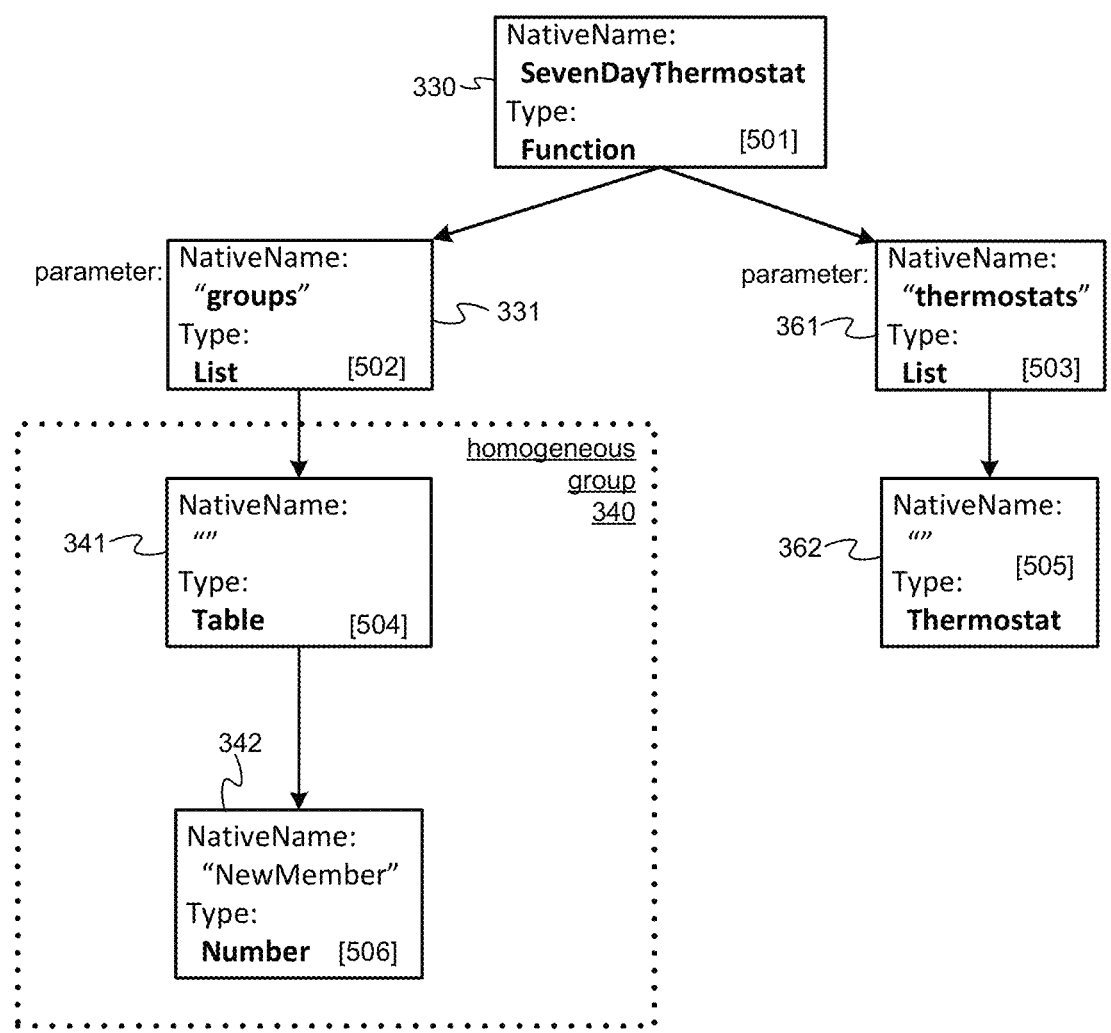

FIGS. 15A-15B depict the change in the meta-data and documentation nodes, that result just from the creation of this default key-value pair. The differences between FIG. 15A and FIG. 13A are as follows:

Key-value-representing node 342 has been added, as a child node of Table node 341.
Node 342 has an initial NativeName (or key) of "NewMember" and a Type (for its value) of Number.

The differences between FIG. 15B and FIG. 13B are as follows:

Documentation node 506 has been added, for meta-data node 342.
Node 506 has an initial DisplayName of "NewMember" and an empty-string Details field.

Changing the Display Name of node 506 to "Name," and changing the Type of node 342 to be of type "String," involve, respectively, the operation of steps 910 and 920 of FIG. 9 (which steps have already been discussed above). With respect to the GUI, these changes result in FIG. 16A being the same as FIG. 14B, except for the following:

Rather than Table node 341 being the "current node," darkened band 1610 indicates node 342 as the current node.
At screen region 1423, the Display Name has been changed from "NewMember" to "Name."
At screen region 1421, the Type has been changed from Number to String.

Figure 16A:
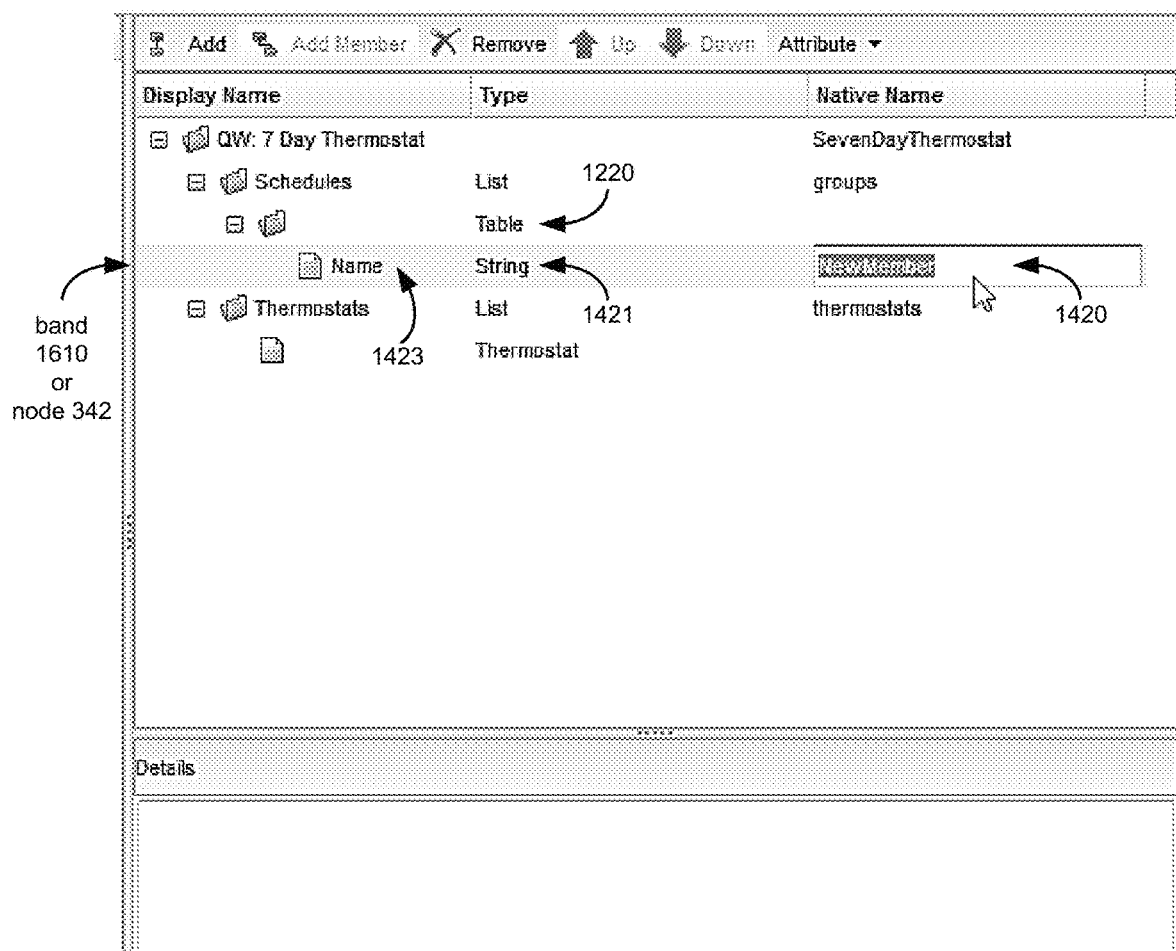

Changing the NativeName of node 342 from "NewMember" to "name," however, involves the operation of a step of FIG. 9 not previously discussed: decision point 960. This step can be invoked, for example, by entering a mouse double-click at region 1420, while the mouse pointer is hovering over the current Native Name. FIG. 16A shows the GUI after this mouse double-click has been entered. This means that decision point 960 has been determined in the affirmative, and, therefore, an evaluation of decision point 961 is undertaken. As can be seen, decision point 961 permits a change of Native Name only if the parent (of the current node) is of type Table. In the case of FIG. 16A, since the parent to the current node is a table (the table at screen region 1220), decision point 961 is also determined to be in the affirmative. Because of this, step 962, which actually performs the Native Name change, is executed. This permission, for the changing of the Native Name at screen region 1420, is indicated in FIG. 16A by the appearance of a dialog box where a new Native Name can be entered.

FIG. 16B is the same as FIG. 16A, except the Native Name "name" has been entered at screen region 1420, and the Native-Name-changing dialog box has been closed.

Figure 17A:
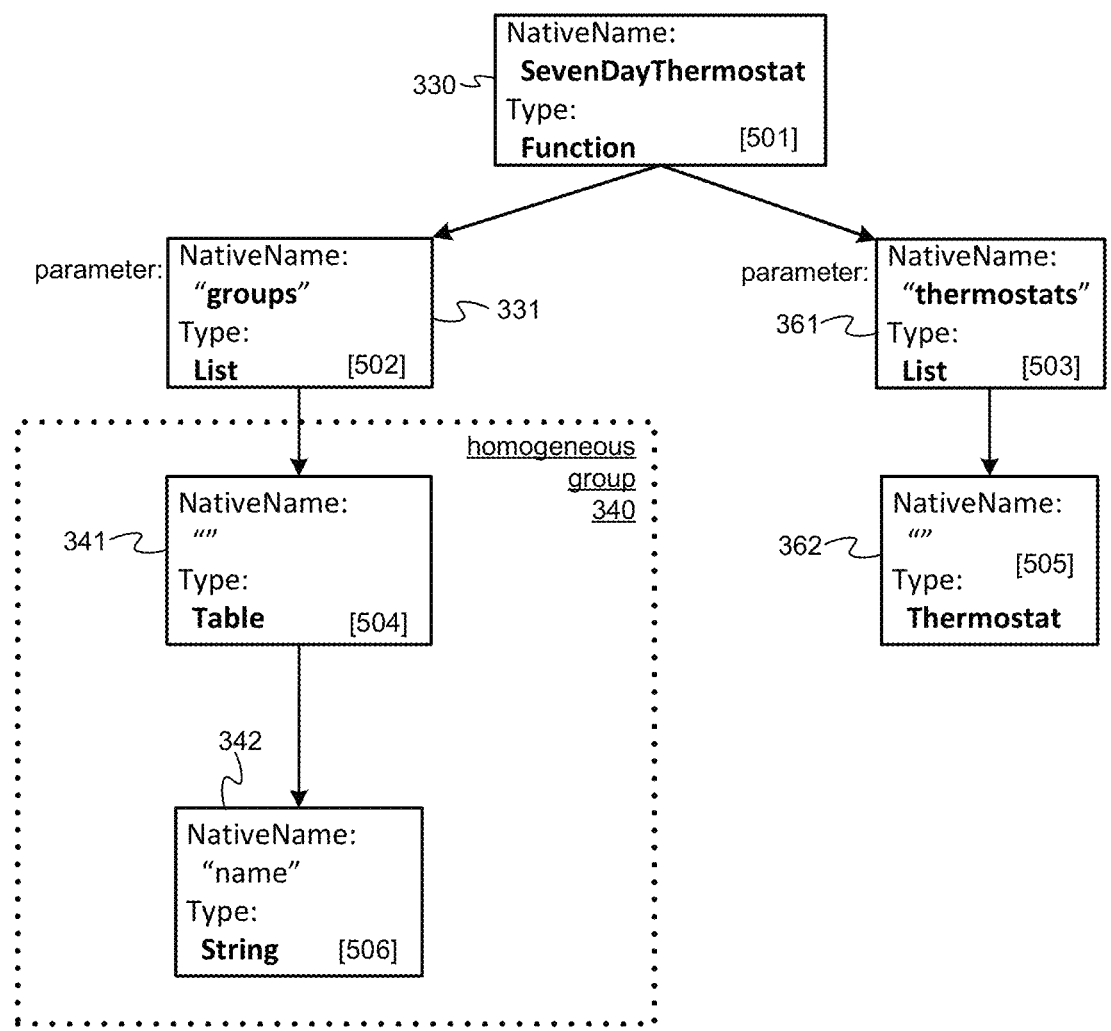

FIGS. 17A-17B depict the change in the meta-data and documentation nodes, that result from the above-described changes to the first key-value pair added to table node 341. The differences between FIG. 17A and FIG. 15A are as follows:

Key-value-representing node 342 has had its Native Name changed to "name."
Node 342 has had its Type changed to String.

The differences between FIG. 17B and FIG. 15B are as follows:

Documentation node 506 has had its Display Name changed to "Name."

Figure 19A:
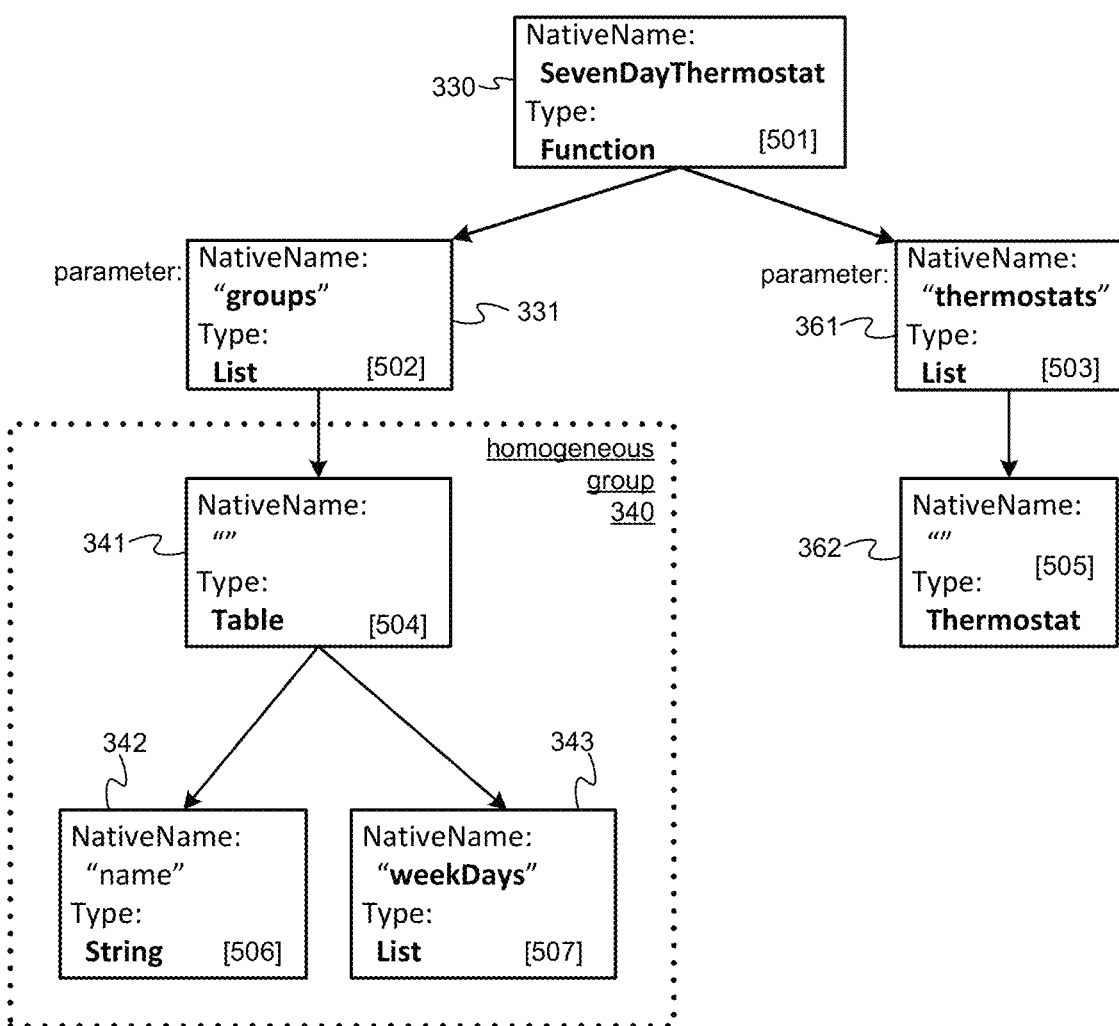

The process of constructing the meta-data of FIG. 3 can continue, with a second key-value pair, represented by node 343, being added to the table of node 341. This second key-value pair is shown in FIG. 19A. Also, node 343 has a corresponding documentation node 507, and this is shown in FIG. 19B.

With respect to the GUI, the second key-value pair can be added in the same way, with respect to utilization of the flowchart of FIG. 9, as was discussed above for node 342. The resulting GUI is shown in FIG. 18, with the changes, relative to FIG. 16B, being within darkened band 1810.

Figure 21A:
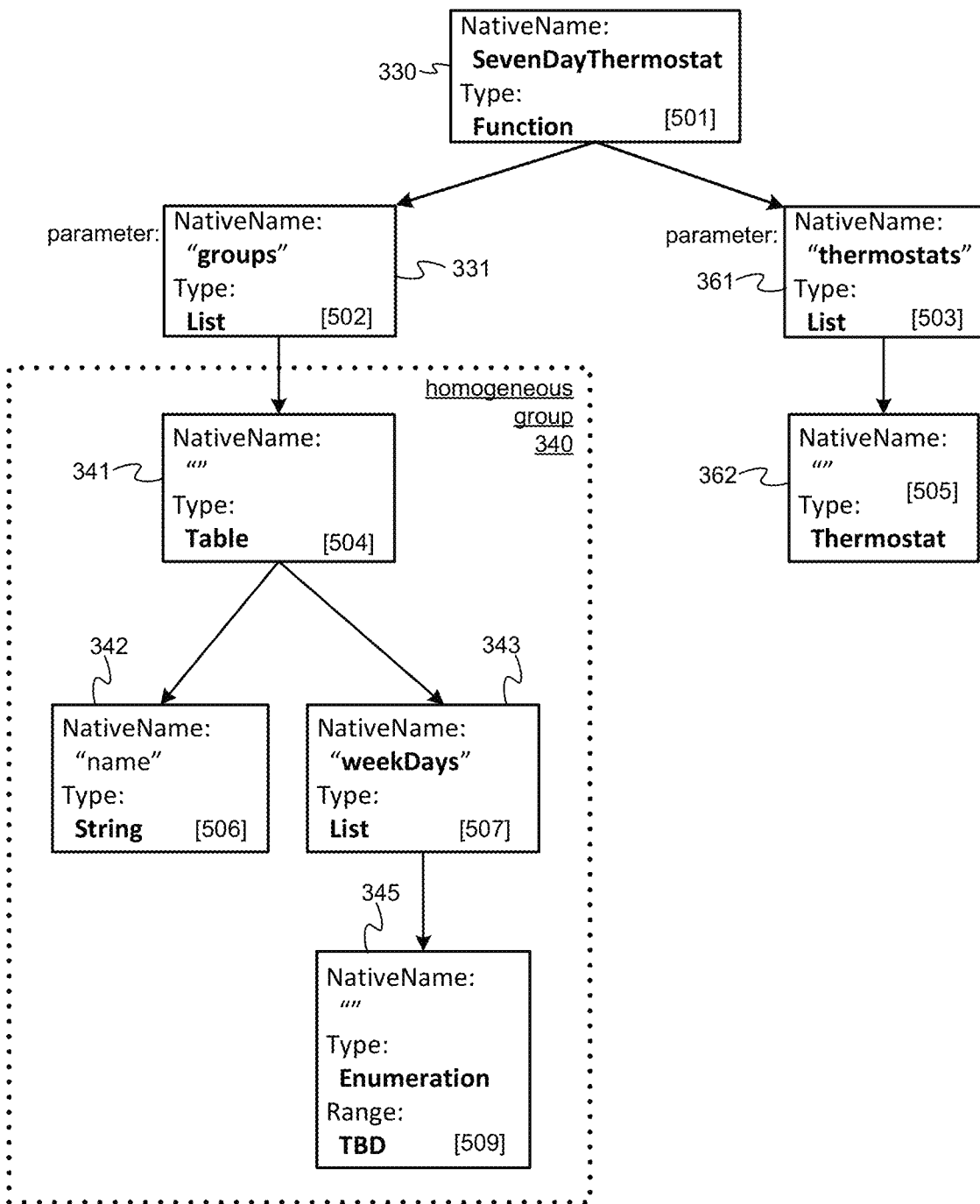

Just as Table node 341 was added, as the only child of List node 331, an enumeration node 345 needs to be added, as the only child of List node 343. The resulting meta-data, relative to FIG. 19A, is shown in FIG. 21A. The enumeration node's documentation node 509 is shown in FIG. 21B. Because the developer has not yet defined the size of the enumerated set yet, the "Range" field, of node 345 as shown in FIG. 21A, has the value "TBD." Similarly, because the developer has not yet assigned an end-user-friendly Display Name, for each member of the enumerated set, the DisplayName field of node 509 is shown as the empty string.

Figure 20A:
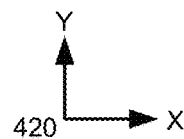
FIGS. 20A-20B show adding an Enumeration node to the second key-value pair.

With regard to the GUI, FIG. 20A shows the situation after the following sequence of steps has been accomplished:

The line representative of node 343 (see line labeled 343 in FIG. 20A) was selected as the "current node," and the "Add Member" button was pushed. The result is the line shown in FIG. 20A, that is representative of node 345 (see darkened band in FIG. 20A labeled 345). The default Type for node 345 is shown as Number (at screen region 2010).

The Type field, at screen region 2010, has been subjected to a mouse double-click (resulting in a User Request, with respect to FIG. 9, to change the node's type). At screen region 2011, the developer is shown as just selecting "Enumeration" for the type of node 345.

Figure 20B:
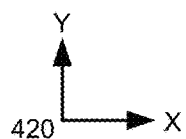

In FIG. 20B, the GUI is shown with the selection of the Enumeration Type, for node 345 completed (see screen region 2010).

Figure 22A:
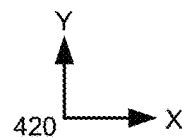
FIGS. 22A-22B show adding an Enumeration value node, to the Enumeration node.

In FIG. 22A, the GUI is shown at the following point: just after the "Add Member" button has been pushed while the line representative of node 345 is indicated. As can be seen, a first item has been added to the enumeration. This item is given the default Display Name "EnumItem" (see screen region 2210). Because "EnumItem" is the first item of this enumerated list, it is assigned Native Name "0" (see screen region 2211).

Figure 22B:
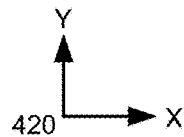

FIG. 22B shows the same GUI as FIG. 22A, except the default Display Name has been replaced by the developer with "Sunday" (see screen region 2210).

Figure 23A:
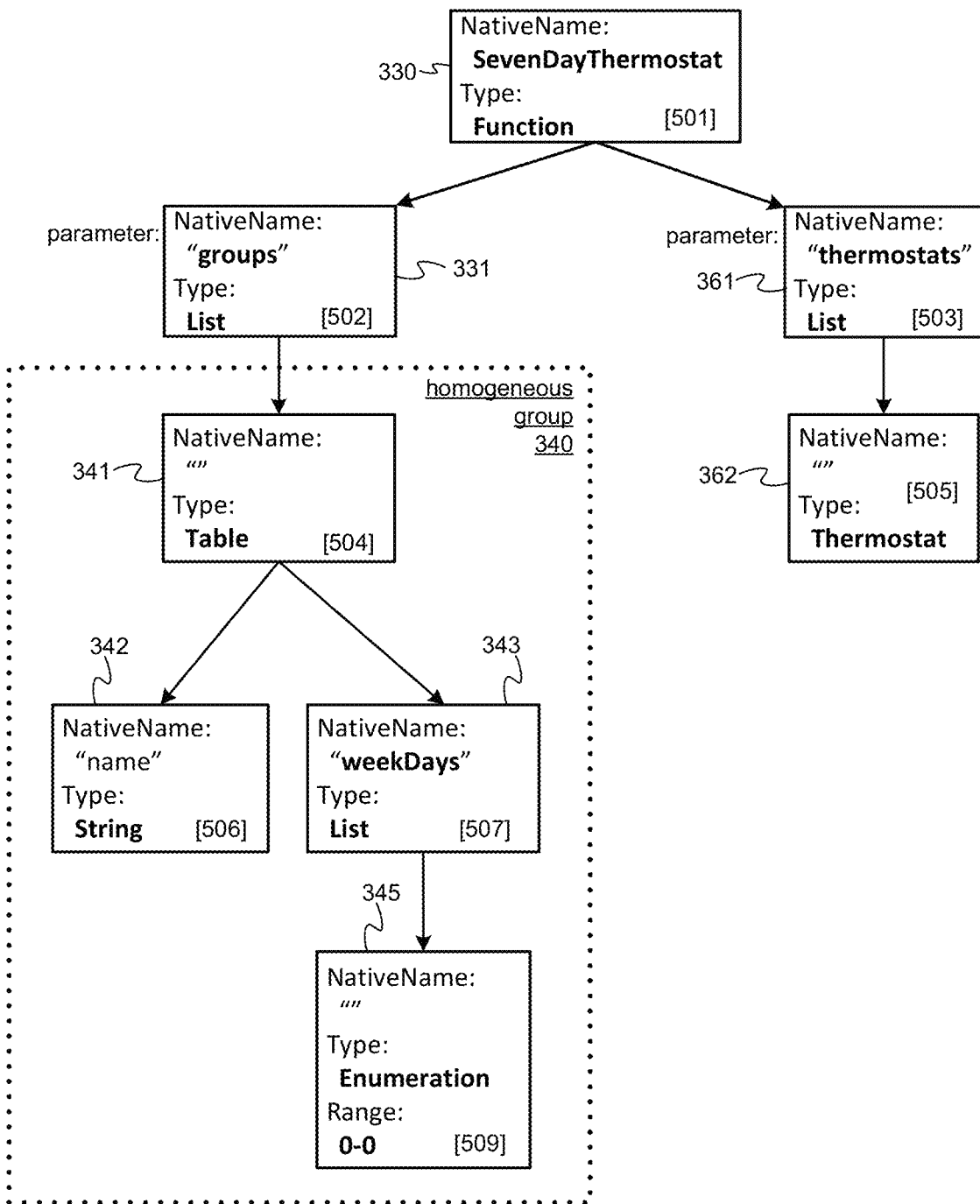

The corresponding state for the meta-data and documentation nodes, for the GUI as shown in FIG. 22B, is shown in, respectively, FIGS. 23A and 23B. FIG. 23A is the same as FIG. 21A, except, for node 345, the value of the "Range" field has been changed from TBD to 0-0. FIG. 23B is the same as FIG. 21B, except, for documentation node 509, the value of the "DisplayName" field has been changed from the empty string to "Sunday."

Following the same procedure shown in FIGS. 22A-22B, the remaining six days of the week can be added to the enumerated set represented by node 345. The resulting GUI, after making the six additions, is shown in FIG. 24.

Figure 24:
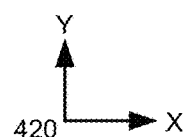
FIG. 24 shows the resulting GUI, after all the Enumeration value nodes have been added.
Figure 25A:
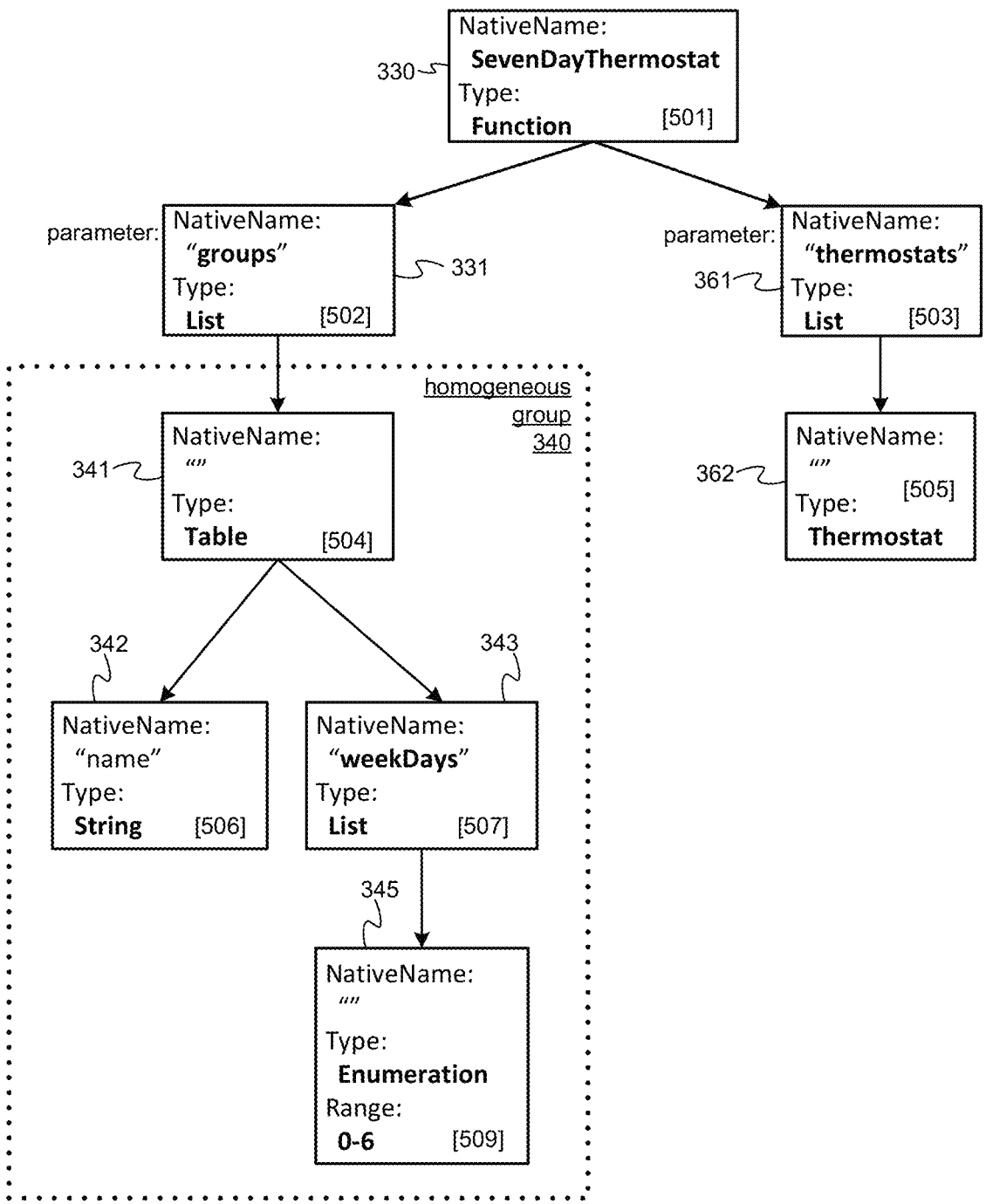

The corresponding state for the meta-data and documentation nodes, for the GUI as shown in FIG. 24, is shown in, respectively, FIGS. 25A and 25B. FIG. 25A is the same as FIG. 23A, except, for node 345, the value of the "Range" field has been expanded, from 0-0 to 0-6. FIG. 25B is the same as FIG. 23B, except, for documentation node 509, the value of the "DisplayName" field has been changed from "Sunday" to "Sunday, Monday, Tuesday, Wednesday, Thursday, Friday, Saturday." Thus, the DisplayName field is interpreted, for an Enumeration meta-data node, as a list of symbolic labels (separated by commas). Each of these symbolic labels is matched with a corresponding value in the Range of its Enumeration meta-data node.

For an enumeration value, the contents of its corresponding documentation node assumes a more active role, in the subsequent argument-entry process, than does the documentation nodes for other Types. As will be discussed below, with regard to the Argument Editor, when it is time for the end-user to select days of the week to which a particular schedule will apply, the GUI could show, in its drop-down menu, the values 0-6. However, it is much more meaningful to an end-user if the drop-down menu lists "Sunday" to "Saturday" (the corresponding symbolic names of the documentation node). Symbolic labels, particularly when they are words of the natural language in which the end-user is fluent, are generally much easier for a person to use, then trying to remember meanings assigned to numbers.

Figure 26:
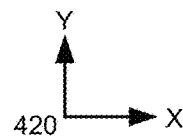
FIG. 26 shows the addition of a third key-value pair, to the node of Type "Table."

FIG. 26 shows, at line 2611, the addition of the third key-value pair to the table of node 341 (where node 341 is indicated in FIG. 26 by line 2613). This third key-value pair, labeled node 344 in FIGS. 3 and 27A, can be added in the same manner discussed above for the second key-value pair (node 343 is indicated in FIG. 26 by line 2610).

Node 344 is representative of a list, just like node 343 of the second key-value pair. However, the members of the list of node 343 are enumerated values. (One can refer back to FIG. 24 to see these enumerated values. Purely for purposes of economy in the graphical presentation of node 343, line 2610 is shown in FIG. 26 as collapsed.) In contrast, the members of the list of node 344 are tables defined according to node 351, where the definition of this table is shown in the GUI of FIG. 26 at line 2612.

Figure 27A:
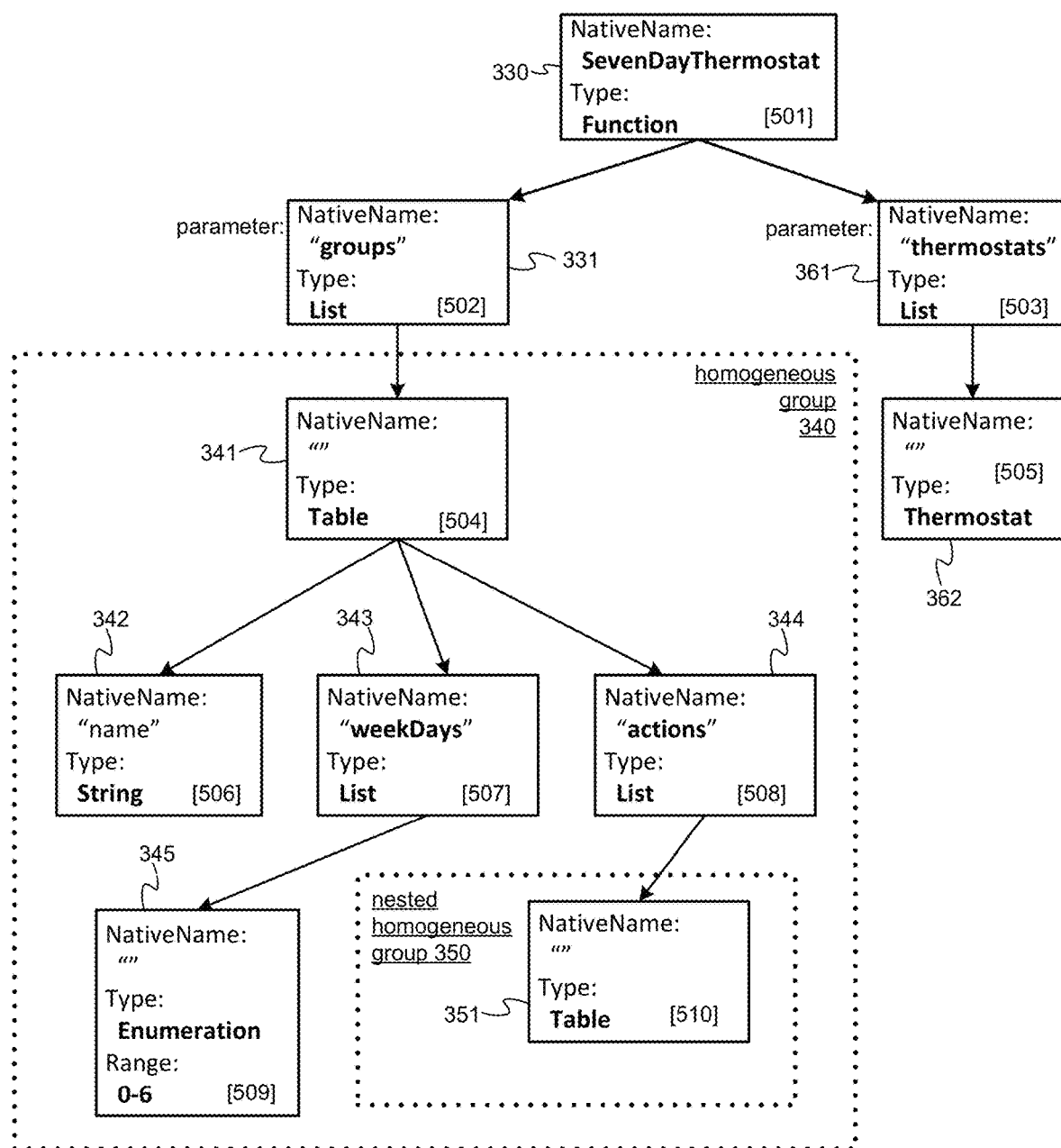

As can be seen in FIG. 27A, node 351 marks the beginning of a homogenous group of items 350. As can be seen, node 351 begins a homogeneous group in essentially the same way accomplished by node 341, except that node 351 represents a homogeneous group that is recursively nested within each member of homogeneous group 340.

To summarize, comparing FIG. 27A two FIG. 25A, we see the following additions:

Node 344 with Native Name "actions," and Type "List."
Node 351 with no Native Name, and a Type of "Table."
Similarly, comparing FIG. 27B two FIG. 25B, we see the following additions:
Node 508 that provides a Display Name of "Actions" and a Details description. This Details description can be seen in FIG. 26 at line 2614.
Node 510 that provides a Display Name of "Action."

The addition of four key-value pairs to Table node 351, can be accomplished through the GUI in essentially the same way discussed above for the addition of key-value pairs to Table node 341. As can be seen in FIG. 3, the only significant difference is that all the key-value pairs of Table node 351 are primitive types. In other words, Table node 351 has no recursively nested list or table, as the value for one of its key-value pairs.

Completion of Table node 351 leads to meta-data and documentation nodes as shown in, respectively, FIGS. 3 and 5A. The corresponding completed GUI view is shown in FIG. 4A.

6 Argument Editor 6.1 Overview

Passing an argument to a program parameter is ordinarily the kind of activity undertaken only by those with skill in a computer programming language. The present invention, however, makes this a task that is relatively simple, and not too unfamiliar, for someone with no programming skill. Three main factors contributing to the apparent simplicity include the following:

Allowing the developer to provide generalized instructions, in the form of meta-data, that guide an end-user in the argument-creation process.
Making the necessary argument structure easier to understand, by the provision of a GUI.
Allowing the developer to take fuller advantage of the GUI presentation, by allowing the developer to provide detailed node-by-node documentation, for the meta-data. As discussed above with respect to the Meta-Data Editor, this documentation can include the following two fields: a Native Name, and a "Details" description.

For purposes of presenting an example Argument Editor, it will be assumed that an end-user wishes to utilize the example "SevenDayThermostat" app, discussed in the last section. The app's meta-data is depicted in FIG. 3. Further, it will be assumed that the end-user wishes to enter, for this app, the example data of FIG. 2 (discussed above in section 4 "A Meta-Data Language").

FIG. 28 illustrates, as a flowchart, a generalized process suitable for an Argument Editor GUI.

At the completion of the following section (i.e., the following section entitled "Constructing an Argument"), a representation of the data of FIG. 2 is created in a computer memory associated with the above-discussed IoT Controller end-user interface (see section 3 "An IoT Ecosystem"). A graphical representation of the finished argument data, for submission to the SevenDayThermostat app, is shown in FIG. 38A.

Input of the appropriate end-user command, through the IoT Controller end-user interface, will cause the GUI-entered argument data to be repackaged into a suitable format, that can be submitted as an actual argument to a copy of the app as stored on the IoT Controller 120. In accordance with the IoT architecture of FIGS. 1A-1B, such repackaging can occur on the end-user's client (e.g., client 112 or 132), on the IoT Controller 120 (e.g., by Main Process 150), or a combination of both.

It is assumed that a copy of the SevenDayThermostat app has been stored on Application Storage 155. Main Process 150 can send the argument data to Application Engine 151, where the data is combined with a copy of the app to create an executing task, within a sandbox on the Application Engine.

6.2 Constructing an Argument

Execution of an argument-entry session begins with generation of an initial argument for each parameter-root node of the relevant meta-data, in accordance with step 2800 of FIG. 28. For the meta-data of FIG. 3, this means that an initial argument value needs to be determined for each of nodes 331 and 361.

An example set of rules, for initialization based on data type, can be summarized as follows:

A data item (of any type) which, according to its corresponding meta-data specification, can be set to the null value, is initialized as null. In general, each data type is given the capability, if so chosen by the developer, to accept null as one of its values. This is because the ability to set an item of data to null is particularly important to a function's input parameters, and almost any data type can be the subject of a parameter. The rest of this list, of initialization rules, presents a default initialization value assuming that the capacity to set a data item to null has not been specifically added by the developer.

As used herein, a "primitive" type is one that, in the corresponding meta-data, must appear as a leaf node. Among such primitive types, Number can be initialized to zero, String can be initialized to the empty string, and Boolean can be initialized to "FALSE." Other than these three primitive types, however (and regardless of whether the developer has chosen to add the capability), a primitive data type is often designed to initialize any new instance of its type to the null value. For example, it can be a good design choice to initialize instances of the following primitive types to a null value: time and date. A primitive type representative of an IoT device is often initialize to null. Within the general category of IoT devices, it is often a good further design choice to organize IoT devices according to their generally-accepted functionality. For example, for all IoT devices that are generally used to produce illumination, they can be grouped under a data type called "Light."

List and enumeration are initialized to the empty list.

A Table is initialized to contain all of its key-value pairs. Then, depending on the data type for each of these pairs, the value is initialized accordingly. If the data type of a pair is itself another table, then, in a recursive fashion, this other table is itself initialized to contain all of its key-value pairs. In FIG. 28, this potentially recursive initialization is accomplished by step 2802. Step 2802 is not a direct part of the flow of control represented by FIG. 28. Rather, step 2802 is invoked as a subroutine named "populate_node." As part of the execution of several nodes (i.e., nodes 2800, 2812, and 2841), that are directly within the flow of control, subroutine populate_node is invoked. All the nodes that call step 2802 share the property that they may introduce a new table into the argument data being created.

For the example meta-data of FIG. 3, since each of its parameter-root meta-data nodes (node 331 representing the parameter "groups," and node 361 representing the parameter "thermostats") is of type "List," they are initialized to the empty list. Such empty lists are represented by the argument-root data nodes 2931 and 2961 of FIG. 29A.

As can also be seen in FIG. 29A, each argument-root data node includes a pointer back to its corresponding meta-data node of FIG. 3. Nodes 2931 and 2961 each has a pointer to, respectively, meta-data node 331 and 361. Note that, had the developer set the parameter-root meta-data nodes capable of assuming the null value, corresponding argument data nodes 2931 and 2961 would be initialized to the null value.

Figure 29B:
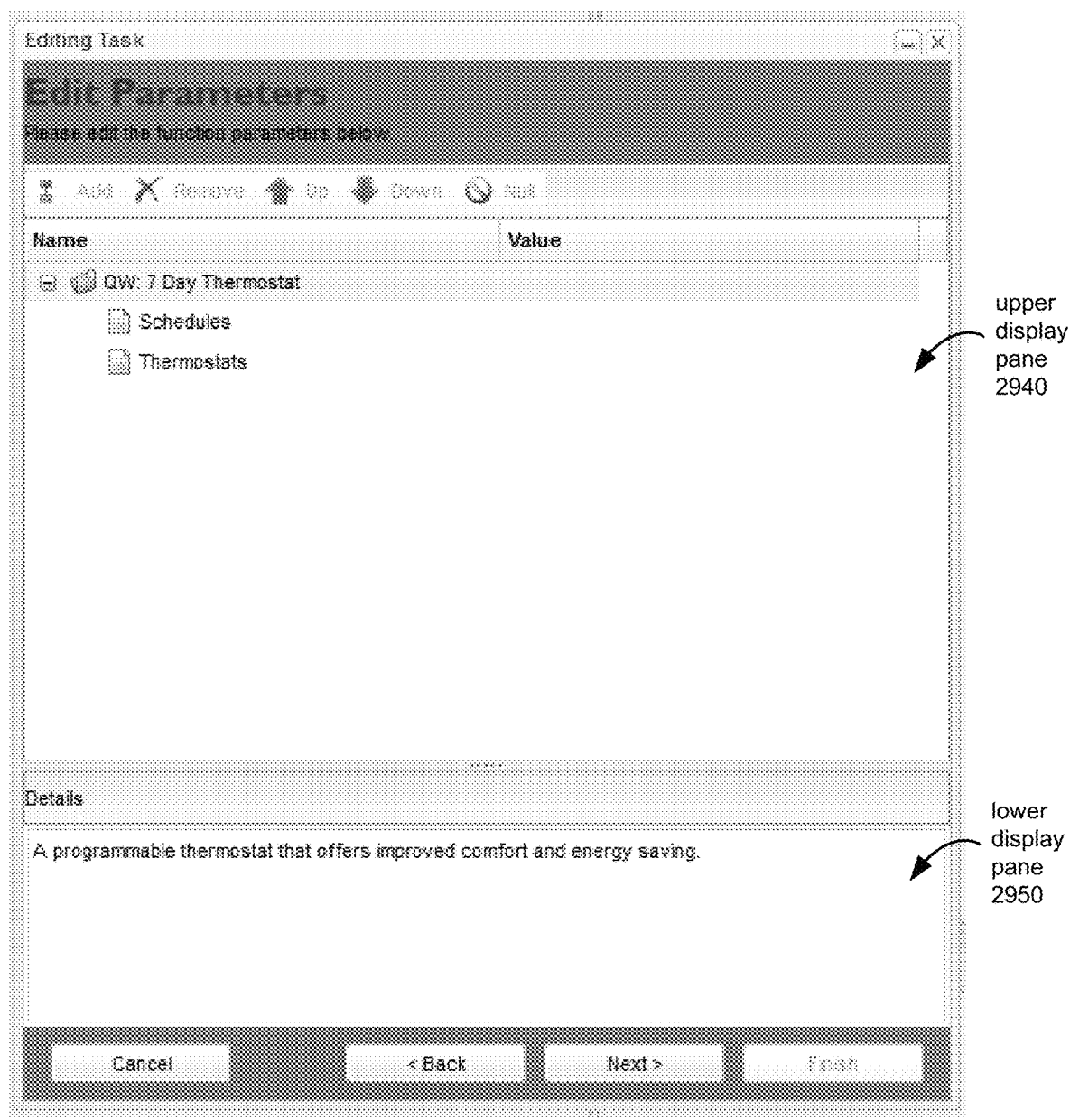

FIG. 29B illustrates an example GUI presentation of the data of FIG. 29A. (Pair of X-Y axes 2946 are introduced, for purposes of identification.) Thus, when first starting to enter data for the SevenDayThermostat app, an end-user could be presented with a GUI screen like that of FIG. 29B.

As can be seen, the graphical area of the GUI is consumed mostly by the following two areas (or "panes"), that can be identified as "upper" and "lower" with respect to the Y-axis:

Upper display pane 2940: used for displaying the hierarchical structure of the arguments being built.

Lower display pane 2950: used for showing the detailed documentation of the node currently indicated in the upper display pane.

FIG. 29C is the same as FIG. 29B, except a dotted line, parallel to the Y-axis, has been added to the upper display pane. This dotted line is not part of the GUI itself, but has been added to clarify how the upper display pane is divided into two columns:

Left column 2941: entitled "Name"

Right column 2942: entitled "Value"

The basic structure of left column 2941 is essentially the same as the leftmost column of the Meta-Data Editor GUI (for example, see above discussion of column 412 of FIG. 4C). Each line of the upper display pane is representative of an argument node (which is analogous to the Meta-Data Editor, where each line represents a meta-data node). Within the left column of the upper display pane, the indentation of a node is indicative of its hierarchical level. Placement of a node further to the left side, of the left column, indicates a higher hierarchical level.

As discussed when presenting the Meta-Data Editor, for each symbolic name (or "native name") that is machine-readable at the programming language level, the Argument Editor GUI can display (if the developer has so elected) a corresponding display name. For example, as can be seen from FIG. 3, the native names for the three highest level nodes are the following:

"SevenDayThermostat": name of application end-user wishes to invoke.
"groups": name of the first parameter.
"thermostats": name of the second parameter.

As can be seen in FIG. 29C, each of these native names has been replaced with, respectively, the following display name (where the following were presented as example corresponding display names in the section on the Meta-Data Editor):

"QW: 7 Day Thermostat": see line 2945;
"Schedules": see line 2946, which corresponds to argument-root node 2931; and
"Thermostats": see line 2947, which corresponds to argument-root node 2961.

That the application itself (i.e., node 330 of FIG. 3) is currently indicated in the GUI, can be seen in FIG. 29C from the fact that the application's display name is within the darkened band of line 2945. Because the node for the application itself is currently indicated, its detailed documentation is currently shown in the lower display pane 2950.

In order to display the Display Name and Details, for each node of the argument data structure being built by an end-user, its corresponding documentation node needs to be located. This can be found as follows: each node of the argument has a pointer to its corresponding meta-data node, and each meta-data node has a pointer to its corresponding documentation node. For example, for argument-root node 2931, its display name can be obtained as follows. Its pointer can be followed to node 331 of FIG. 3. Node 331, in turn, has a pointer to documentation node 502 of FIG. 5A, where the DisplayName "Schedules" is found.

Figure 30B:
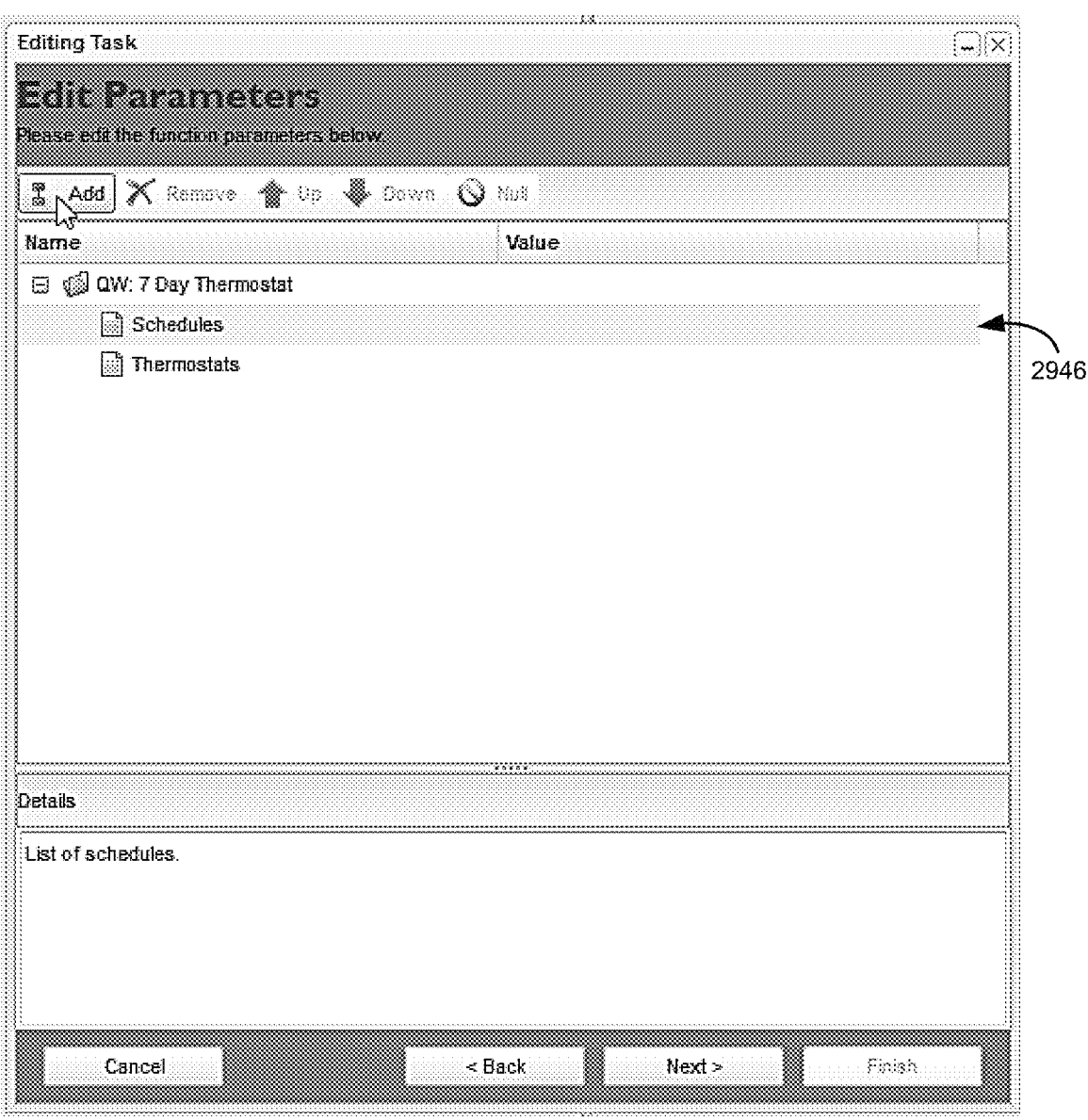
FIGS. 30B-30C show, in the Argument Editor GUI, the creation of an instance of a schedule under the "Schedules" node.

A logical next step, in the creation of an argument, can be the creation of an instance of a schedule under "Schedules" node 2931. FIG. 30B shows this next step being taken in the GUI. In FIG. 30B, the "Schedules" node is already the indicated current node in the GUI, with line 2946 having the darkened band.

Figure 30C:
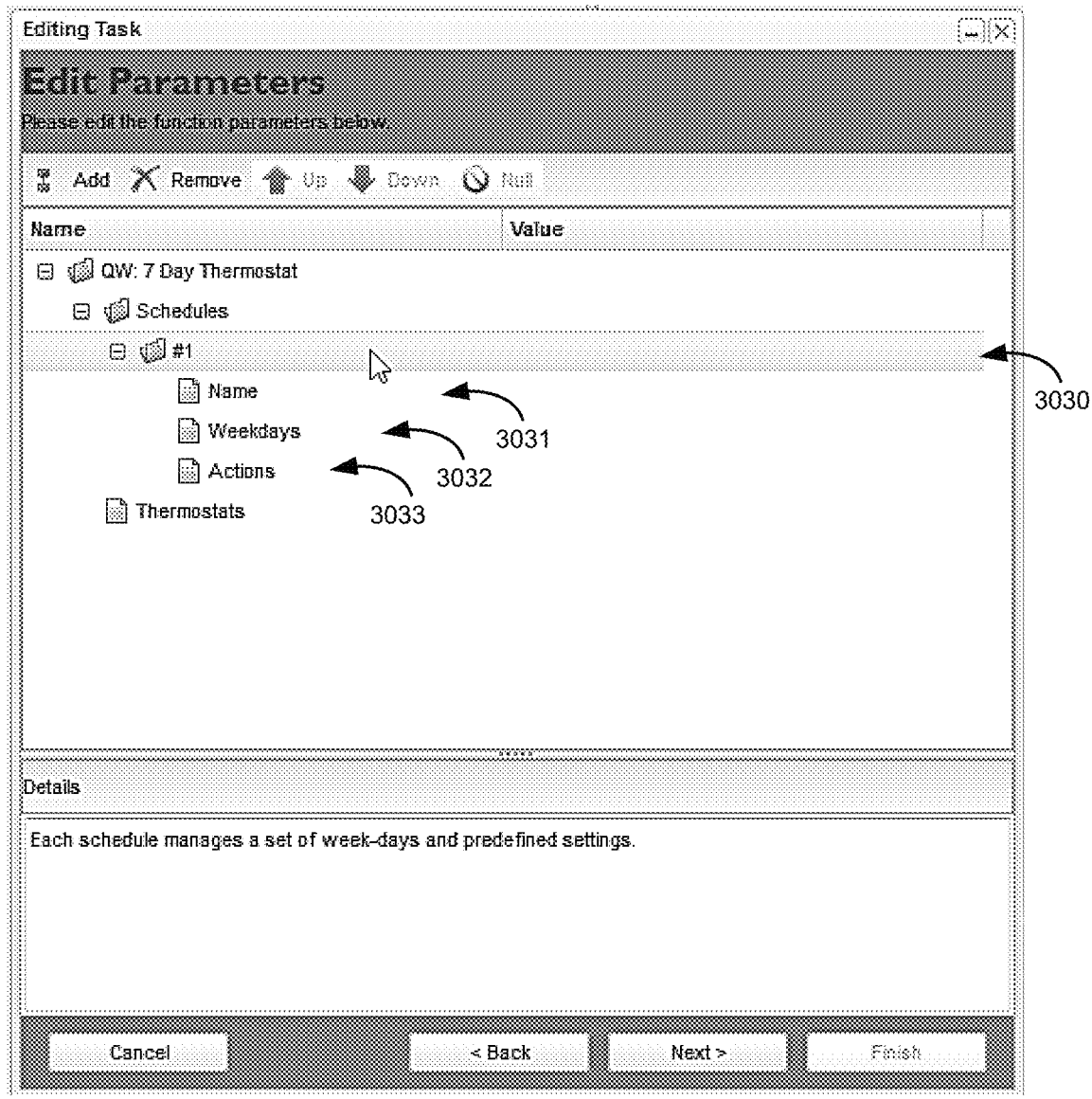

FIG. 30B also shows the end-user "pushing" the "Add" button, by hovering the mouse pointer over it and entering a User Request with a mouse click. In response, FIG. 30C shows an instance of a schedule having been added. This schedule is labeled "#1" (see line 3030) and represents the addition of a Table, in accordance with meta-data node 341 of FIG. 3.

FIG. 30A shows the same change, shown in FIG. 30C graphically, at the argument node level. The changes can be seen particularly clearly by comparing FIG. 30A to FIG. 29A, with the differences enclosed in dotted outline 3000 of FIG. 30A. The added direct child node, of argument root 2931, is depicted as node 3010 in FIG. 30A. The initial values, for the three key-value pairs of table 3010, are represented by nodes 3011, 3012, and 3013.

In general, each node of the GUI-entered argument data nodes can have the following four types of information:

A pointer to its corresponding meta-data node. As discussed above, this is shown in a pair of square brackets and is generally included in every node of argument data.

If the argument node corresponds to a meta-data node that is a direct child of a "List" Type node, then the argument node will usually include an index number, in order to distinguish it from other instances within the same list. For example, with respect to FIG. 30A, argument node 3010 has both a pointer to its corresponding meta-data node (i.e., [341]), and the index number "#1."

If the argument node corresponds to a meta-data node that is of a relative Type (i.e., Table or List), then it can have a pointer to each of its argument child nodes. For example, argument node 3010 corresponds to a meta-data node of the Table type. Therefore, node 3010 has a pointer to each argument node that stores a value for one of node 3010's key-value pairs. Specifically, node 3010 has a pointer to each of the following argument nodes: 3011, 3012, and 3013.

If the argument node corresponds to a meta-data node that is of a primitive Type, then it can store the actual value to which this particular instance, of the Type, is to be set. For example, argument node 3011 of FIG. 30A stores the empty string value. An argument node can also store an actual value for the otherwise relative List Type, if the list is currently empty. For example, in FIG. 30A, since the list of weekDays represented by node 3012 is still empty, node 3012 itself can note this fact.

FIG. 30C graphically displays node 3010 as line 3030. Nodes 3011, 3012, and 3013 are represented by, respectively, lines 3031, 3032, and 3033 of FIG. 30C.

With respect to the Argument Editor flowchart of FIG. 28, the additions within dotted outline 3000 are handled as follows. Prior to the "Add" button being pushed, we assume that the GUI is waiting for end-user input at step 2801. We know that "Schedules" node 2931 is the indicated (or current) node, as of FIG. 30B, because of the darkened band at line 2946. Upon the "Add" button being pushed, a User Request is generated. Upon exiting step 2801, the first step to be executed is decision point 2810. Since the answer to decision point 2810 is in the affirmative, the next step to be executed is decision point 2811. Since the current node indicated (i.e., node 2931) is of type List, step 2812 is executed. This step first creates a child node (node 3010), and then calls the "populate_node" subroutine (step 2802). Because node 3010 is of type "Table," step 2802 causes all of its child nodes (i.e., its key-value pairs) to be populated.

FIG. 30A shows the three key-value pairs, with which the table of node 3010 is populated:

3011: represents the empty string (" ") assigned as value, to the key (i.e., the native name "name") represented by node 342 of FIG. 3. In the GUI as shown in FIG. 30C, at line 3031, node 3011 is represented by the display name "Name," of documentation node 506 of node 342.

3012: represents the empty list assigned as value, to the key (i.e., the native name "weekDays") represented by node 343 of FIG. 3. In the GUI as shown in FIG. 30C, at line 3032, node 3012 is represented by the display name "Weekdays," of documentation node 507 of node 343.

3013: represents the empty list assigned as value, to the key (i.e., the native name "actions") represented by node 344 of FIG. 3. In the GUI as shown in FIG. 30C, at line 3033, node 3013 is represented by the display name "Actions," of documentation node 508 of node 344.

Step 2802 finishes, and control is returned to step 2812. Since step 2812 has finished its execution, the Argument Editor's flow of control returns to step 2801 (where it waits for a next user request).

It is interesting to note that, for the particular implementation of an Argument Editor presented by FIG. 28, generation of an "add child node" signal by the end-user only works (to produce a child node) if the current node indicated is of type "List." This can be understood by the fact that the only other type of node, to which child nodes can be added, is "Table." A table, however, whenever it is introduced, is automatically (and, if necessary, recursively) populated by a call to step 2802.

A next step for an end-user can be the specification of an IoT-controlled thermostat, that is to be set with different heating and cooling setpoints, depending upon the time of day and day of week.

Figure 31B:
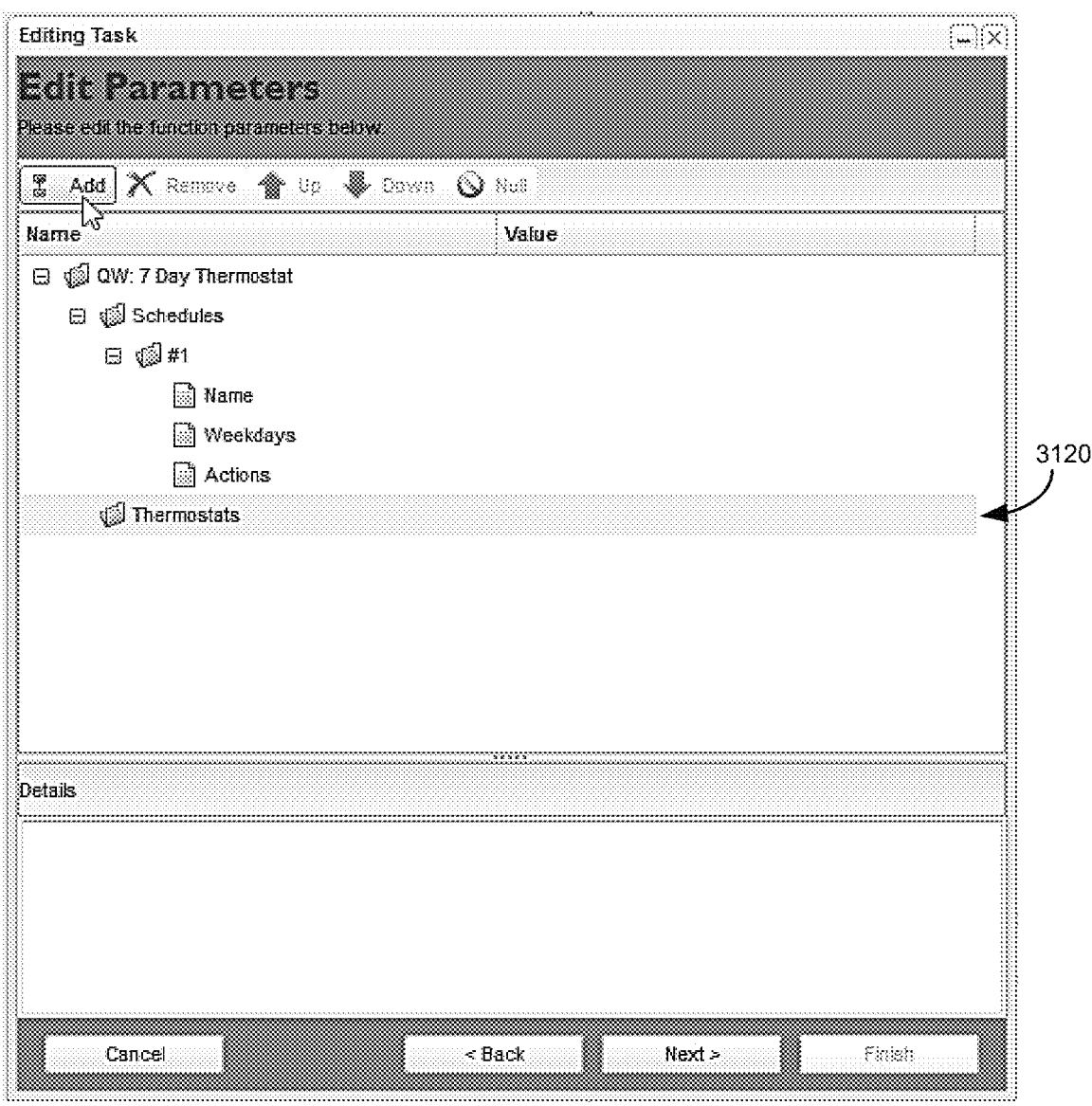

FIG. 31B shows the "Thermostats" node (node 2961 of FIG. 30A) having already been indicated in the GUI, with such indication illustrated by the darkened band of line 3120. FIG. 31B also shows the end-user "pushing" the "Add" button with the mouse pointer. In response, FIG. 31C shows a thermostat having been added (line 3130). (Pair of X-Y axes 2946 are re-introduced, for purposes of identification.) This thermostat is labeled "#1," and represents the addition of a particular thermostat, in accordance with meta-data node 362 of FIG. 3.

The changes in FIG. 31A, with respect to FIG. 30A, are enclosed in dotted outline 3100. The added child node, of argument root 2961, is depicted as node 3110 in FIG. 31A. FIG. 31C graphically displays node 3110 as label "#1" on line 3130.

FIG. 31C also emphasizes (with dotted line 3122) the division, of the upper pane of the Argument Editor, into left and right halves. As can be seen from the right "Value" half of line 3130, the thermostat added is initially just the "Null" thermostat (at screen region 3121), which value can also be seen in node 3110 of FIG. 31A.

With respect to the Argument Editor flowchart of FIG. 28, the addition of node 3110 can be described as follows. We assume that flow of control is at step 2801, waiting for a User Request. As discussed above for FIG. 31B, node 2961 is indicated as the current node by the darkening of line 3120. The "Add" button is then pushed, which generates a User Request of type "add child node." Step 2810 tests in the affirmative, leading to step 2811, which also tests in the affirmative (because "Thermostats" represents list node 2961). A new thermostat is then added by execution of step 2812. Because a thermostat is assumed to be a primitive data type (of type "Thermostat"), although subroutine 2802 is called, it has no effect.

Figure 32B:
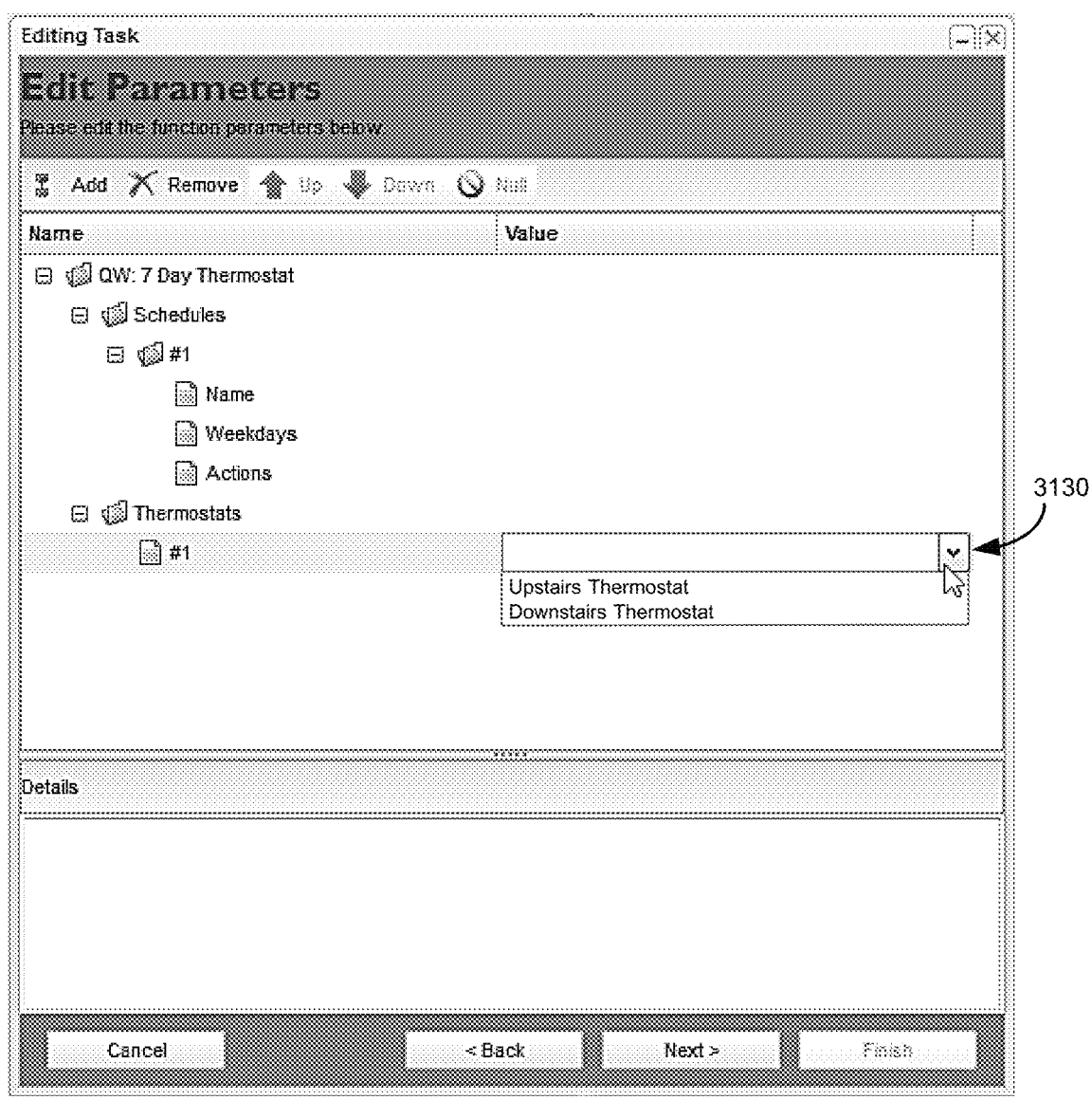
FIGS. 32B-32C show, in the Argument Editor GUI, the selecting a specific thermostat.
Figure 32C:
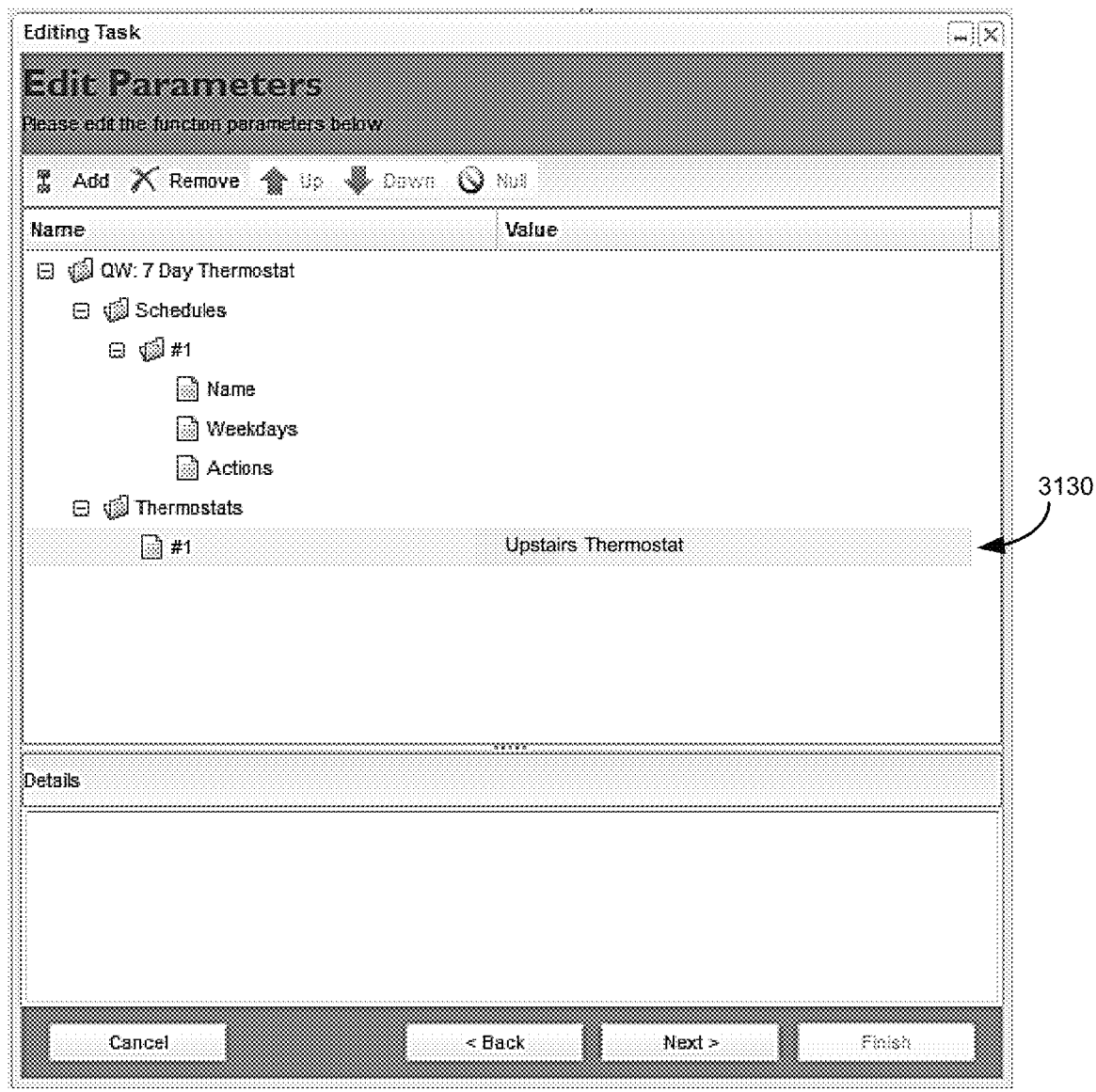

FIG. 32A shows then end result of a specific thermostat having been selected through the GUI. The thermostat selected is assumed to have an ID number, within the end-user's IoT system, of 103. FIGS. 32B-32C show an example GUI by which this value may be set. FIG. 32B shows a drop-down menu (at line 3130), that can be activated, for example, by a mouse click in the "Value" half of line 3130. As can be seen, the drop-down menu has two thermostats potentially selectable: a thermostat with the display name "Upstairs Thermostat," and a thermostat with the display name "Downstairs Thermostat." In FIG. 32C it can be seen that for thermostat #1, the Upstairs Thermostat has been selected. For purposes of example, this Upstairs Thermostat is assumed to have ID number 103.

With respect to the Argument Editor flowchart of FIG. 28, the selecting of the Upstairs Thermostat can be described as follows. We assume that flow of control is at step 2801, waiting for a User Request. As discussed above with respect to FIG. 32B, node 3110 has been indicated as the current node by the darkening of line 3130. A User Request occurs (of type "set or modify non-null value") when, as discussed above for FIG. 32B, the drop-down menu interface, listing thermostats for potential selection, is activated. Each of the following decision points tests negative: 2810, 2820, 2830, and 2840. However, decision point 2850 tests affirmative, because we are trying to set a non-null value (i.e., a thermostat value) to a leaf node (i.e., to leaf node 3110). Step 2851 is executed, in which the available thermostats are visualized as shown in FIG. 32B, and the selection of the Upstairs Thermostat is accepted as shown in FIG. 32C.

Figure 33B:
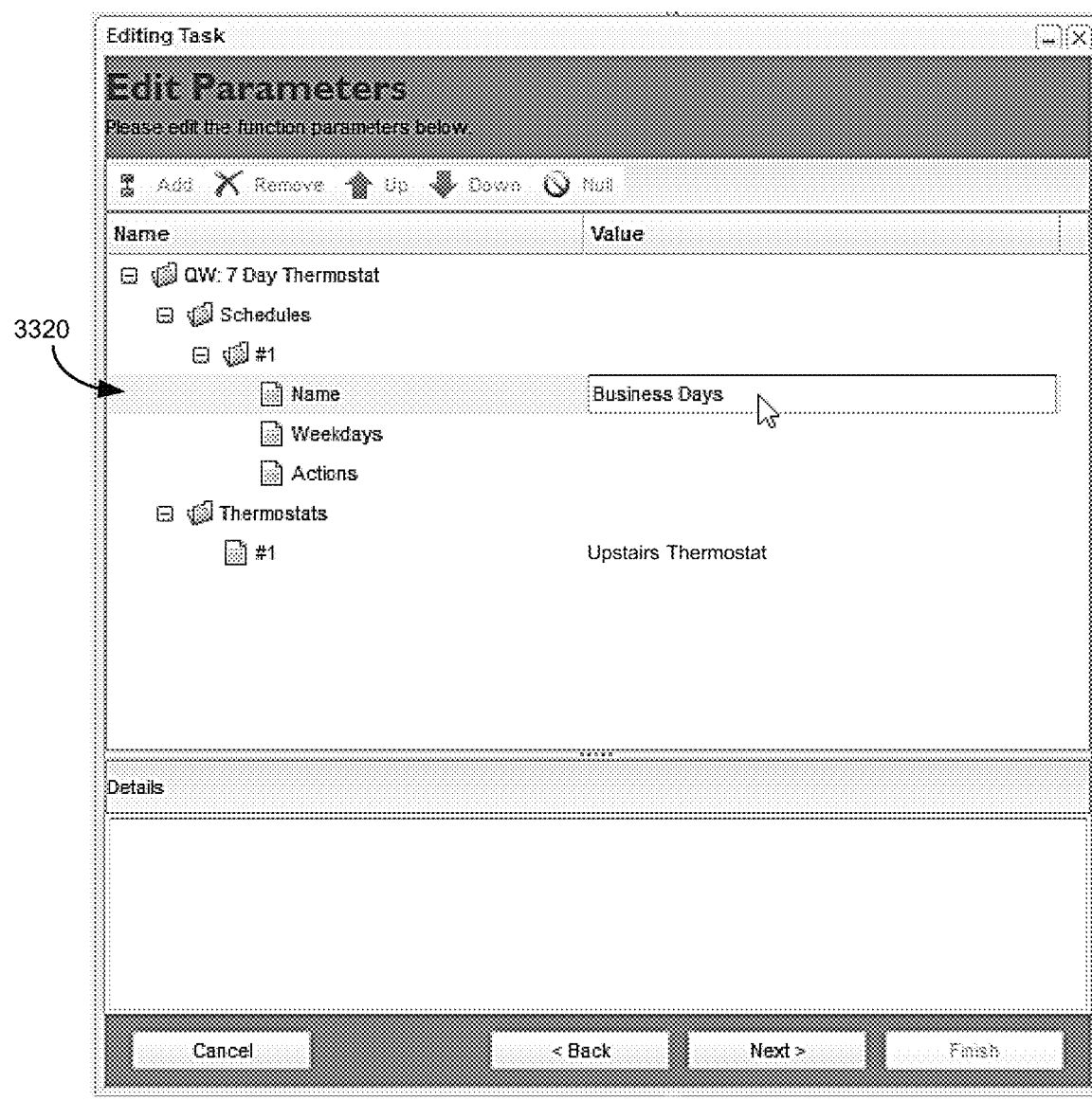
FIG. 33B shows the result, in the Argument Editor GUI, of filling in a non-default data value, for a first key-value pair of schedule instance #1.

FIG. 33B represents a shift in the end-user's focus, back to filling in non-default data values, for the key-value pairs of schedule instance #1 (node 3010 of FIG. 33A). Specifically, FIG. 33B shows "Name" as the indicated current subject for data entry (because of darkening of line 3320). Further, on the "Value" side of line 3320, a dialog box has already been activated (for example, by a mouse click in that region), and the string "Business Days" is already typed in. In FIG. 33A, the changes, with respect to FIG. 32A, are enclosed in dotted outline 3300. Specifically, for node 3011, the empty string has been changed to "Business Days."

In terms of the Argument Editor flowchart of FIG. 28, the entry of the string "Business Days" is handled in essentially the same way a specific thermostat was selected (after a default thermostat was added to the "Thermostats" list). In both cases, the objective is to set a non-null value to a primitive (or leaf node) type. In the case of FIGS. 33A-33B, the type is "String," rather than "Thermostat."

Figure 34B:
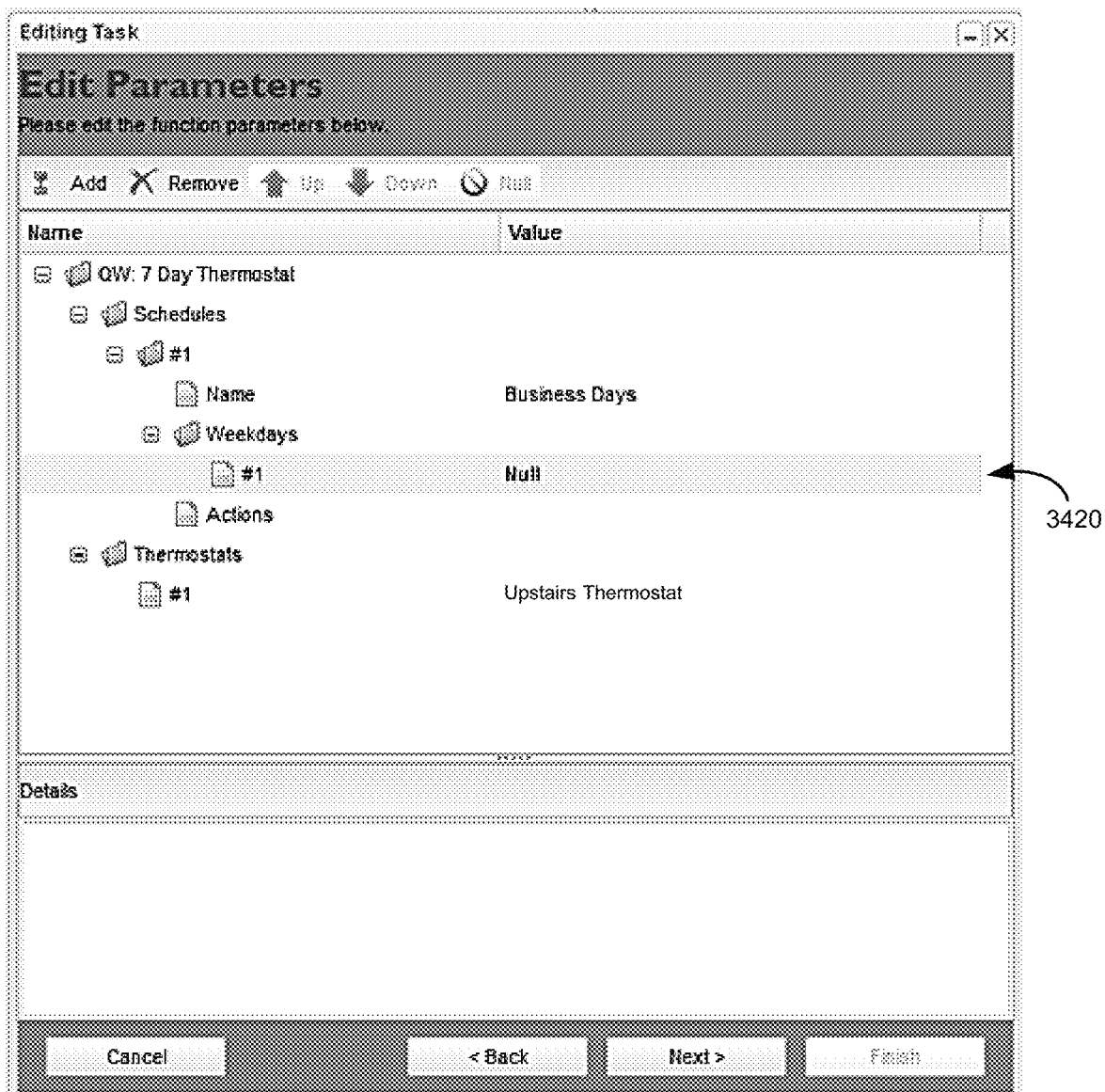
FIG. 34B shows, in the Argument Editor GUI, the first half of a process, by which an enumerated value is added, in order to represent a day of the week.

FIG. 34B shows the first half of the process, by which an enumerated value is added, in order to represent a day of the week. FIG. 34B shows a default enumerated value of Null, with a display name of #1, having been added at line 3420. The addition of the value corresponds to node 3410, shown in FIG. 34A. Once again, a dotted outline (in this case numbered 3400) depicts the change, from FIG. 33A to 34A.

In terms of the Argument Editor flowchart of FIG. 28, the addition of node 3410 is essentially the same process discussed above, for the initial addition of a default thermostat. In both cases, pressing the "Add" button (after the appropriate node is indicated as the current node) generates an "add child node" type User Request, that is detected by decision point 2810. Then, decision point 2811 is also answered in the affirmative, leading to the addition of a new child node, by step 2812, representative of a primitive type.

Figure 35B:
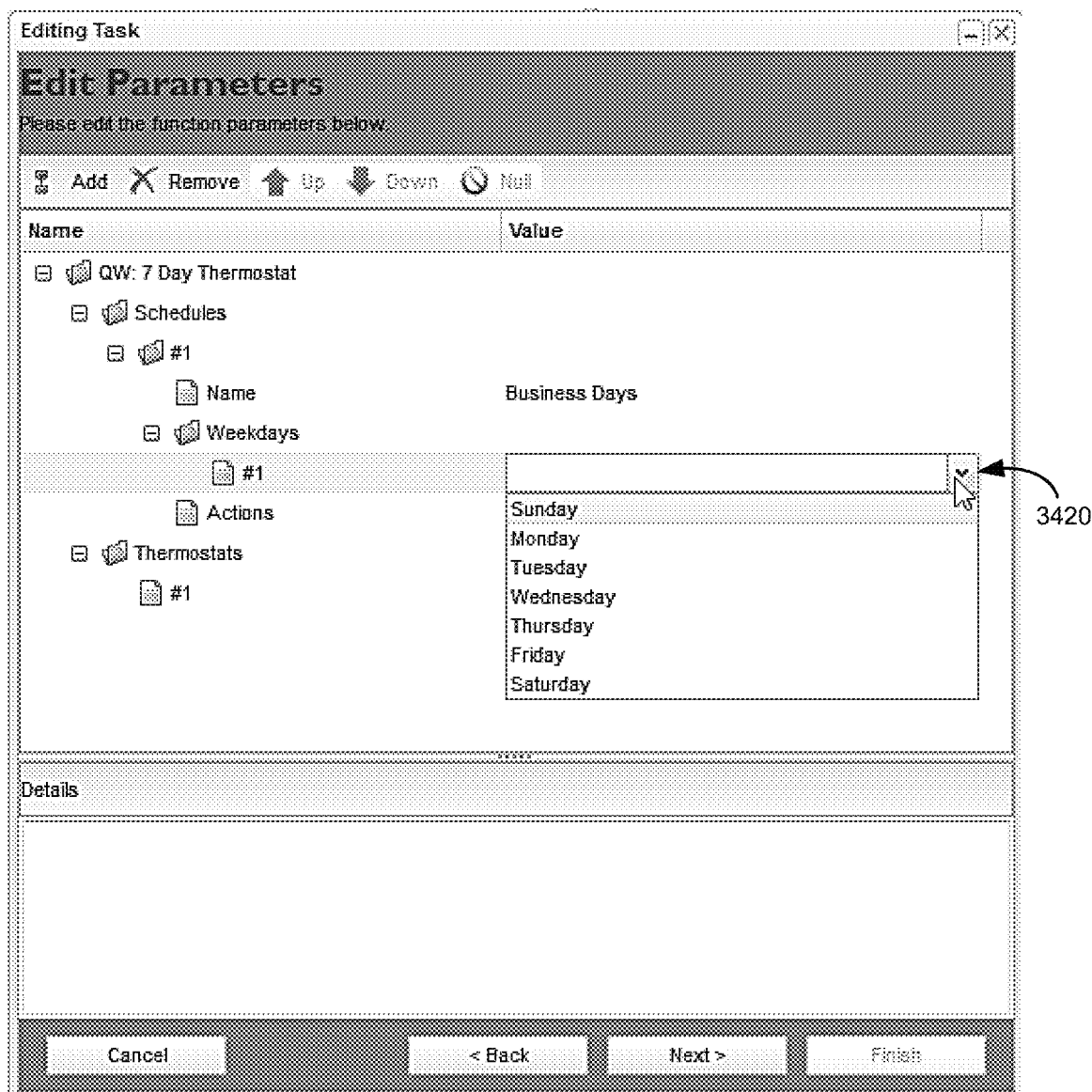
FIGS. 35B-35C show, in the Argument Editor GUI, the second half of a process, by which an enumerated value is set to a specific value, in order to represent a day of the week.
Figure 35C:
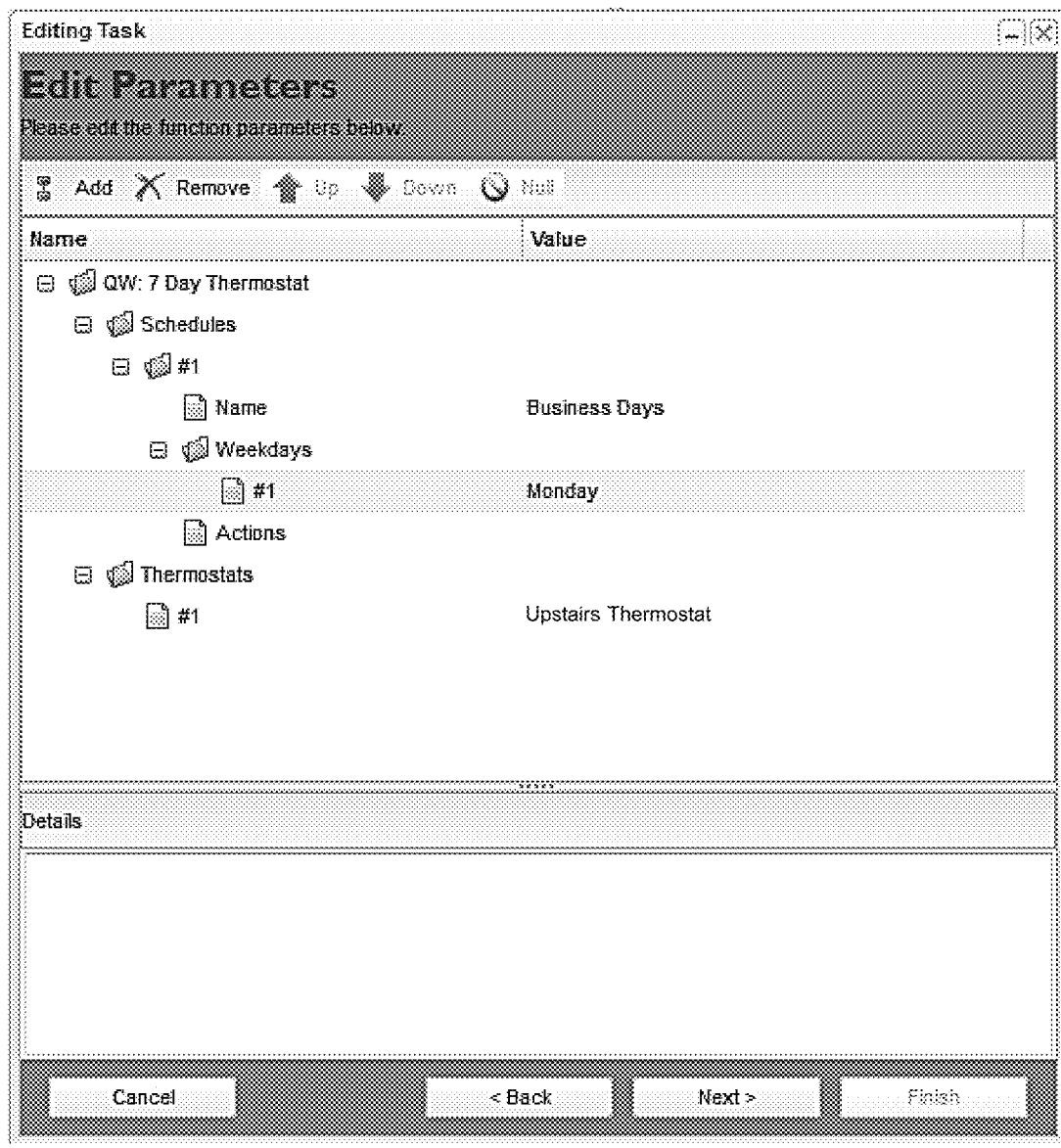

FIG. 35B shows the activation of a drop-down menu interface (at line 3420) from which a day of the week can be selected (in a similar manner to which a specific thermostat was selected). Just like the selection of a specific thermostat, this user interface is executed as a result of decision point 2850 being answered in the affirmative, leading to the execution of step 2851. FIG. 35C shows the GUI after the day "Monday" has been selected. FIG. 35A shows, within dotted outline 3500, an example value for node 3410 as a result of the selection of "Monday." As can be seen, in this case, Monday is represented by the number "1." The selection of this value is a result of two factors:

In the meta-data of FIG. 3, node 345 represents the enumeration as the integer range 0-6.

In the documentation node for node 345, node 509 of FIG. 5A, the "Details" field shows the list of symbolic labels which, respectively, correspond to integer range 0-6. As was already mentioned above, with respect to the Meta-Data Editor, for an enumeration value, the contents of the documentation node assumes a more active role, in the data-entry process. In FIG. 35B, the GUI could show, in the drop-down menu, the values 0-6 rather than the day-names of "Sunday" to "Saturday." However, symbolic labels (particularly when they are words of the natural language in which the end-user is fluent) are generally much easier for a person to use.

Figure 36B:
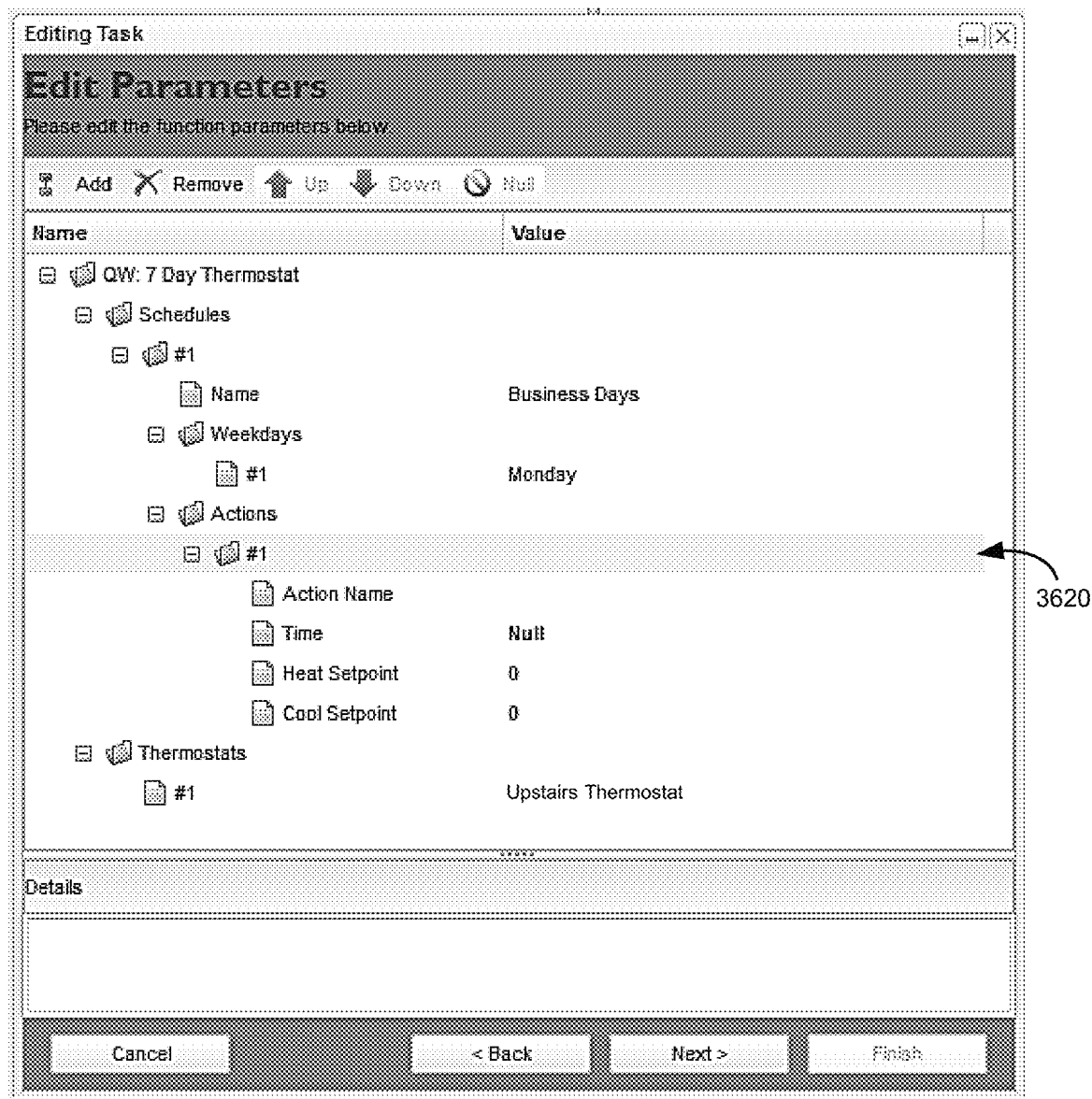
FIG. 36B shows the Argument Editor GUI after a first action instance has been added to the list of "Actions."

FIG. 36B shows the GUI after an action instance (at line 3620) has been added to the list "Actions." In FIG. 36A, dotted outline 3600 contains the corresponding data nodes added to the data structure being created:

Node 3610 represents the action instance itself, which is a Table.

Nodes 3611 to 3614 represent the auto-populated key-value pairs, that occur when a table is added. Depending upon its type, each key-value pair is initialized to an appropriate value:

Node 3611 corresponds to meta-data node 352 of FIG. 3, which is of type String. Therefore, its initial value is the empty string.

Node 3612 corresponds to meta-data node 353 of FIG. 3, which is of type Time. Therefore, its initial value is null.

Nodes 3613 and 3614 both correspond to a meta-data node (i.e., 354 and 355) of type Number. Therefore, each of these nodes is initialized to 0.

Figure 37B:
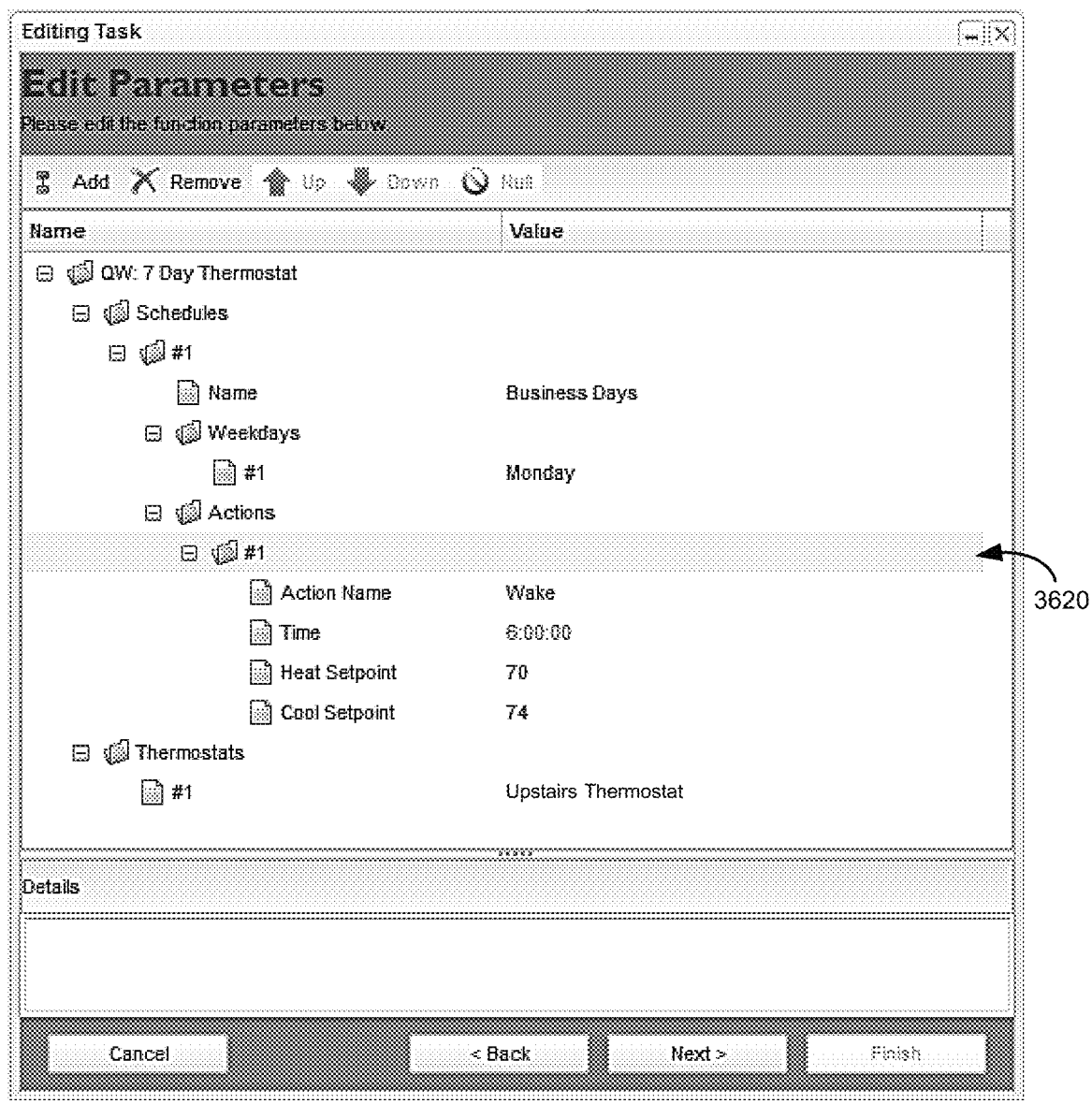
FIG. 37B shows, in the Argument Editor GUI, the result of setting the first action instance to non-default values.

FIG. 37B shows the same action instance of FIG. 36B (node 3610 represented by line 3620), except the default values have been replaced with values input by the end-user. The setting of these values is also reflected in FIG. 37A, within dotted outline 3700:

Node 3611 has been set to the string "Wake."
Node 3612 has been set to 6 AM.
Node 3613 has been set to 70 as the heat setpoint.
Node 3614 has been set to 74 as the cooling setpoint.

At this point, at least one instance has been created, for all lists of the meta-data of FIG. 3:

For the list represented by node 331 in FIG. 3 (which corresponds to node 2931 in FIG. 37A), a "Table" type instance, represented by node 3010 in FIG. 37A, has been created.

For the list represented by node 361 in FIG. 3 (which corresponds to node 2961 in FIG. 37A), a thermostat type instance, represented by node 3110 in FIG. 37A, has been created.

For the nested list represented by node 343 in FIG. 3 (which corresponds to node 3012 in FIG. 37A), an enumeration type instance, represented by node 3410 in FIG. 37A, has been created.

For the nested list represented by node 344 in FIG. 3 (which corresponds to node 3013 in FIG. 37A), a "Table" type instance, represented by node 3610 in FIG. 37A, has been created.

Figure 38B:
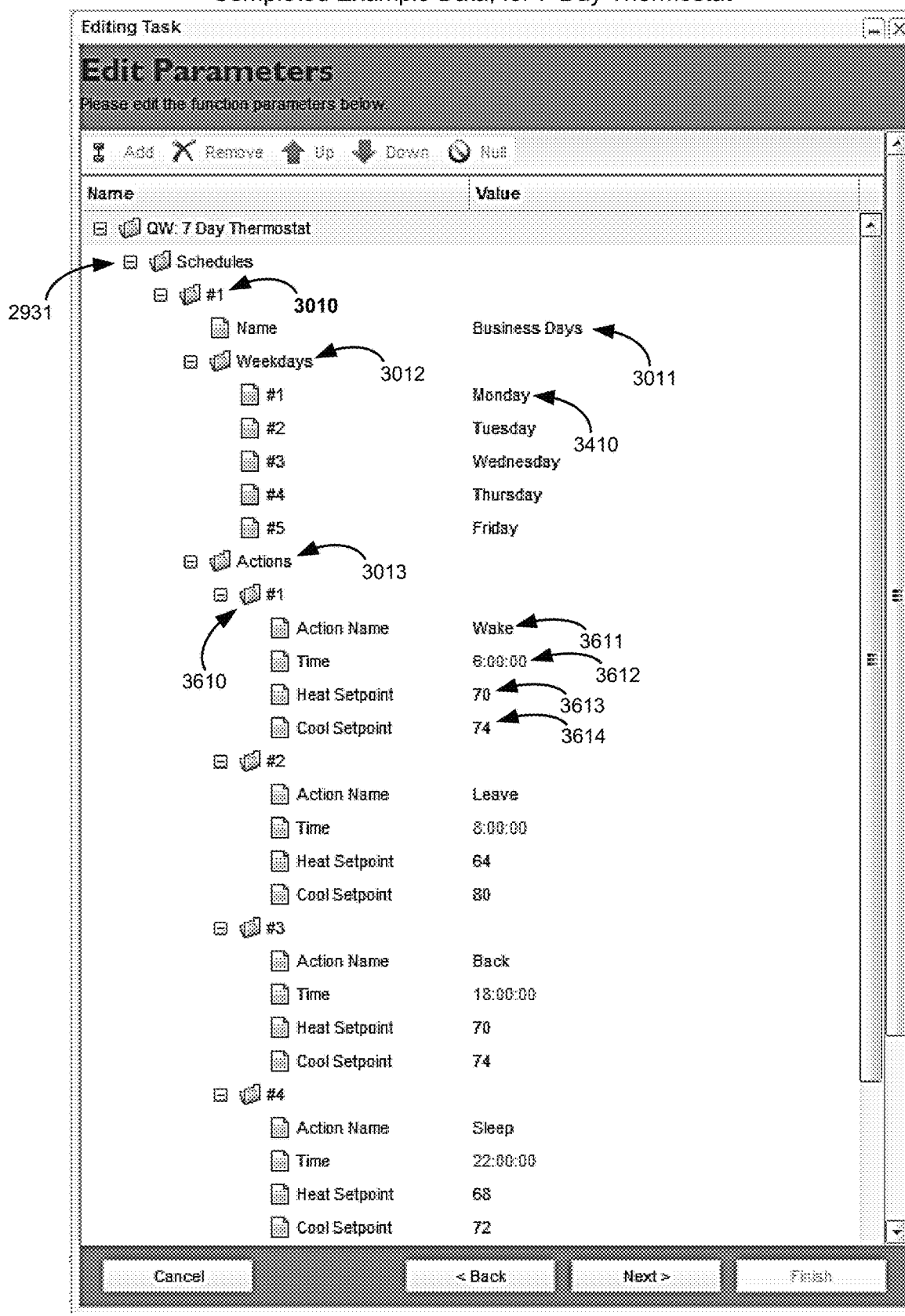
FIGS. 38B-38C depict an Argument Editor GUI representation of the finished argument data, for submission to the SevenDayThermostat app.
Figure 38C:
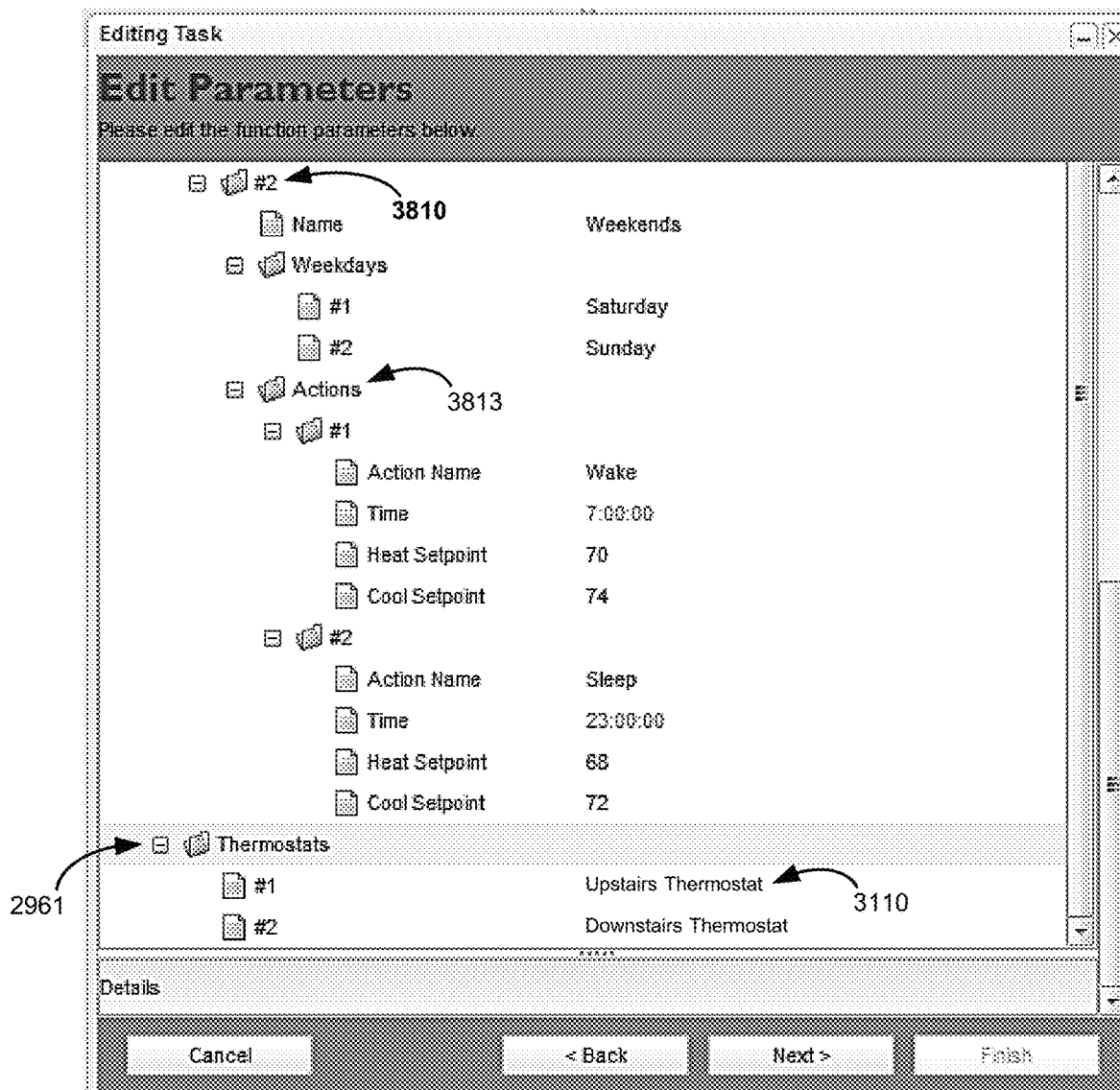

In order to have a thermostat schedule of practical use, however, an end-user can be expected to add additional instances to at least some of these lists. FIGS. 38B-38C depict a GUI view of an example practical thermostat schedule. This is, essentially, an entry of the data first presented with FIG. 2 and it is intended to have the same functionality discussed with respect to FIG. 2. Because the schedule of FIGS. 38B-38C is relatively complex, each display name or value of these figures, that corresponds to a node of FIG. 37A, is indicated. Specifically, for each node of FIG. 37A that represents a list (nodes 2931, 3012, 3013, and 2961) or an instance of a table within a list (nodes 3010 and 3610), the corresponding display name, in FIG. 38B or 38C, is indicated. For each node of FIG. 37A that represents a leaf node (nodes 3011, 3410, 3611-3614, and 3110), its corresponding value, in FIG. 38B or 38C, is indicated.

FIG. 38A includes all the nodes of FIG. 37A, with the same node numbering, but FIG. 38A also includes all the additional nodes indicated by the GUI of FIGS. 38B-38C. The schedule represented by the GUI of FIGS. 38B-38C is now described as follows, with respect to the node-and-edge diagram of FIG. 38A (to reduce the amount of node labeling needed, pair of axes 3800 is added to the figure).

As can be seen, list node 2931 has two schedule instances: node 3010 and node 3810. Schedule instance 3010 has been given the name "Business Days" (by its direct child node 3011) and is intended to convey the end-user's desired schedule of temperature ranges, throughout each day during the working week. Node 3012 is intended to enumerate those specific days that constitute the end-user's workweek. In this case, the end-user has a very standard Monday through Friday workweek. For each day enumerated under node 3012, under node 3013 is the schedule of temperature ranges to be followed. The schedule of temperature ranges under node 3013 is organized from left to right, along the "X" axis.

The first temperature range is under table-instance node 3610 (that also has display name #1). The temperature range is specified by the four key-value pairs, numbered 3611-3614. These four key-value pairs are organized from top to bottom, along the "Y" axis. The top key-value pair gives this temperature range the name "Wake," and it is supposed to be the end-user's desired temperature range upon waking up. The next lower key-value pair specifies the time at which the "Awake" temperature range is to begin: 6 AM. The two lowest key-value pairs (nodes numbered 3613 and 3614) specify, respectively, the desired heating setpoint and cooling setpoint. As can be seen, when the end-user's awakens, he/she prefers temperatures in the range of 70-74. Therefore, in colder weather, the heating system will be activated until a temperature of about 70° F. has been reached. Conversely, during hot weather, the cooling system will be activated until a temperature of about 74° F. is achieved.

Moving from left to right, along the "X" axis, the second temperature range is under the node with display name "#2." From top to bottom, along the "Y" axis, the four key-value pairs of this second temperature range are as follows. The top key-value pair gives this temperature range the name "Leave," and it is supposed to be the end-user's desired temperature range when he/she leaves his home for work. The next lower key-value pair says that the end-user expects to leave for work at 8 AM. While the end-user is away at work, the two lowest key-value pairs specify that he/she prefers the home be maintained in a temperature range of 64-80° F. Thus, by having an intelligent schedule-based thermostat, the end-user can save considerably on energy costs.

Continuing to move from left to right, along the "X" axis, the third temperature range is under the node with display name "#3." From top to bottom, along the "Y" axis, the four key-value pairs of this third temperature range are as follows. The top key-value pair gives this temperature range the name "Back," and it is supposed to be the end-user's desired temperature range when he/she arrives back home from work. The next lower key-value pair says that the end-user expects to arrive back home at 6 PM. While back at home during the evening/night, the end-user prefers the same temperature range of 70-74° F., that he/she prefers upon waking in the morning.

Finally, the rightmost (and forth) temperature range is under the node with display name "#4." From top to bottom, along the "Y" axis, the four key-value pairs of this third temperature range are as follows. The top key-value pair gives this temperature range the name "Sleep," and it is supposed to be the end-user's desired temperature range when he/she is sleeping. The next lower key-value pair says that the end-user expects to go to sleep at about 10 PM. While sleeping, this particular end-user prefers temperature that is a little bit cooler than what he/she prefers while. The two lowest key-value pairs specify that prefer temperature range is 68-72° F.

Now that schedule-instance node 3010 has been addressed, schedule-instance node 3810 is described. Schedule instance 3810 has been given the name "Weekends" (by its leftmost direct child node) and is intended to convey the end-user's desired schedule of temperature ranges, throughout each day on the weekend. Moving from left to right, along the "X" axis, the next direct child node enumerates those specific days that constitute the end-user's weekend. In this case, the end-user has a very standard Saturday-Sunday weekend. The rightmost direct child node (of schedule-instance node 3810) is numbered 3813. The schedule of temperature ranges under node 3813 is organized from left to right, along the "X" axis.

The first temperature range is under the table-instance node with display name #1. From top to bottom, along the "Y" axis, the four key-value pairs of this first temperature range are as follows. The top key-value pair gives this temperature range the name "Wake," and it is supposed to be the end-user's desired temperature range when he/she is awake on the weekend. The next lower key-value pair says that the end-user expects to wake up a little later on weekends: 7 AM. While awake, this particular end-user prefers a temperature range of 70-74° F.

Since the end-user anticipates that he/she can be home at any time of day, on weekends, there is no inclusion of a temperature range for when he/she "Leaves," or when he/she is "Back." The second (and rightmost) temperature range is under the table-instance node with display name #2. From top to bottom, along the "Y" axis, the four key-value pairs of this first temperature range are as follows. The top key-value pair gives this temperature range the name "Sleep," and it is supposed to be the end-user's desired temperature range when he/she is sleeping. The next lower key-value pair says that the end-user expects to go to sleep later on weekends, at about 11 PM. The two lowest key-value pairs specify the same preferred temperature range for sleeping as a specified for weekdays: 68-72° F.

Regarding argument root node 2961, it can be seen that an additional thermostat, referenced by node 3850, has been added. This second thermostat is assumed to have ID number 115. It can be seen, in FIG. 38C that the second thermostat is the "Downstairs Thermostat."

7 Attributes

While tree-structuring and homogeneous lists are powerful tools, by which a developer can provide options to an end-user, it can sometimes be useful to provide options by which an end-user can, at least in part, opt-out from this expressiveness.

In addition to having a Type, a meta-data node can be further qualified through the use of one or more attributes. For example, the fact that meta-data nodes 331 and 361 are parameter-roots, can be seen in FIG. 3 by the inclusion of the "parameter:" attribute, placed on the left side of each of these nodes.

It can also be very useful to add a "nullable:" attribute, to one or more of the meta-data nodes by which a parameter is specified. If added to a meta-data node, the nullable attribute means that, during the subsequent Argument Editor process, the corresponding argument data node can simply be assigned the Null value. This ability to assign just a Null value applies even if, in the corresponding meta-data, there is a complex subtree below the nullable meta-data node.

FIG. 39 depicts an example "test" function, created purely for purposes of illustrating an example use for the nullable attribute.

FIG. 40A depicts an example meta-data for the test function, as displayed in the Meta-Data Editor. As was done for section 5.1 ("Presenting Meta-Data"), with respect to FIG. 4C, dotted lines parallel to the Y-axis have been added, in order to emphasize the columns for "Native Name" (column 4000), "Type" (column 4001), and "Display Name" (column 4002).

Line 4010 of FIG. 40A represents the sole parameter "p1" of test, which can be seen (in column 4001) to be of Type Table. Rather than consisting of only one Table, however, the developer has chosen to structure this parameter to contain two sub-tables:

The first sub-table is at line 4020, and has Native Name "Options." This table is intended to allow an end-user to specify, if necessary, additional parameters for altering the execution of "test." As can be seen, the optional parameters of the Options table are called Option_A and Option_B.

The second sub-table is at line 4030, and has Native Name "Main_Data." This table is intended to hold data that an end-user must specify every time the test app is used. The required items of Main_Data are called Data_Item_1 and Data_Item_2.

Figure 40B:
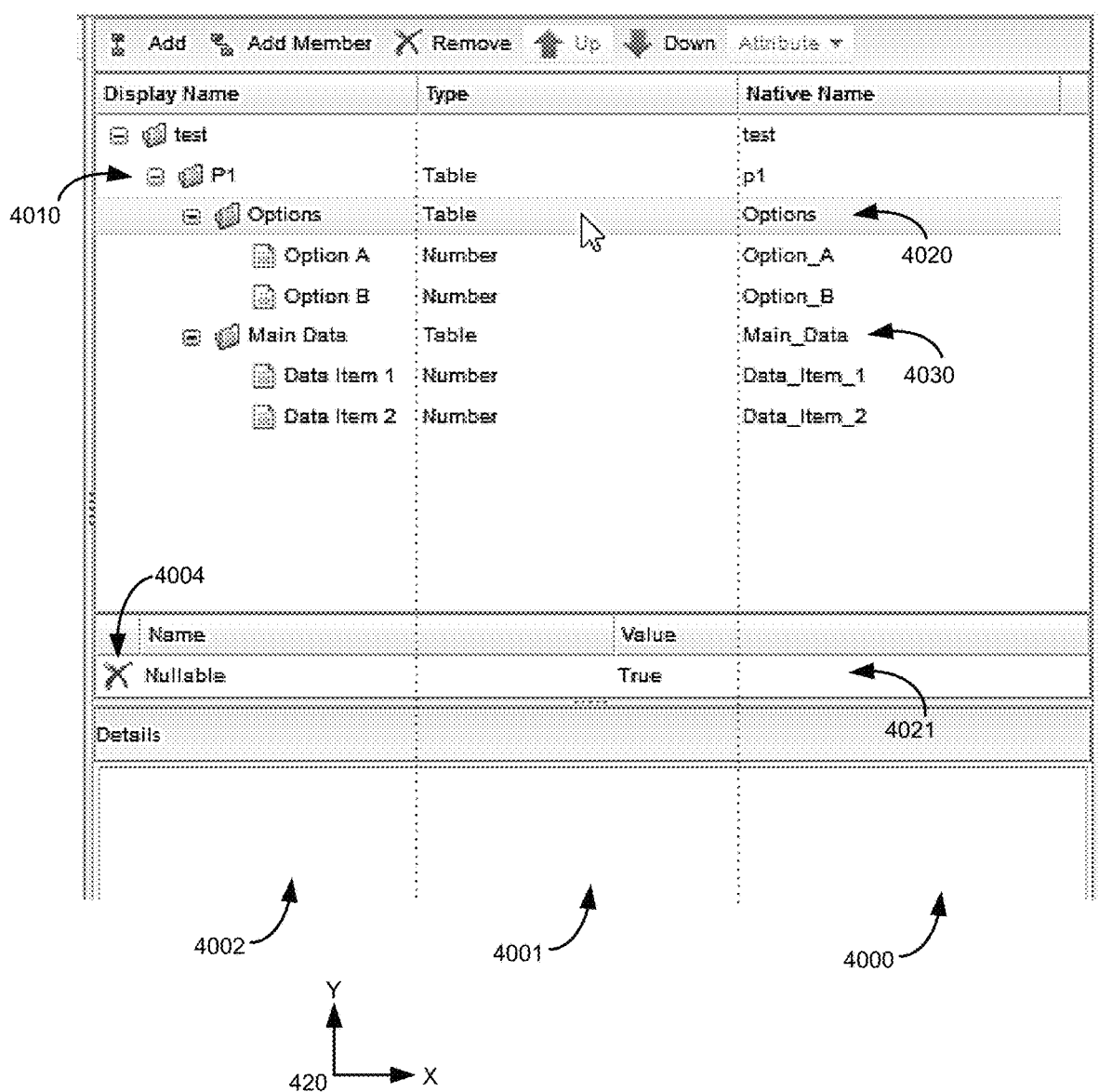

The optional nature of the Options sub-table can be seen in FIG. 40B. In this figure, the Options sub-table has been indicated to be the current node by the fact of line 4020 being darkened. If a current node has an attribute, it is displayed, for this GUI, in an attributes pane that is in-between the upper and lower display panes. For FIG. 40B, the attribute "Nullable" can be seen, within an attributes pane, at line 4021. If the developer wishes to remove this attribute, the "X" button, on the far left side of line 4021 (see screen region 4004), can be pushed with the mouse pointer.

With respect to FIG. 9, whether the developer has made a User Request, of adding or removing an attribute, is determined by decision point 940, and executed by step 941.

Figure 40C:
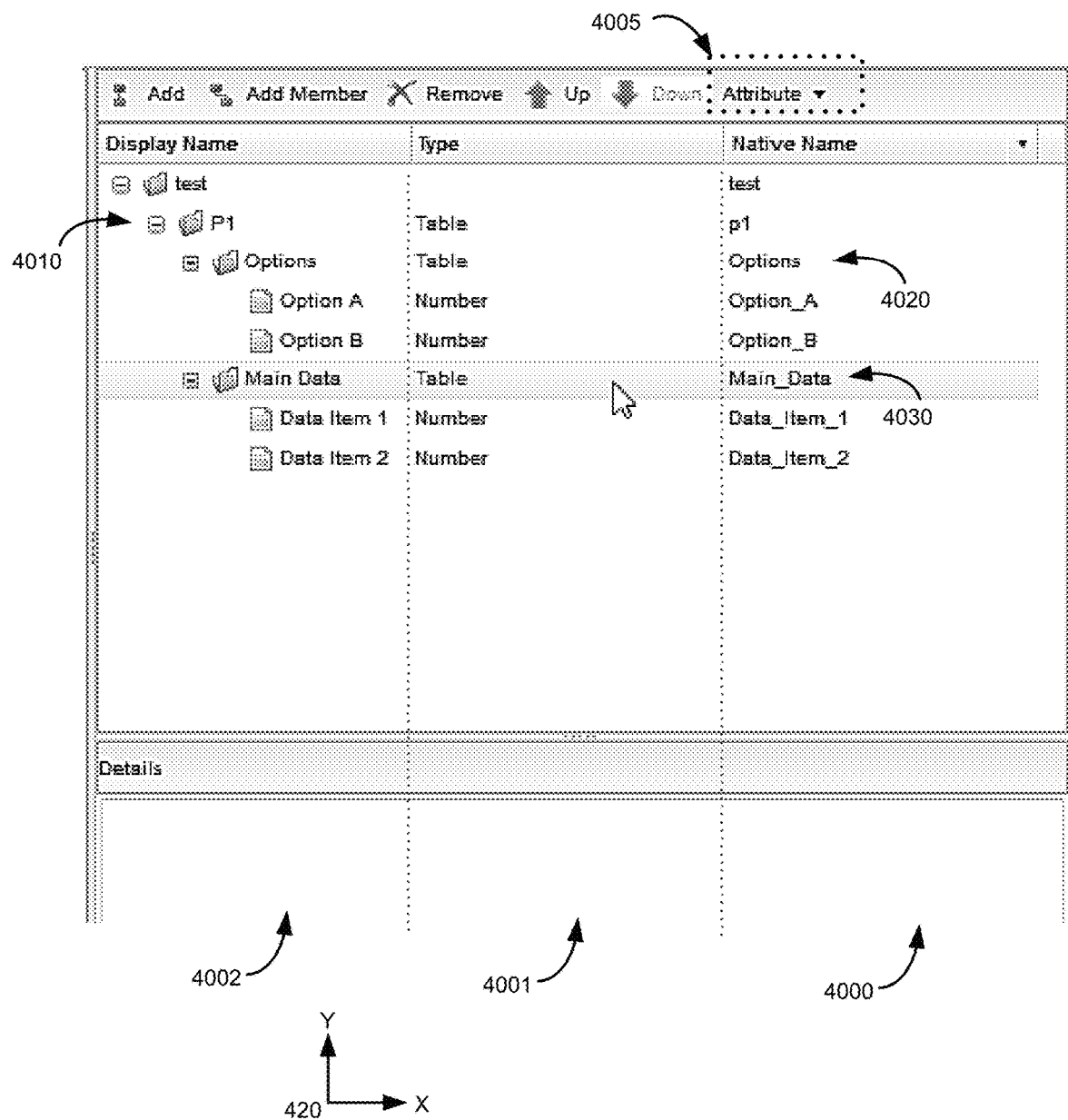

The required nature of the Main_Data sub-table can be seen in FIG. 40C. In this figure, the Main_Data sub-table has been indicated to be the current node by the fact of line 4030 being darkened. In contrast to FIG. 40B, however, there is no attributes pane displayed. If the developer wishes to add an attribute, the "Attribute" button can be pushed with the mouse pointer. Dotted outline 4005 encloses the Attribute button.

The advantages of using the "Nullable" attribute, during app development, can be seen in the example end-user Argument Editor screen of FIG. 41A. This screen can be the initial data entry screen, seen by an end-user upon selecting to execute the "test" app.

As was done previously (e.g., see section 6.2 "Constructing an Argument," FIG. 29C) a dotted line 4100 is added to FIG. 41A, to emphasize the "Name" and "Value" halves of the Argument Editor's upper display pane.

As can be seen, the "Options" table of line 4110, because it is nullable, is shown to the end-user as being set to Null and with no internal features of the table displayed. In contrast, the "Main Data" table of line 4120 is shown as fully populated (as a result of step 2802 of FIG. 28), with default values of 0, for both "Data Item 1" and "Data Item 1." Also, as a result of a User Request to "set or modify a non-null value" (that satisfies step 2850 of FIG. 28), a dialog box is shown on line 4121, for changing the value of "Data Item 1."

In FIG. 41B, the end-user is shown as preparing to remove the "Null" setting. Line 4110 is shown as indicating the current node (see darkening), and the end-user is about to press the "Table" button (enclosed by dotted outline 4101). In FIG. 41C, the Argument Editor is shown with the "Null" setting having been removed from the "Options" table of line 4110. With respect to FIG. 28, this step can be performed by decision point 2840 testing in the affirmative, leading to the execution of step 2841. Because step 2841 will make a subroutine call to step 2802, the "Options" table is fully populated, with default values of 0, for both "Option A" and "Option B." Because there is no "Null" value to be removed from the currently-indicated node (which happens to be "Option B"), the "Table" button (within dotted outline 4101) is grayed-out.

Figure 42:
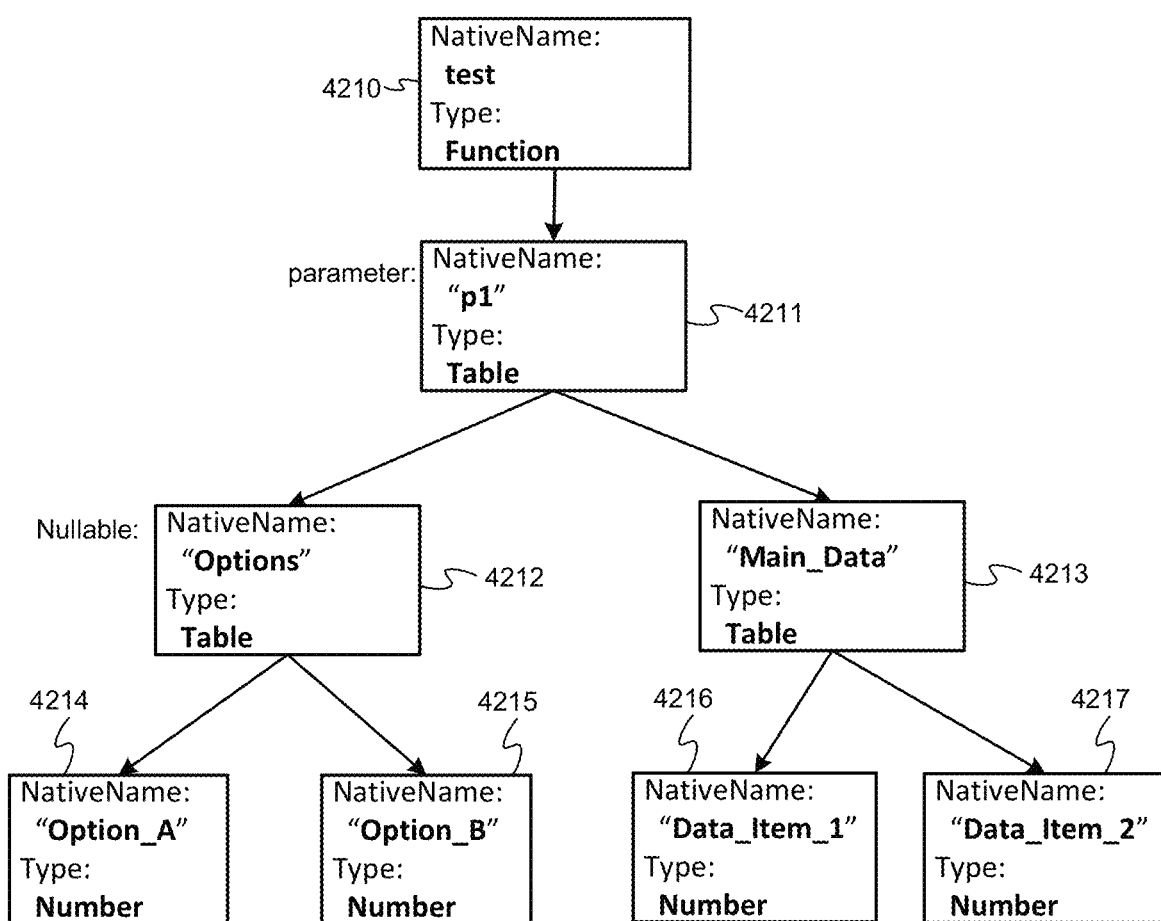
FIG. 42 represents example meta-data, that can correspond to the GUI views of FIGS. 40A-40C.

FIG. 42 represents example meta-data, that can correspond to the GUI views of FIGS. 40A-40C. For example, line 4010 corresponds to node 4211 of FIG. 42. As can be seen, node 4211 has the "parameter:" attribute on its left side. Line 4020 corresponds to node 4212, and line 4030 corresponds to node 4213. As can be seen, node 4212 has the "nullable:" attribute on its left side.

Figure 43A:
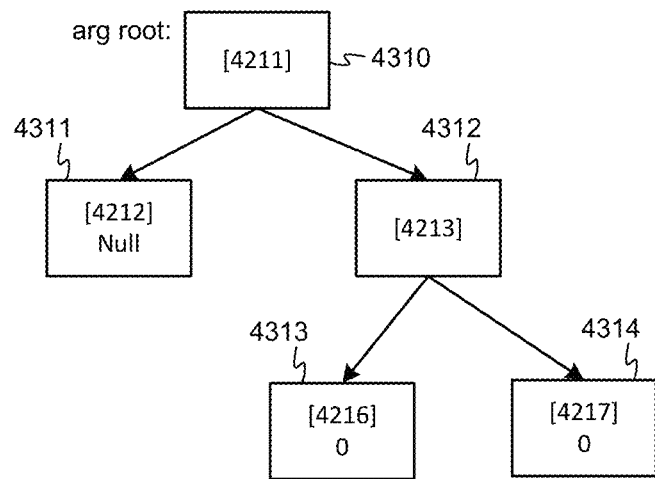
FIG. 43A represents, at the argument-node level, the Argument Editor view of FIG. 41A.

The Argument Editor view of FIG. 41A can be represented at the argument-node level by FIG. 43A. As can be seen, the fact that the node corresponding to the "Options" node (node 4311) is initially "Null" is represented by the value stored within node 4311. However, each of the "Main Data" nodes, Data Item 1 and Data Item 2, has a corresponding value node. These corresponding value nodes are node 4013 and node 4314.

Figure 43B:
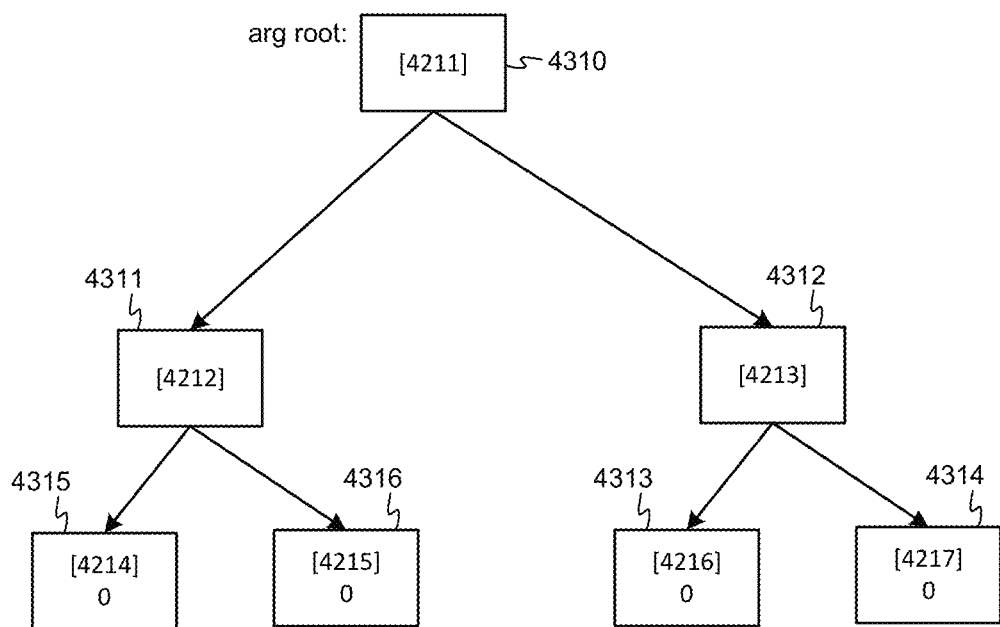
FIG. 43B represents, at the argument-node level, the Argument Editor view of FIG. 41C.

The Argument Editor view of FIG. 41C can be represented at the argument-node level by FIG. 43B. As can be seen, since the "Options" table is no longer Null, each of Options "A" and "B" has a corresponding value node. These corresponding value nodes are node 4015 and node 4316.

In addition to whether a node can be represented by a null value, many other kinds of attributes can be useful additions to the meta-data. Some further examples include the following:

Maximum value: if a meta-data node represents something that will receive a quantitative value in the Argument Editor, it can sometimes be helpful if the developer can specify a maximum value. For example, with respect to the thermostat meta-data of FIG. 3, for the heatSetPoint of node 354, it might be helpful to set a maximum value. For example, the end-user could be limited to setting the temperature of no higher than 90° F.

Minimum value: if a meta-data node represents something that will receive a quantitative value in the Argument Editor, it can sometimes be helpful if the developer can specify a minimum value. For example, with respect to the thermostat meta-data of FIG. 3, for the coolSetPoint of node 355, it might be helpful to set a minimum value. For example, the end-user could be limited to setting the temperature of no lower than 60° F.

Step size: if a meta-data node represents something that will receive a quantitative value in the Argument Editor, it can sometimes be helpful if the developer can specify the size of each increment or decrement, within the applicable range. For example, with respect to the thermostat meta-data of FIG. 3, for the time of node 353, it might be helpful to require time to be specify in quarter-hour units.

8 Additional Information

8.1 IoT Device

As used herein, an IoT device is a physical device that, through the provision of an embedded computer system and network connectivity, becomes remotely accessible. The remote access can be for purposes of instructing the physical device (remote control), acquiring information from the physical device (remote sensing), or both.

The power of such IoT devices typically arises from their ability to interoperate with each other, in new and often unforeseen ways, under the direction of a remotely-located general-purpose computing platform (the "IoT controller"). By adding new software to the IoT controller, a new behavior can emerge, from the IoT devices with which it is connected. For example, such interoperability can often be characterized as remote sensing, from one or more IoT devices, causing, under the direction of an IoT controller, changes in the remote control of one or more IoT devices.

While possessing network connectivity, an IoT device does not need to include the capability of connecting to the Internet on its own. For example, it is often the case that the end result to be achieved, by software executing on an IoT controller, can be accomplished with IoT devices that are all located at a common deployment location. For at least this reason, it is often the case that the IoT device itself only possesses LAN connectivity. If the IoT controller is also located at the deployment location, it can be the case that an entire IoT system is created which lacks Internet connectivity. However, it is almost always the case that an IoT system includes, at some part of the system, at least one Internet connection.

While an IoT device can achieve its network connection using non-IoT LAN networking protocols, such as Ethernet or the 802.11 suite of protocols, in the context of an IoT device, such LAN protocols often involve significant disadvantages. For example, a non-IoT LAN protocol can possess any combination of the following disadvantages:

require hardware that consumes an excessive amount of power;

require hardware too expensive for incorporation into the device in an economically-viable way;

provide connectivity with an unacceptably low level of reliability;

is not designed to accommodate a sufficient number of devices with simultaneous network connectivity.

For these reasons, and others, the LAN to which an IoT device connects is often specialized to the needs of IoT-type systems. Such IoT-LAN protocols typically possess at least some combination of the following advantages:

low-power;

inexpensive hardware;

high reliability;

accommodate a large number of simultaneously-connected devices.

In order to achieve these advantages an IoT-LAN protocol can often leverage certain requirements that are easier to achieve than those for which non-IoT LAN's were designed. These advantages can include, at least, any combination of the following:

low-speed connectivity;

small message size.

Example IoT LAN protocols based on wireless connectivity include the following:

6LoPAN (RFC 4944, and related, of the Internet Engineering Task Force, Freemont, Calif., USA), Bluetooth (Bluetooth Special Interest Group, Kirkland, Wash., USA).

ZigBee (ZigBee Alliance, Davis, Calif., USA), and

Z-Wave (Z-Wave Alliance, Freemont, Calif., USA).

An example IoT LAN prototcol that uses both wired (powerline wiring) and wireless connectivity is Insteon (SmartLabs, Inc., Irvine, Calif., USA).

An example of a particularly common IoT device is an IoT device that replaces the ordinary wall-mounted light switch. In contrast to the ordinary wall switch, which simply opens or closes an electrical circuit as a result of mechanical user input, the IoT wall switch has the following two capabilities:

It becomes a remote sensing device. Specifically, the remotely-located IoT controller can detect whether the switch is in the "on" or "off" position, or receive the on/off state change notification in real time.

It becomes a remote controlled device. Specifically, the remotely-located IoT controller can instruct the wall switch, to either open or close the electrical circuit to which it is connected.

For purposes of backwards compatibility, and to provide protection against temporary interruptions in an IoT-based service, it is often the case that an IoT device will offer a level of local control. For example, for an IoT wall switch, setting its switch to the "on" position will typically cause completion of the electrical circuit to which it is connected, without the involvement of an IoT controller. However, such local control is typically implemented as simply an additional, and parallel, control path. For example, even if the light, electrically powered by an IoT wall switch, has been turned "on" as a result of its switch being put in the "on" position, subsequent signals from the IoT controller can still toggle the light between "on" and "off" states.

In certain circumstances, an IoT "device" can be simulated, within the context of a more general-purpose computing system. For example, many smartphones qualify as a general purpose computing system, and are often used as such. However, the smartphone's combination of a small physical package, along with a rich variety of input/output devices, permit it to be used, for at least certain limited periods of time, as a simulated special-purpose device.

For example, by executing an appropriate app, a smartphone can act as if it is an IoT "switch." Under such circumstances, for example, successive tappings, on a "button" on the smartphone's screen, can be sensed, by software executing on an IoT controller, as the opening or closing of a switch.

8.2 Computing Equipment

In accordance with what is ordinarily known by those in the art, the IoT Controller of FIG. 1 can be implemented through the use of any suitable computing hardware. Suitable hardware can include the use of one or more general purpose computers or processors.

The Application Store can be implemented as a web server. As is known by those in the art, a web server can be implemented through the use of any suitable computing hardware. Suitable hardware can include the use of one or more general purpose computers or processors. Such processors or computers can be dedicated, or, as has become popular in more recent years, their use can be leased through a variety of "cloud computing" service providers.

Each end-user or developer can interact, with a Controller or Application Store, from a web-based interface executing upon a suitable client computer. Suitable hardware for a client computer can include the use of one or more general purpose computers or processors.

Hardware implementation techniques can include the use of various types of integrated circuits, programmable memories (volatile and non-volatile), or both.

Computational hardware, whether in integrated circuit form or otherwise, is typically based upon the use of transistors (field effect, bipolar, or both), although other types of components (e.g., optical, microelectromechanical, or magnetic) may be included. Any computational hardware has the property that it will consume energy, as a necessary part of being able to perform its function. Also, regardless of how quickly it can be made to operate, computational hardware will require some amount of time to change state. Because of its basis on physical devices (electronic or otherwise), computational hardware, however small, will occupy some amount of physical space.

Programmable memories are also often implemented in integrated circuit form, and are subject to the same physical limitations described above for computational hardware. A programmable memory is intended to include devices that use any kind of physics-based effects or properties, in order to store information in at least a non-transitory way, and for an amount of time commensurate with the application. The types of physical effects used to implement such storage, include, but are not limited to: maintenance of a particular state through a feedback signal, charge storage, changes to optical properties of a material, magnetic changes, or chemical changes (reversible or irreversible).

Unless specifically indicated otherwise, the terms computational hardware, programmable memory, computer-readable media, system, and sub-system, do not include persons, or the mental steps a person may undertake.

For any method, procedure or technique described above, to the extent it is implemented as the programming of a computer or other data processing system, it can also be described as a computer program product. A computer program product can be embodied on any suitable computer-readable medium or programmable memory.

The kind of information described herein (such as data and/or instructions), that is on computer-readable media and/or programmable memories, can be stored on computer-readable code devices embodied therein. A computer-readable code device can represent that portion of a memory in which a defined unit of information (such as a bit) can be stored, from which a defined unit of information can be retrieved, or both.

9 Glossary of Selected Terms

[node-number]: In general, in the figures, where a node has a number enclosed in square brackets, it is intended to represent a reference (or pointer) to another node, in one of the other figures, that is labeled with this number. In general, the labeling of a node with a number is accomplished by either including an underlined version of the number (i.e., node-number) within the node, or by graphically attaching the number to the node.

adaption application and adaption data: The application and data, that serve to adapt a GPC to become an embedded-system.

application: Unless the context specifically indicates otherwise, used herein to refer to an item of application software, written by a developer for use by an end-user.

end-user: An entity acting in the role of actually using an application. Can be the same entity as the developer.

entity: As used with respect to the definition of "end-user" and "developer," can be an individual person, a group of persons, or an organization (e.g., a corporation, company, or association).

developer: The entity responsible for the computer programming resulting in the creation of an application.

GUI: Graphical User Interface.

Homogeneous list: As used herein, refers to a list where each item of the list

IDE: Integrated Development Environment.

IoT: Internet-of-things.

IoT device: see "Additional Information" section.

List: As used herein, "list" (or "list-organized structure") is used to refer to any type of data organization, that can store an unbounded number of data items, of any type or complexity, in an ordered series. Thus, for example, a list can often be implemented as an array. However, an array is only one approach, to achieving the desired functionality.

Lua programming language: The Lua programming language was developed in 1993 at the Pontifical Catholic University, of Rio de Janeiro, Brazil.

programmer: Unless the context specifically indicates otherwise, used herein as another term for "developer."

Table: As used herein, a table (or "tabular structure") refers to any type of data organization that achieves the functionality of an associative array. An associative array can be viewed as a collection of key-value pairs. For a particular associative array (or table), each key appears just once, but multiple keys can map to a same value. A hash function is a common implementation technique, for connecting a key to a storage location where its value is stored.

task: An instance of an end-user-selected IoT application (or adaption program) that is actually executing, according to particular adaption data, upon an IoT Controller.

UI: User-interface.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A system for a user interface to an internet-of-things controller, comprising:
   one or more processors and programmable memory, wherein the system is configured:
   to accomplish receiving from a first end-user a first selection of a first application program that, when executed, can remotely access one or more internet-of-things devices, wherein data passed by the first end-user as one or more arguments, to one or more corresponding parameters of the first application program, adapts the first application program to perform specific behavior in a specific hardware environment;
   to accomplish accessing, in response to the first selection of the first application program, a first meta-data specification of a set of all potential arguments, for input to a first parameter, that are properly structured;
   to accomplish operating a first graphical user interface in conformance with the first meta-data specification, in order to permit the first end-user to create a first argument for input to the first parameter;
   to accomplish adding, in accordance with a first tabular meta-data node of the first meta-data specification, a first tabular data node to the first argument;
   to accomplish adding the first tabular data node, in accordance with the first tabular meta-data node, to require at least a first and a second key-value pairs;
   to accomplish identifying a first list-type meta-data node of the first meta-data specification, corresponding to a first key of the first key-value pair;
   to accomplish creating, as part of adding the first tabular data node, a first list-type data node corresponding to the first list-type meta-data node, wherein the first list-type data node is capable of representing an ordered listing of data;
   to accomplish receiving a first signal from the first end-user, while the first list-type data node is indicated in the first graphical user interface;
   to accomplish identifying a first child meta-data node, that is a child of the first list-type meta-data node;
   to accomplish creating, in response to the first signal, and only in accordance with the first child meta-data node, a first child data node of the first list-type data node;
   to accomplish creating, in response to each additional signal from the end-user while the first list-type data node is indicated, and only in accordance with the first child meta-data node, an additional child data node of the first list-type data node; and
   to accomplish starting execution of the first application program with the first argument input to the first parameter.

2. A system for a user interface to an internet-of-things controller, comprising:
   one or more processors and programmable memory, wherein the system is configured:
   to accomplish receiving from a first end-user a first selection of a first application program that, when executed, can remotely access one or more internet-of-things devices, wherein data passed by the first end-user as one or more arguments, to one or more corresponding parameters of the first application program, adapts the first application program to perform specific behavior in a specific hardware environment;
   to accomplish accessing, in response to the first selection of the first application program, a first meta-data specification of a set of all potential arguments, for input to a first parameter, that are properly structured;
   to accomplish operating a first graphical user interface in conformance with the first meta-data specification, in order to permit the first end-user to create a first argument for input to the first parameter;
   to accomplish creating, in accordance with a first list-type meta-data node of the first meta-data specification, a first list-type data node of the first argument;
   to accomplish creating the first list-type data node to be capable of representing an ordered listing of data;
   to accomplish receiving a first signal from the first end-user while the first list-type data node is indicated in the first graphical user interface;
   to accomplish identifying a first tabular meta-data node, that is a child of the first list-type meta-data node;
   to accomplish creating, in response to the first signal, and only in accordance with the first tabular meta-data node, a first tabular data node that is a child of the first list-type data node;
   to accomplish creating, in response to each additional signal while the first list-type data node is indicated, and only in accordance with the first tabular meta-data node, an additional tabular data node that is a child of the first list-type data node;
   to accomplish adding each tabular data node, in accordance with the first tabular meta-data node, to require at least a first and a second key-value pairs; and
   to accomplish starting execution of the first application program with the first argument input to the first parameter.

* * * * *